US011640174B2

(12) United States Patent
Tran

(10) Patent No.: US 11,640,174 B2
(45) **Date of Patent: *May 2, 2023**

(54) SMART VEHICLE

(71) Applicant: Ha Q. Tran, Saratoga, CA (US)

(72) Inventor: Ha Q. Tran, Saratoga, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/022,457

(22) Filed: Sep. 16, 2020

(65) Prior Publication Data

US 2021/0271258 A1 Sep. 2, 2021

Related U.S. Application Data

(63) Continuation of application No. 16/693,285, filed on Nov. 23, 2019, now Pat. No. 10,955,855.

(51) Int. Cl.

*G05D 1/02* (2020.01)
*B60R 11/04* (2006.01)
*G05D 1/00* (2006.01)
*G06T 17/00* (2006.01)

(52) U.S. Cl.

CPC ............ *G05D 1/0246* (2013.01); *B60R 11/04* (2013.01); *G05D 1/0088* (2013.01); *G05D 1/0212* (2013.01); *G05D 1/0274* (2013.01); *G06T 17/00* (2013.01); *G05D 2201/0212* (2013.01)

(58) Field of Classification Search

CPC .. G01D 1/0246; G01D 1/0088; G01D 1/0212; G01D 1/0274; G01D 2201/0212; B60R 11/04; G06T 17/00

USPC ........................................................... 701/25

See application file for complete search history.

(56) References Cited

U.S. PATENT DOCUMENTS

| | | | | |
|---|---|---|---|---|
| 10,395,117 | B1 * | 8/2019 | Zhang | G01C 21/206 |
| 10,569,773 | B2 * | 2/2020 | Zhao | G05D 1/0088 |
| 2008/0243337 | A1 * | 10/2008 | Tsuda | B60W 50/14 701/41 |
| 2009/0052742 | A1 * | 2/2009 | Okamoto | G06V 20/58 382/104 |
| 2013/0325321 | A1 * | 12/2013 | Pylappan | G01C 21/20 701/410 |
| 2016/0046290 | A1 * | 2/2016 | Aharony | B60W 30/0953 701/41 |
| 2019/0241183 | A1 * | 8/2019 | Han | B60W 30/09 |
| 2019/0250269 | A1 * | 8/2019 | Miu | G01S 13/931 |
| 2020/0192403 | A1 * | 6/2020 | Silver | G01S 15/86 |

* cited by examiner

*Primary Examiner* — Mahmoud S Ismail

(74) *Attorney, Agent, or Firm* — PowerPatent; Bao Tran

(57) ABSTRACT

Smart car method for autonomous navigation by creating a 3D model based on outputs of the camera and sensor; accessing a high definition map database and generating a trip with travel segments from origin to destination; detecting a freeway entrance or an exit lane based on a road marking using a camera and a sensor; if the travel segment passes the freeway entrance or exit, then follow the current lane without exiting; and otherwise following the freeway entrance or exit.

20 Claims, 42 Drawing Sheets

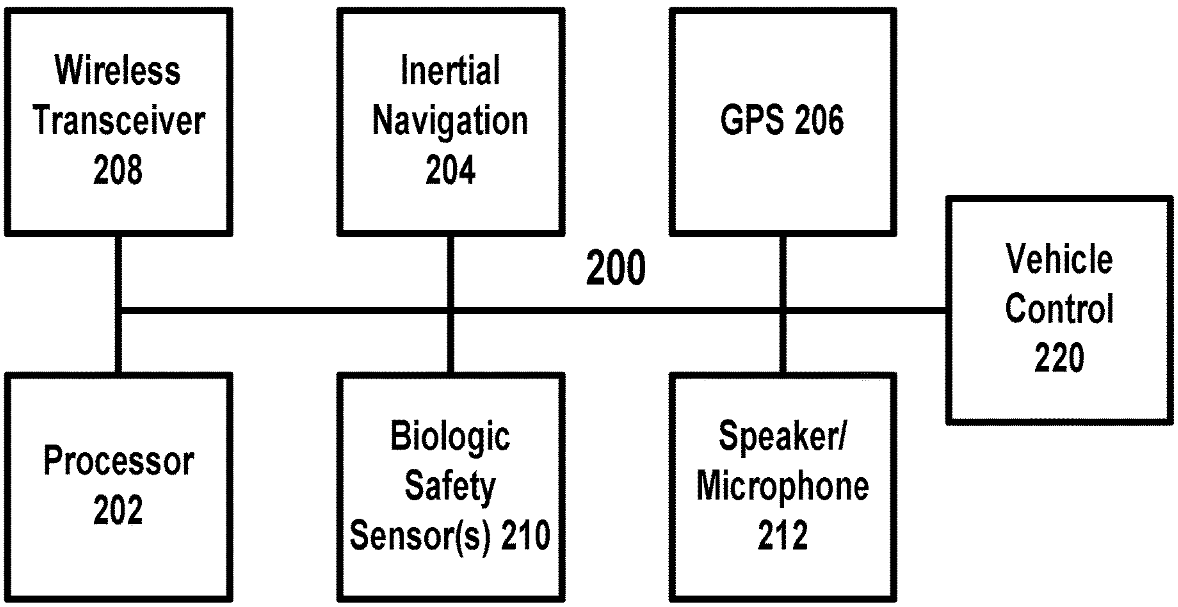
FIG. 2A
FIG. 2C
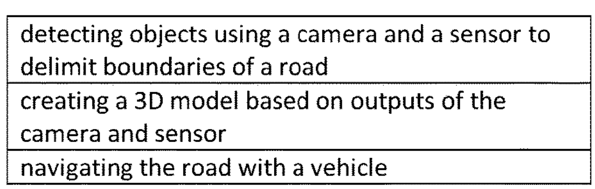

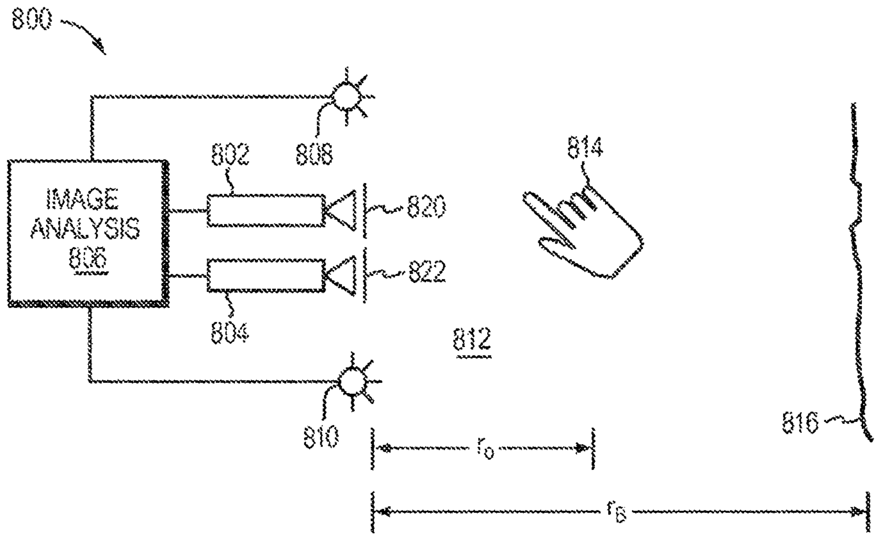

FIG. 3

| |
|---|
| mounting a plurality of cameras in a vehicular cabin to detect edges of an object |
| translating the edges into motions of a human or a biological entity |
| monitoring safety conditions for the human biological entity |

FIG. 4

| |
|---|
| sensing driver impairment through cameras, body sensors (ECG), gesture detection, and/or touch-sensitive contact points from a driver of the vehicle |
| determining driver impairment level |
| enforcing driving adjustments to maximize safety |

FIG. 5

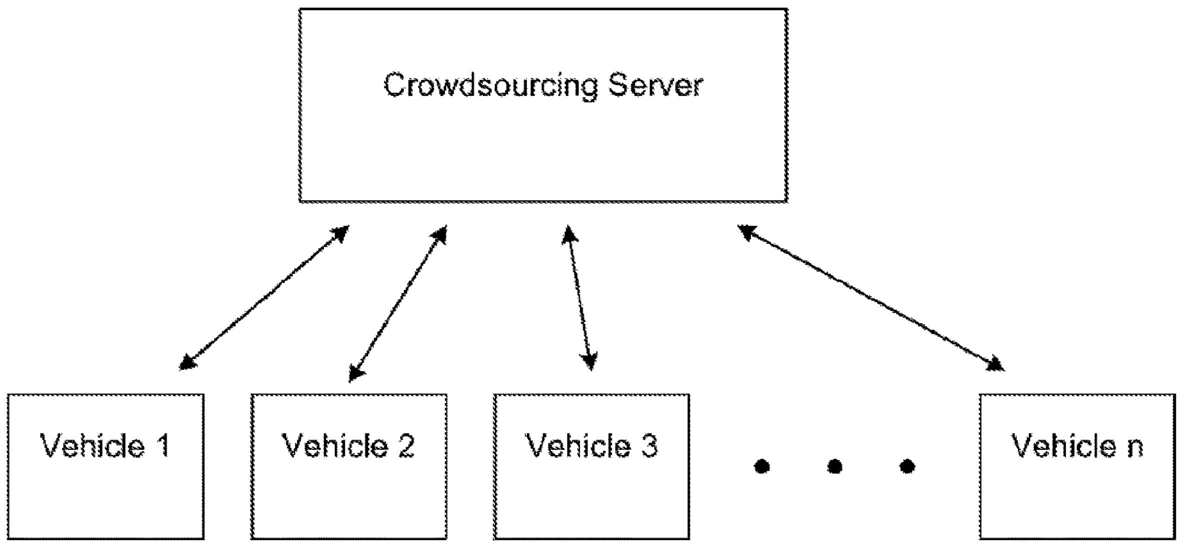
FIG. 9A
| |
|---|
| Receive proximity services for a group of vehicles traveling a predetermined route using peer-to-peer discovery |
| Receive crowdsourcing data from said plurality of vehicles |
| Shares crowdsourcing data to the group of vehicle traveling the route of interest |
| Provide navigation guidance to the vehicle traveling the route using the crowdsourced data |
FIG. 9B
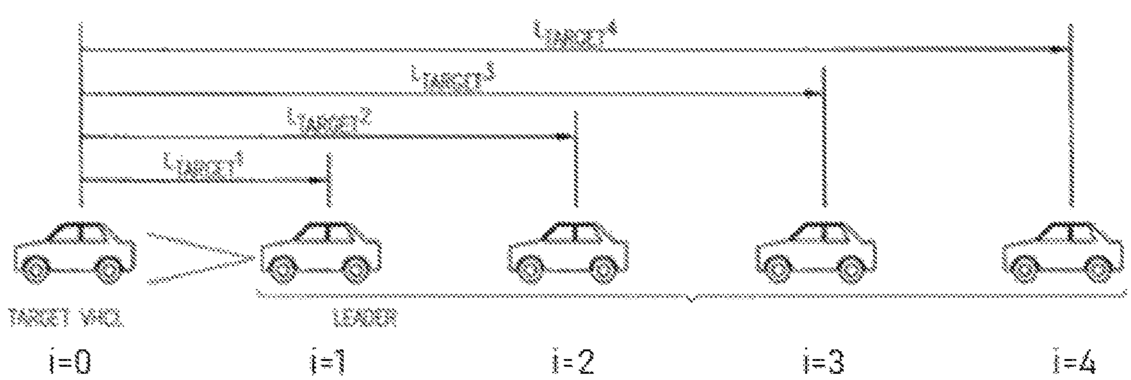
FIG. 10

4600

| Traveler | User-1 | User-2 | User-N | Matching | Recommendation |
|---|---|---|---|---|---|
| Speed | X | | X | 2 | Yes |
| Acceleration | | X | | 1 | No |
| Drunk | X | X | X | 3 | Yes |
| Sober | | X | X | 2 | Yes |
| Location-1 | X | X | X | 3 | Yes |
| Belt used | | | | 0 | No |
| Position | | | X | 1 | No |
| Location-6 | X | X | X | 3 | Yes |
| Location-N | | X | | 1 | No |
| Indicator used | X | X | X | 3 | Yes |
| Matching | 5 | 7 | 7 | | |

FIG. 16

SMART VEHICLE

BACKGROUND

The present invention relates to smart vehicles.

RELATED ART

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

Smart car method to navigate a road includes detecting road-side objects with a reflective sensor to delimit one or more road boundaries; capturing images of the road using a camera; creating a 3D model based on outputs of the camera and sensor; and navigating the road with a vehicle.

In another aspect, smart car operations are detailed including capturing a point cloud from a vehicle street view and converting the point cloud to a 3D model; applying a trained neural network to detect street signs, cross walks, obstacles, or bike lanes; and updating a high definition (HD) map with the neural network output.

In one aspect, a method to generate a high definition map of a travel path includes:

capturing roadway images using a plurality of cameras and a plurality of vehicles;

detecting one or more car lanes and one or more bicycle lanes;

creating a 3D model of the road with lane and traffic sign, and the smart vehicle;

obtaining lane information that provides an estimated location of the lane;

estimating a path of each neighboring vehicle and updating the 3D model of the road, the smart vehicle and the nearby vehicle; and when the lane information has become unavailable or unreliable, maintaining a relative position of the smart vehicle using the 3D model of the road and the nearby vehicle based on one or more estimated paths until the lane information becomes available again.

In another aspect, a method to follow a lane of a road with a smart vehicle includes: creating with a processor a 3D model of the road comprising a bike lane, a nearby vehicle, and the smart vehicle; obtaining lane information that provides an estimated location of the lane; estimating a path of the bike and the vehicles and updating the 3D model of the road; and when the lane information has become unavailable or unreliable, maintaining a relative position of the smart vehicle using the 3D model of the road and the nearby vehicle based on one or more estimated paths until the lane information becomes available again.

Vehicles traveling a same route is determined using a vehicle to vehicle communication protocol for identifying peers based upon encoded signals during peer discovery in a peer to peer network. The protocol is compatible with WiFi, cellular, or Proximity Services via LTE Device Broadcast. The method includes direct signaling that partitions a time-frequency resource into a number of segments can be utilized to communicate an identifier within a peer discovery interval. Vehicles that share same driving segments broadcast expressions indicating their path(s), comprising detecting vehicles in the same segment as part of the proximity services for capturing and sharing crowd-sourced navigation data. The method includes capturing crow-sourced information relating to: closing of a lane; predicting an avoidance maneuver; predicting a congestion with respect to a segment of the route of the at least one vehicle; and predicting traffic light patterns. The method includes determining an obstacle in the lane and changing the vehicle's path to avoid the obstacle, wherein the obstacle can be rocks, a lane closure, an inoperative vehicle, or a vehicle in an accident. The path can be a road, a freeway or a highway. Map data may include obstacles, pedestrian crossway, bike lanes, and traffic signs. The bike lane can be detected by neural network by matching a portion of the roadway that has been designated by striping, signage, and pavement markings for the preferential or exclusive use of bicyclists. The method includes detecting a physical barrier (bollards, medians, raised curbs, etc.) that restricts the encroachment of motorized traffic. The method includes identifying bike lanes that run in the same direction of traffic. The method includes identifying lanes configured in the contra-flow direction on low-traffic corridors for the connectivity of a particular bicycle route. The method includes detecting bike lanes using color, lane markings, signage, and intersection treatments. The method includes detecting bike lanes on the right side of the street, between the adjacent travel lane and curb, road edge, or parking lane. The method includes locating bike lane located on the left side when installed on one-way streets, or may be buffered if space permits. The method includes detecting bike lanes paired with a designated buffer space separating the bicycle lane from the adjacent motor vehicle travel lane and/or parking lane. The method includes identifying contra-flow bicycle lanes for riding in an opposite direction of motor vehicle traffic. The method includes detecting contra-flow lanes separated with yellow center lane striping. The method includes detecting left-side bike lanes placed on the left side of one-way streets or two-way median divided streets. The smart car has a number of sensors such as IoT (internet of things) sensors that can share data with other vehicles and that can communicate with the cloud to provide intelligent handling of the car.

In one aspect, a method for detecting attentiveness includes placing a camera near a driver, the camera having a wireless radio to communicate with a processor; sending a radio signal toward the driver and detecting a heart rate from the driver based on a reflected radio signal; capturing images of the driver; and detecting driver attentiveness based on camera images and the detected heart rate.

Implementations can include one or more of the following: determining if the driver is unable to control the car in time and detecting verbal or visual cues from the driver on action to take; detecting a driver eye gaze direction and following the direction; detecting a driver gesture direction and following the direction; if the driver gesture indicates a panic, determining an environmental cue for action—wherein the environmental cue includes paths of neighboring cars, comprising steering the car to follow one car path, or wherein the environmental cue includes an obstruction, comprising steering the car to protect the driver; if collision is imminent, the vehicle ejects the driver; the ejected driver can hover at a safe distance, or can land with a parachute; camera images are provided to a neural network to determine one or more of: heart beat monitoring, blood pressure monitoring, skin temperature and respiration rate; the camera images are provided to a neural network to determine hyperthermia or dehydration; system detects emotion, drowsiness or fatigue from combination of determining facial expression, hand gesture, and heart rate or breathing rate; based on the emotion, drowsiness or fatigue, system can increase sensitivity to Traffic Signal Recognition, Lane Departure Warning, Collision Detection, Pedestrian Detection.

In another aspect, a method for transferring control from an autonomous mode to a driver includes placing a camera near a driver, the camera having a wireless radio to communicate with a processor; sending a radio signal toward the driver and detecting a heart rate from the driver based on a reflected radio signal; capturing images of the driver; detecting driver attentiveness based on camera images and the detected heart rate; and determining if the driver is unable to control the car in time and detecting verbal or visual cues from the driver on action to take.

Implementations can include one or more of the following: detecting a driver eye gaze direction and following the direction; detecting a driver gesture direction and following the direction; if the driver gesture indicates a panic, determining an environmental cue for action; wherein the environmental cue includes paths of neighboring cars, comprising steering the car to follow one car path; wherein the environmental cue includes an obstruction, comprising steering the car to protect the driver; if collision is imminent, the vehicle ejects the driver; the ejected driver can hover at a safe distance, or can land with a parachute; the camera images are provided to a neural network to determine one or more of: heart beat monitoring, blood pressure monitoring, skin temperature and respiration rate; the camera images are provided to a neural network to determine hyperthermia or dehydration; system detects emotion, drowsiness or fatigue from combination of determining facial expression, hand gesture, and heart rate or breathing rate; based on the emotion, drowsiness or fatigue, system can increase sensitivity to Traffic Signal Recognition, Lane Departure Warning, Collision Detection, Pedestrian Detection.

In yet another aspect, a method for detecting forgotten baby or pet in a car with a cabin includes placing a camera near a driver, the camera having a wireless radio to communicate with a processor; sending a radio signal from a front of the cabin and detecting a movement in the car based on a reflected radio signal; capturing images of the cabin; detecting forgotten baby or pet based on camera images and the movement; and generating an alarm to protect the baby or pet.

Implementation can include one or more of the following. The method includes: automatically opening a window to ventilate the car; notifying an adult of the forgotten baby or pet; autonomously driving the car to a safe or comfortable area. The system detects emotion, drowsiness or fatigue of the baby from combination of determining facial expression, hand gesture, and heart rate or breathing rate In a further aspect, a method to provide information or entertainment content for a person includes detecting when a person is alone in a car, adjusting a speech recognizer in the car to focus capturing speech from the person's position in the car; playing content in the car as requested by the person; when the person exits the car and enters a building, transferring the speech recognizer from the car to a building speech recognizer along with a current play state of the content; and resuming playing the content on a device in the house on request without interruption.

Implementations can include one or more of the following. The transfer is based on data stored on a mobile device. Data on resume point is communicated over a wireless network connecting the car to the device. Data being transferred includes resume point of texting, social network communication, email, or chat. Data being transferred includes resume point of in a word processor, a software application, an augmented reality, or a virtual reality application. The person can play AR/VR content. The person can exercise in the car. The seat in the car can swivel to provide two rows of facing seats. The car can be shared, wherein the sharing can be based on a selected time of day, with peak hours more expensive than off-peak hours, and wherein the sharing can be based on a selected time period, similar to vacation timesharing to enable user to try different cars, or experience exotic vehicles one week a year. The system detects emotion, drowsiness or fatigue from combination of determining facial expression, hand gesture, and heart rate or breathing rate. Based on the emotion, drowsiness or fatigue, system can alter response of systems in the car or building to adjust to user state.

In another aspect, a method to park a car includes using a mobile application to communicate with the car; sending a parking instruction to the car through the mobile application; moving the car to an open parking spot; applying a neural network to sensor data and parking the car; and upon a summon from the mobile application, autonomously driving from the parking spot to a person based on a position of the mobile application to pick up the person.

Implementations can include one or more of the following. The sensor can be a multi-focal camera and a radar on a front of the car. The radar on the front of the car can be a long range radar. The sensor can be a multi-focal camera and a lidar on a front of the car. The sensor can be a multi-focal camera on a front of the car and side cameras and rear cameras. The multi-focal camera can be trifocal camera. One or more thermal cameras can be positioned on the car to detect objects at dusk or night. The sensor can be sonar sensors on the side or rear of the car to detect a stationary obstacle or vacant spot. The lidar can be part of the camera. The sensors can generate a 3D model of an environment. The 3D model can be a high definition map. The car can have an extendable jack with rolling wheels at the bottom to facilitate lateral parking movement into a tight parking spot as guided by side sensors including sonar and camera sensors.

In yet another aspect, a car includes a lidar or long-range radar in a front of the car; a multi-focal camera in the front; one or more thermal imager(s) in the front or rear of the car; a processor coupled to the lidar, radar, multi-focal camera and thermal imagers, the processor running a plurality of trained neural networks for navigation; side cameras, side sonars or side radars coupled to the processor for blind spot detection, rear traffic alert, and parking; and rear cameras, rear sonars or rear radars coupled to the processor for blind spot detection, rear traffic alert, and parking.

Implementations may include one or more of the following. The processor determines lane boundaries and perform automatic steering when lane changing. The processor determines lane boundaries and perform automatic parking. The processor determines lane boundaries and perform autonomous Pedestrian and Cyclist Braking. The car includes a cabin camera facing a driver to determine attentiveness. The cabin camera performs one of driver authorization, gaze detection, eye tracking and texting detection, or occupant monitoring. A wireless transceiver can also face the driver to detect heart rate or respiratory rate. The multi-focal camera includes a lens receiving liquid to change a focal length of the lens. The multi-focal camera includes three lenses each with different focal length. The car can have an extendable rolling wheels at the bottom to facilitate lateral parking movement into the parking spot as guided by side sensors including sonar and camera sensors. The system detects emotion, drowsiness or fatigue from combination of determining facial expression, hand gesture, and heart rate or breathing rate. Based on the emotion, drowsiness or fatigue, system can increase sensitivity to Traffic Signal Recognition, Lane Departure Warning, Collision Detection, Pedestrian Detection.

In yet another aspect, a method for navigation includes using a trained neural network to make driving decisions for an autonomous car; conforming to one or more traffic rules on driving speed or lane changing, and reasonably ignoring the one or more traffic rules during an imminent accident, wherein a reasonableness of the overruling is determined by featurizing a plurality of vehicle sensor parameters and traffic and weather conditions, and applying a law neural network trained on traffic case law or legal precedent to make the reasonableness decision.

The method includes assessing a driver or a manufacturer of the vehicle liable for the accident if the car was driven unreasonably. The method includes understanding the environment around vehicle. The method includes understanding behaviors of people encountered. The method includes deciding a response to the people. The method includes communicating with nearby people through audio or visual responses. The processor determines lane boundaries and perform automatic steering when lane changing. The processor determines lane boundaries and perform automatic parking. The processor determines lane boundaries and perform autonomous Pedestrian and Cyclist Braking. The car includes a cabin camera facing a driver to determine attentiveness. The cabin camera performs one of driver authorization, gaze detection, eye tracking and texting detection, or occupant monitoring. A wireless transceiver faces the driver to detect heart rate or respiratory rate. The multi-focal camera includes a lens receiving liquid to change a focal length of the lens. The multi-focal camera includes three lenses each with different focal length. System detects emotion, drowsiness or fatigue from combination of determining facial expression, hand gesture, and heart rate or breathing rate. Based on the emotion drowsiness or fatigue, system can increase sensitivity to Traffic Signal Recognition, Lane Departure Warning, Collision Detection, Pedestrian Detection. The reasonableness is determined by analyzing similar vehicle actions in similar location. The reasonableness is based on the then state of the art machine learning capability. The reasonableness is based on a reasonable person standard and based on the then state of the art machine learning standard. The system can adjust reasonableness standard to Traffic Signal Recognition, Lane Departure Warning, Collision Detection, Pedestrian Detection.

In another aspect, a method for cost-effective navigation of a vehicle in a metropolitan (metro) area, includes capturing images from a plurality of cameras in the vehicle; recognizing objects from the images using one or more neural networks; providing an accelerometer to perform position determination with dead-reckoning; providing position coordinates from a global positioning system; receiving positioning coordinates from a low latency cellular or wifi transceiver positioned at a known position; and generating a travel path for the vehicle in the metro area.

Implementations can include one or more of the following with supplemental sensors on the cellular or wifi transceiver. The sensor can be a multi-focal camera and a radar on a front of the car. The radar can be a long-range radar. The sensor can be a multi-focal camera and a lidar of the car. The sensor can be a multi-focal camera on a front of the car and side cameras and rear cameras. The multi-focal camera can be trifocal camera. One or more thermal cameras can detect objects at dusk or night. The sensor can be sonar sensors to detect a stationary obstacle or vacant spot. The lidar can be part of the camera. The sensors can generate a 3D model of an environment. The 3D model can be a high definition map. Vehicle can include in vehicle camera with Wifi that detects emotion, drowsiness or fatigue from combination of determining facial expression, hand gesture, and heart rate or breathing rate. Based on the emotion, drowsiness or fatigue, system can adjust Traffic Signal Recognition, Lane Departure Warning, Collision Detection, Pedestrian Detection. The result is a cost-effective car with expensive sensors mounted in the road infrastructure for shared access, so consumers are willing to switch to driverless. In the near term, with the technology still at tens of thousands of dollars, only a ride-hailing business will be financially sustainable. The local transceiver categorizes different features such as intersections, driveways, or fire hydrants. As more and more self-driving cars hit the road, they will constantly be encountering new objects and obstacles that they can relay to the mapping team and update other cars.

In another aspect, a method for cost-effective navigation of a vehicle in a metropolitan (metro) area includes capturing images from a plurality of cameras in the vehicle; recognizing objects from the images using one or more neural networks; providing an accelerometer to perform position determination with dead-reckoning; providing position coordinates from a global positioning system; receiving positioning coordinates from a low latency cellular or wifi transceiver positioned at a known position; and generating a travel path for the vehicle in the metro area.

Implementations can include one or more of the following with supplemental sensors on the cellular or wifi transceiver. The sensor can be a multi-focal camera and a radar on a front of the car. The radar can be a long range radar. The sensor can be a multi-focal camera and a lidar of the car. The sensor can be a multi-focal camera on a front of the car and side cameras and rear cameras. The multi-focal camera can be trifocal camera. One or more thermal cameras can detect objects at dusk or night. The sensor can be sonar sensors to detect a stationary obstacle or vacant spot. The lidar can be part of the camera The sensors can generate a 3D model of an environment. The 3D model can be a high definition map.

Vehicle can include in vehicle camera with Wifi that detects emotion, drowsiness or fatigue from combination of determining facial expression, hand gesture, and heart rate or breathing rate. Based on the emotion, drowsiness or fatigue, system can adjust Traffic Signal Recognition, Lane Departure Warning, Collision Detection, Pedestrian Detection. The system detects when car owners modify their own vehicles to improve performance and inadvertently compromise the computers' decision-making ability. The result is a cost-effective car with expensive sensors mounted in the road infrastructure for shared access, so consumers are willing to switch to driverless. In the near term, with the technology still at tens of thousands of dollars, only a ride-hailing business will be financially sustainable. The local transceiver categorizes different features such as intersections, driveways, or fire hydrants.

Advantages of the system may include one or more of the following. The system pre-computes certain operations before the AV needs the information during the drive and may result in completely solving sub-parts of the autonomy problem. For example, perception and localization of static objects in the world such as roads, intersections, street signs, etc. can be solved offline and in a highly accurate manner. Human operators can curate pre-computed data to ensure high quality. The system can also pre-compute partial, approximate, or intermediate results that can make real-time autonomy work easier. Such pre-computed results include both spatial and temporal aspects of the world and are indexed for efficient retrieval. To the AV, the map acts as a sensor with special perception and prediction capabilities. When compared with other sensors such as cameras and lidar, the map has no range limitations. It can sense things way beyond the 100-200 m range that is typical of today's AV sensors. It is also immune to runtime occlusion from dynamic objects like other vehicles. Data from all AV vehicles becomes a shared data structure that lives both in the cloud and also docked in each of the AVs.

BRIEF DESCRIPTION OF THE DRAWINGS

FIG. 3 illustrates an exemplary gesture control subsystem;

FIG. 4 shows an exemplary child or animal safety protection process;

FIG. 5 shows an exemplary drunk driving protection process;

FIGS. 9A-9B show exemplary systems for capturing navigation data and using such data for smart vehicles;

FIG. 10 shows an exemplary group of cars following flock control behavior;

FIG. 16 is a diagram 600 illustrates generally, an overview of preferences matching by the server 202, according to embodiments disclosed herein;

DETAILED DESCRIPTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In concluding the introduction to the detailed description, what follows is a collection of example embodiments, including at least some explicitly enumerated as "Example Combinations (or ECs), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

Figure 1:
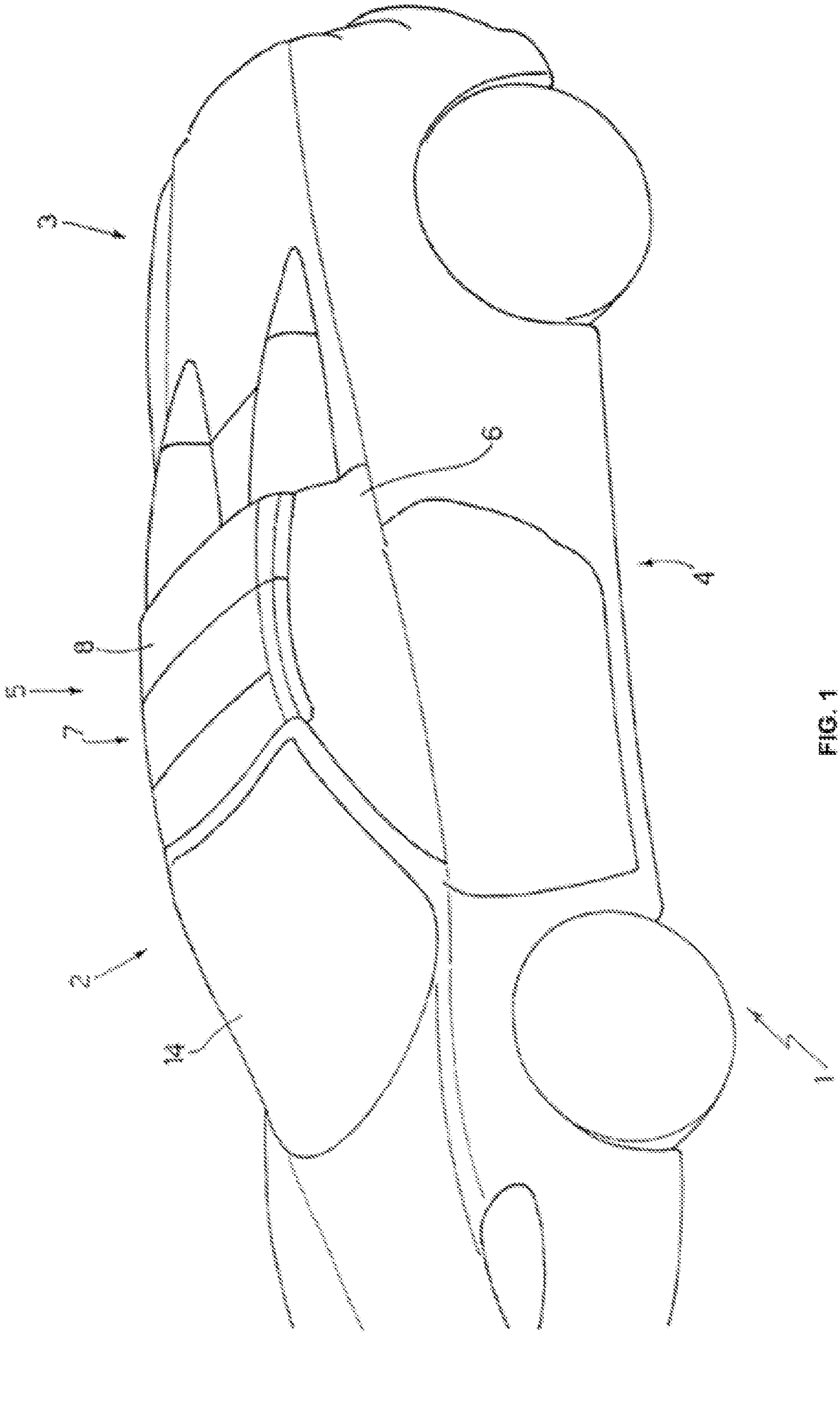
FIG. 1 shows an exemplary smart and safe vehicle.

FIG. 1 shows an exemplary environmentally friendly vehicle such as a car 1 with a passenger compartment 2 and a central engine compartment 3 behind passenger compartment 2 with a front window 14 and one or more side windows and a rear window. Although the engine compartment 3 is shown as a rear-engine, the engine compartment 3 can also be a front engine compartment. The engine can be all electric engine, hydrogen engine, hybrid engine, or an ultra low emission gas engine. A frame 4 of the car 1 supports a roof 5 which can be a sun roof that can expose the passenger compartment 2 in an open position and can cover the passenger when closed. To support the sun roof, the frame 4 provides two vertical posts 6 facing each other on opposite sides of car 1, at the boundary between passenger compartment 2 and engine compartment 3. When sun roof 5 is in the closed position, roof members 7 and 8 are substantially horizontal, substantially coplanar, and positioned seamlessly one behind the other. The car contains a cooling system that minimizes the weight and power consumption of conventional air conditioning system for the car 1.

FIG. 2A shows a block diagram of an embodiment of an electrical power and automobile control system that includes passenger protection. The system is controlled by a processor 202. The processor 202 is connected with an inertial system (INS) 204 and a global positioning system (GPS) receiver 206 that generate navigation information. The processor 202 is also connected with a wireless communication device 208 that transmits and receives digital data as well as being a Doppler radar when desired. The processor 202 drives a display 210 and a speaker 212 for alerting a driver. The processor 202 provides control inputs to the automobile's braking and steering systems 220. A power cable 200 carries power between the batteries 100-116 and an electric motor engine (not shown). The power cable 200 also carries power to recharge the batteries 100-116 serially or in parallel. The data can be provided to wireless transmitters that will wirelessly receive the signal and send the data on to computer stations. Exemplary protocols that can be used include CAN-bus, LIN-bus over power line (DC-LIN), and LonWorks power line based control. In one embodiment, the protocol is compatible with the HomePlug specifications for home networking technology that connects devices to each other through the power lines in a home. Many devices have HomePlug built in and to connect them to a network all one has to do is to plug the device into the wall in a home with other HomePlug devices. In this way, when the vehicle is recharged by plugging the home power line to the vehicle connectors, automotive data is automatically synchronized with a computer in the home or office. This embodiment includes navigation systems, the INS 204 and the GPS receiver 206. Alternate embodiments may feature an integrated GPS and INS navigation system or other navigation system. The use of only an INS 204 or only a GPS receiver 206 as the sole source of navigation information is also contemplated. Alternatively, the wireless communication device 208 can triangulate with two other fixed wireless devices to generate navigation information. A biologics sensor 210 captures user biological signals and speaker/microphone 212 provides both visual and audio situational awareness information to a driver. Alternate embodiments may feature only a display 210 or only a speaker 212 as the sole source of information for the driver. Embodiments that interact directly with the braking and steering systems that provide no audio information to the driver are also contemplated. The braking and steering systems 220 may also be commanded by the processor 202. The processor 202 may command that the brakes be applied to prevent collision with a vehicle ahead or may provide a steering input to prevent the driver from colliding with a vehicle. The processor 202 may also issue braking or steering commands to minimize the damage resulting from a collision as discussed in United States Patent Application 20080091352, the content of which is incorporated by reference.

Figure 2B:
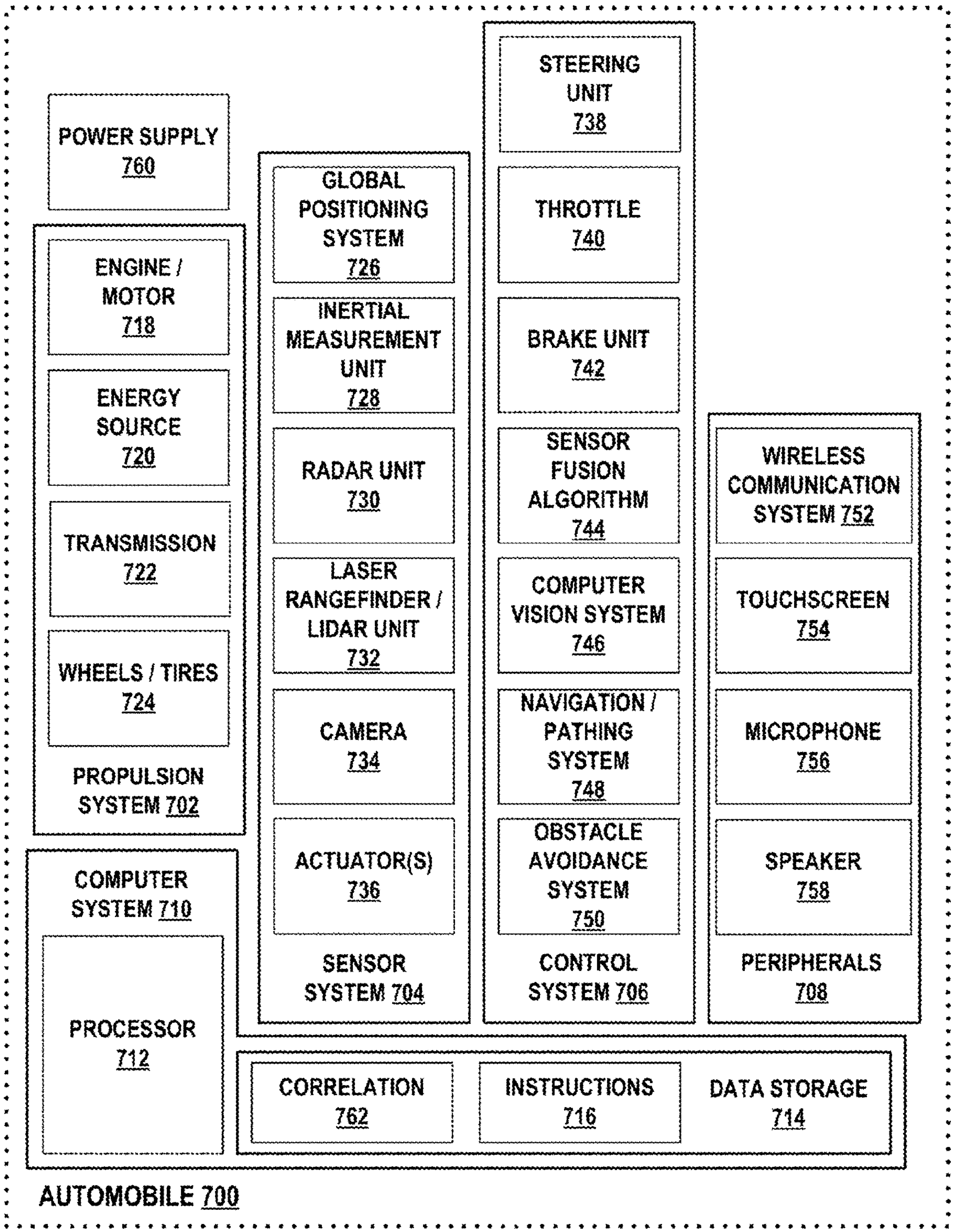
FIG. 2B illustrates another exemplary car electronic system.

FIG. 2B is a simplified block diagram of an example vehicle 700, in accordance with an embodiment. While the vehicle 700 in FIG. 7 is described as being configured to operate in an autonomous mode, in some embodiments the above methods may be implemented in a vehicle that is not configured to operate in an autonomous mode. In these embodiments, the vehicle may include fewer and/or different systems and/or components. The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an 02 monitor, a fuel gauge, an engine oil temperature, etc.). Other sensors are possible as well. The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well. The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well. The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects. Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode. In one embodiment, a LIDAR-on-a-chip system steers its electronic beam using arrays of many small emitters that each put out a signal at a slightly different phase. The new phased array thus forms a synthetic beam that it can sweep from one extreme to another and back again 100,000 times a second. In one embodiment, each antenna, which consists of a silicon waveguide and five curved grooves etched in silicon, is 3 micrometers long, 2.8 μm wide, and 0.22 μm thick. An infrared laser beam is delivered to the antennas through a waveguide. The LIDAR 732 can be part of a camera 734. The camera 734 may be any camera (e.g., a still camera, a video camera, etc.) configured to record three-dimensional images of an interior portion of the vehicle 700. To this end, the camera 734 may be, for example, a depth camera. Alternatively or additionally, the camera 734 may take any of the forms described above in connection with the exterior camera 610. In some embodiments, the camera 734 may comprise multiple cameras, and the multiple cameras may be positioned in a number of positions on the interior and exterior of the vehicle 700. The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750. The steering unit 738 may be any combination of mechanisms configured to adjust the heading of vehicle 700. The throttle 740 may be any combination of mechanisms configured to control the operating speed of the engine/motor 718 and, in turn, the speed of the vehicle 700. The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well. The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles (e.g., in embodiments where the camera 734 includes multiple cameras, including a camera mounted on the exterior of the vehicle 700). To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc. The navigation/path system 748 may be any system configured to determine a driving path for the vehicle 700. The navigation/path system 748 may additionally be configured to update the driving path dynamically while the vehicle 700 is in operation. In some embodiments, the navigation and path system 748 may be configured to incorporate data from the sensor fusion algorithm 744, the GPS 726, and one or more predetermined maps so as to determine the driving path for the vehicle 700. The obstacle avoidance system 750 may be any system configured to identify, evaluate, and avoid or otherwise negotiate obstacles in the environment in which the vehicle 700 is located. The control system 706 may additionally or alternatively include components other than those shown. Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above. In one embodiment, it can be the Dedicated Short Range Communications (DSRC) which provides the communications-based active safety systems. Communications-based sensor systems provide a low-cost means of enabling hazard detection capability on all vehicle classes, but requires vehicles and infrastructure to be outfitted with interoperable communications capabilities of DSRC or similar Vehicle to Vehicle networks. The car can have a low latency 5G transceiver that communicates to a cell tower, and processing resources such as GPU and array processors near the cell tower can provide high speed shared compute power to the car through the 5G network. For example, the 5G network can have millimeter transceiver such as a low latency ultra-wide-band transceiver in communication with the processor and a remote processor can receive/send data to the transceiver to offload processing from the processor. The touchscreen 754 may be used by a user to input commands to the vehicle 700. The microphone 756 may be configured to receive audio (e.g., a voice command or other audio input) from a user of the vehicle 700. Similarly, the speakers 758 may be configured to output audio to the user of the vehicle 700. Still further, while the above description focused on a vehicle 700 configured to operate in an autonomous mode, in other embodiments the vehicle may not be configured to operate in an autonomous mode. In these embodiments, for example, one or more of the following components may be omitted: the global positioning system 726, the inertial measurement unit 728, the RADAR unit 730, the laser rangefinder or LIDAR unit 732, the actuators 736, the sensor fusion algorithm 744, the computer vision system 746, the navigation or path system 748, the obstacle avoidance system 750, the wireless communication system 752, the touchscreen 754, the microphone 756, and the speaker 758.

One embodiment represents the HD map is crowd-sourced from AV sensors such as HD cameras, lidar, radar, GPS, and inertial measurement units (IMUs). The map is represented as layers aligned with each other and indexed for efficient parallel lookups of information both for the current location of the AV and also local neighborhood. The basic road network data offered by web map services is the bottom most layer. Each subsequent layer adds additional details to the map including the geometric map, the semantic map, map priors, and real-time knowledge. Each of the map layers is built independently and alignment algorithms are used to stitch together all layers of the map for use by the self-driving vehicle. The map can be created from map data collected from several vehicles that are driving along various routes. The vehicles can be special mapping vehicles or can be ride-sharing vehicles, or personal vehicles that agree to share HD map data. The system includes a map update module that updates previously computed map data by receiving more recent information from vehicles that recently travelled along routes on which map information changed. For example, if certain road signs have changed or lane information has changed as a result of construction in a region, the map update module updates the maps accordingly. The map data encoding module encodes map data to be able to store the data efficiently as well as send the required map data to vehicles efficiently.

The software can determine the current location of the vehicle, for example, when the vehicle starts and as the vehicle moves along a route. A localize software determines an accurate location of the vehicle within the HD Map based on location provided by GPS, vehicle motion data provided by IMU, LIDAR scanner data, and camera images. The localize operation returns an accurate location of the vehicle as latitude and longitude coordinates. The coordinates returned by the localize API are more accurate compared to the GPS coordinates used as input, for example, the output of the localize API may have precision range from 5-10 cm, refined using 3D models from camera images and radar/sonar scanner data, for example, at a frequency of 30 Hz. A route software generates an accurate route specifying lanes based on the HD map using input a route from a source to destination via a third party maps and generates a high precision routes represented as a connected graph of navigable lanes along the input routes based on HD maps. The landmark map provides the geometric and semantic description of the world around the vehicle, for example, description of various portions of lanes that the vehicle is currently travelling on. The landmark map allows queries based on landmark maps, for example, fetch-lanes and fetch-features. The fetch-lanes operation provides lane information relative to the vehicle and the fetch-features operation. The fetch-lanes operation receives as input a location, for example, the location of the vehicle specified using latitude and longitude of the vehicle and returns lane information relative to the input location. The fetch-lanes operation may specify distance parameters indicating the distance relative to the input location for which the lane information is retrieved. The fetch-features operation receives information identifying one or more lane elements and returns landmark features relative to the specified lane elements. The landmark features include, for each landmark, a spatial description that is specific to the type of landmark. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary. The 3D map operation also includes map update operations, for example, download-map-updates and upload-map-updates. The download-map-updates receives as input a planned route identifier and downloads map updates for data relevant to all planned routes or for a specific planned route. The upload-map-updates operation uploads data collected by the vehicle to the online HD map. This allows the online HD map to keep the HD map data stored in the online HD map up to date based on changes in map data observed by sensors of vehicles driving along various routes. The route operation returns route information including full route between a source and destination and portions of route as the vehicle travels along the route. If vehicle sensors indicate a discrepancy in the map information provided by the online HD map, the discrepancy is reported and that may result in the online HD map updating the map data provided to other vehicles.

Next, the layers are detailed. The geometric map layer contains 3D information of the world where raw sensor data from lidar, various cameras, GPS, and IMUs is processed using simultaneous localization and mapping (SLAM) algorithms to first build a 3D view of the region explored by the mapping data collect run. The outputs of the SLAM algorithm are an aligned dense 3D point cloud and a very precise trajectory that the mapping vehicle took. The vehicle trajectory is shown in pink. Each of the 3D points is colored using the colors observed for that 3D point in the corresponding camera images. The 3D point cloud is post-processed to produce derived map objects that are stored in the geometric map. Two important derived objects are the voxelized geometric maps and a ground map. The voxelized geometric map is produced by segmenting the point cloud into voxels that are as small as 5 cm×5 cm×5 cm. During real-time operation, the geometric map is the most efficient way to access point cloud information. Segmentation algorithms identify 3D points in the point cloud for building a model of the ground, defined as the driveable surface part of the map. These ground points are used to build a parametric model of the ground in small sections. The ground map is key for aligning the subsequent layers of the map, such as the semantic map.

The semantic map layer builds on the geometric map layer by adding semantic objects such as traffic 2D and 3D objects, lane boundaries, intersections, crosswalks, parking spots, stop signs, traffic lights, etc. that are used for driving. These objects contain rich metadata associated with them such as speed limits and turn restrictions for lanes. While the 3D point cloud might contain all of the pixels and voxels that represent a traffic light, it is in the semantic map layer that a clean 3D object identifying the 3D location and bounding box for the traffic light and its various components are stored. A combination of heuristics, computer vision, and point classification algorithms generate hypotheses for these semantic objects and their metadata. Human operators post-process these hypotheses via visualization and annotation tools to both validate the quality and fix any misses. For example, to identify traffic lights, a traffic light detector is applied to the camera images. Visual SLAM is used to process multiple camera images to get a coarse location of the traffic light in 3D. Lidar points in the local neighborhood of this location are matched and processed to produce the bounding box and orientation of the traffic light and its sub-components. Heuristics are applied for lane hypotheses, yield relationships, and connectivity graphs at intersections.

The geometric and semantic map layers provide information about the static and physical parts of the world important to the self-driving vehicle. T Dynamic and behavioral aspects of the environment are captured in the map priors layer and real-time knowledge layer which is determined from logs from the crowdsourced AVs to achieve high coverage of the map priors and ensure freshness of the real-time information. The map priors layer contains derived information about dynamic elements and also human driving behavior. Information here can pertain to both semantic and geometric parts of the map. For example, derived information such as the order in which traffic lights at an intersection cycle through their various states e.g. (red, protected-left, green, yellow, red) or (red, green, protected-left, yellow, red)

and the amount of time spent in each state are encoded in the map priors layer. Time and day of week dimensions are used as keys to support multiple settings. These priors are approximate and serve as hints to the onboard autonomy systems. Unlike information in the geometric and semantic layers of the map, the information in the map priors layer is designed to be approximate and act as hints. Autonomy algorithms commonly consume these priors in models as inputs or features and combined with other real-time information.

The real-time layer is the top most layer in the map and can be updated while the map is in use by the AV serving a ride. It contains real-time traffic information such as observed speeds, congestion, newly discovered construction zones, etc. The real-time layer supports gathering and sharing of real-time global information between a whole fleet of AVs.

Map data may include obstacles, pedestrian crossway, bike lanes, and traffic signs. A Bike Lane is defined as a portion of the roadway that has been designated by striping, signage, and pavement markings for the preferential or exclusive use of bicyclists. Bike lanes enable bicyclists to ride at their preferred speed without interference from prevailing traffic conditions and facilitate predictable behavior and movements between bicyclists and motorists. A bike lane is distinguished from a cycle track in that it has no physical barrier (bollards, medians, raised curbs, etc.) that restricts the encroachment of motorized traffic. Conventional bike lanes run curbside when no parking is present, adjacent to parked cars on the right-hand side of the street or on the left-hand side of the street in specific situations. Bike lanes typically run in the same direction of traffic, though they may be configured in the contra-flow direction on low-traffic corridors necessary for the connectivity of a particular bicycle route. The configuration of a bike lane requires a thorough consideration of existing traffic levels and behaviors, adequate safety buffers to protect bicyclists from parked and moving vehicles, and enforcement to prohibit motorized vehicle encroachment and double-parking. One pseudo-code to determine bike lanes include:

- Capture street image;
- Apply thresholding to extract lane and curb boundary;
- Apply thresholding to detect lane markings, signage, and intersections;
- Extract features Bike Lanes based on color, lane markings, signage, and intersection treatments;
- Apply neural network to bike lane detection; and
- Confirm bike lanes by car avoidance behavior and bicyclist behavior in the bike lanes.

The above algorithm detects bike lanes as an exclusive space for bicyclists through the use of pavement markings and signage. The bike lane is located adjacent to motor vehicle travel lanes and flows in the same direction as motor vehicle traffic. Bike lanes are typically on the right side of the street, between the adjacent travel lane and curb, road edge, or parking lane. This facility type may be located on the left side when installed on one-way streets, or may be buffered if space permits.

One embodiment uses cameras and neural networks to navigate the smart vehicle around the bicycle lane as an obstacle, and enable bicyclists to ride at their preferred speed without interference from prevailing traffic conditions. The neural network monitors predictable behavior and movements between bicyclists and motorists and changes its network weight for possible obstacle conditions, for example bicyclists may leave the bike lane to pass other bicyclists, make left turns, avoid obstacles or debris, and avoid other conflicts with other users of the street.

One implementation detects buffered bike lanes, which are conventional bicycle lanes paired with a designated buffer space separating the bicycle lane from the adjacent motor vehicle travel lane and/or parking lane. Such neural network learning of buffered bike lanes:

- Provides greater shy distance between motor vehicles and bicyclists.
- Provides space for bicyclists to pass another bicyclist without encroaching into the adjacent motor vehicle travel lane.
- Encourages bicyclists to ride outside of the door zone when buffer is between parked cars and bike lane.
- Provides a greater space for bicycling without making the bike lane appear so wide that it might be mistaken for a travel lane or a parking lane.
- Appeals to a wider cross-section of bicycle users.
- Encourages bicycling by contributing to the perception of safety among users of the bicycle network.

One embodiment enables neural network learning of contra-flow bicycle lanes designed to allow bicyclists to ride in the opposite direction of motor vehicle traffic. They convert a one-way traffic street into a two-way street: one direction for motor vehicles and bikes, and the other for bikes only. Contra-flow lanes are separated with yellow center lane striping. Combining both direction bicycle travel on one side of the street to accommodate contra-flow movement results in a two-way cycle track. The contra-flow design introduces new design challenges and may introduce additional conflict points as motorists may not expect oncoming bicyclists. Such neural network learning of Contra-Flow Bike Lane:

- Provides connectivity and access to bicyclists traveling in both directions.
- Reduces dangerous wrong-way riding.
- Decreases sidewalk riding.
- Influences motorist choice of routes without limiting bicycle traffic.
- Decreases trip distance, the number of intersections encountered, and travel times for bicyclists by eliminating out-of-direction travel.
- Allows bicyclists to use safer, less trafficked streets.

Left-side bike lanes are conventional bike lanes placed on the left side of one-way streets or two-way median divided streets. Left-side bike lanes offer advantages along streets with heavy delivery or transit use, frequent parking turnover on the right side, or other potential conflicts that could be associated with right-side bicycle lanes. The reduced frequency of right-side door openings lowers dooring risk. Left-Side Bike Lane Benefits include:

- Avoids potential right-side bike lane conflicts on streets.
- Improves bicyclist visibility by motorists by having the bike lane on the driver's side.
- Provides consistent facility configuration in locations where right-side travel lanes are subject to rush hour parking restrictions and other flexible uses.
- Minimizes door zone conflicts next to parking because of fewer door openings on the passenger side of vehicles.
- Fewer bus and truck conflicts as most bus stops and loading zones are on the right side of the street.

One embodiment identifies if a camera image contains a bike lane by applying one or more models for classifying the bike lane with a plurality of attributes. Attributes may include type of sign, text on the bike lane, color of the bike lane, limitations of the bike lane, etc. The classified attributes may be stored in the map describing the identified bike lane.

A depth map can be constructed from vehicle sensor data. The depth map contains a plurality of points displayed in two-dimensions wherein each point describes a distance of an exterior surface of a physical object from the detection and ranging sensor. Each point is translated into a position vector of the exterior surface of the physical object, for example in a direction of the position vector from the detection and ranging sensor. The system receives multiple depth maps and combines all translated position vectors to construct the map in three dimensions. For example, multiple LIDAR scans are merged into a point cloud that is a 3D mapping of all translated position vectors from the multiple LIDAR scans.

A depth map containing the bike lane is used to identify a subset of at least three points corresponding to the bike lane. In some embodiments, the planar fitting utilizes at least three points and likewise identifies the corresponding position vectors in the map. The planar fitting fits a plane in the map based in part on the position vectors in the map, the plane corresponding to a spatial position of the bike lane in the map.

The HD map can be information describing lanes including spatial location of lanes and semantic information about each lane. The spatial location of a lane can be the geometric location in latitude, longitude and elevation at high prevision, for example, at or below 10 cm precision. The semantic information of a lane can be restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of crosswalks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), among others.

The HD map also can be spatial 3-dimensional (3D) representation of the road and all physical objects around the road and can be represented as a 3D mesh geometry (collection of triangles) which covers the surfaces. In another embodiment, the HD map is a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

In one embodiment, the HD map does not require or rely on data typically included in maps, such as addresses, road names, ability to geo-code an address, and ability to computer routes between place names or addresses. The vehicle also accesses other map systems, for example, GOOGLE MAPs to obtain this information. Accordingly, a vehicle receives navigation instructions from a tool such as GOOGLE MAPs into a route and converts the information to a route based on the HD map information.

The online HD map divides a large physical area into geographical regions and stores a representation of each geographical region. Each geographical region represents a contiguous area bounded by a geometric shape, for example, a rectangle or square. In an embodiment, the online HD map divides a physical area into geographical regions of the same size independent of the amount of data required to store the representation of each geographical region. In another embodiment, the online HD map divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map determines the size of a geographical region based on an estimate of an amount of information required to store the various elements of the physical area relevant for an HD map. In an embodiment, the online HD map represents a geographic region using an object or a data record that can be various attributes including, a unique identifier for the geographical region, a unique name for the geographical region, description of the boundary of the geographical region, for example, using a bounding box of latitude and longitude coordinates, and a collection of landmark features and occupancy grid data.

The HD map stores data in a representation of a geographical region that allows for smooth transition from one geographical region to another as a vehicle drives across geographical region boundaries. Each geographic region has a buffer of a predetermined width around it. The buffer can be redundant map data around all 4 sides of a geographic region (in the case that the geographic region is bounded by a rectangle).

The HD map represents lane information of streets in HD maps. Although the embodiments described herein refer to streets, the techniques are applicable to highways, alleys, avenues, boulevards, or any other path on which vehicles can travel. The HD map uses lanes as a reference frame for purposes of routing and for localization of a vehicle. The lanes represented by the HD map include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map stores a representation of a network of lanes to allow a vehicle to plan a legal path between a source and a destination and to add a frame of reference for real time sensing and control of the vehicle. The HD map allows a vehicle to determine the lane that the vehicle is currently in, the precise vehicle location relative to the lane geometry, and all relevant features/data relative to the lane and adjoining and connected lanes. Features that are associated with the lane but may not be the closest features to the vehicle are stored as a lane-centric representation of data that represents the relationship of the lane to the feature so that the vehicle can efficiently extract the features given a lane.

The HD map represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map represents a lane element as a continuous geometric portion of a single vehicle lane. The HD map stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

The HD map identifies the location and type for every bike lane. To determine the type of sign, the HD map uses image based classification. This can be done by a human operator or automatically by deep learning algorithms. Once the sign is detected and classified from an image, the HD map knows the type. The HD map further determines the location and orientation of the sign with respect to the map coordinates. The precise coordinates of the sign are needed so an autonomous vehicle (AV) may accurately predict where the sign will be located in its sensor data so that it can validate the map's prediction of the world, detect changes to the world and locate itself with respect to the map.

One embodiment identifies if a bike lane contains a traffic sign by applying one or more models for classifying the traffic sign with a plurality of attributes. Attributes may include type of sign, text on the traffic sign, color of the traffic sign, limitations of the traffic sign, etc. The classified attributes may be stored in the map describing the identified traffic sign. According to an embodiment, the HD map places additional constraints on the created sign geometry after calculating the 3D points. Due to the ambiguity of pixels, possibly imprecise vertex labelling and other errors, the 3D sign geometry after projection onto the plane is irregular. The HD map enforces the geometry of the 3D sign to be both planar and geometrically constrained based on the sign type, for instance stop signs are constrained to be an octagon and a rectangular speed limit sign is constrained to have rectangular geometry. According to an embodiment, the HD map enforces these constraints for regular polygons by calculating the centroid of the points, then calculating the farther point away from the center and using that distance as the radius for a circle. The polygon is inscribed within the circle starting at the first vertex in the input list. Four sided signs have a different approach in that they select the top two point and bottom two points, then calculate the vector between the two top points and the vector between the two bottom points then take the average of this vector to represent the width. The HD map repeats the steps for the vectors going from top to bottom and then takes the cross product of these resulting vector to ensure that the vectors are orthogonal and then recomputes the corners. Embodiments perform sign feature creation for HD maps. The HD map performs the process of creating signs using the sign's vertices in image coordinates and projecting 3D points onto that image. The 3D points that project within the image bounding box created by the sign's vertices are considered sign points. These 3D points are used to fit a plane, wherein the HD map projects the sign's image vertices onto that 3D plane to find the 3D coordinates of the sign's vertices. At which point the HD map has all of the information to describe a sign: its location in 3D space, its orientation described by its normal and the type of sign produced from classifying the sign in the image.

Embodiments create 3D planar objects from imagery and lidar information. Accordingly, the HD map creates highly accurate 3D planar objects from one or more images and a sequence of one or more LiDAR scans of the area. The HD map uses merged point clouds through the combination of scans or subsections of an Occupancy Map to identify the precise location of the 3D planar objects. The HD map applies a correction for the rolling shutter effect, which allows the HD map to project 3D points accurately onto the image despite distortion produced by rolling shutter while capturing images while the camera is in motion. The HD map performs 3D scene filtering through the use of image projection and constrained depth search. The HD map uses constraints of the 3D sign geometry to compensate for the inaccuracy of image labelled coordinates.

The features in the map encode the semantic data and inaccurate feature data in the map is likely to cause errors in the navigation of the autonomous vehicle. Thus, a requirement of HD maps is that they maintain coordinates of all features with very high accuracy, for example, 5 cm accuracy at 1 sigma (standard deviation). To locate a sign using only image information with a stereo vision setup using a 1 m baseline, there can be as much as 15-20 cm error in depth accuracy at 10 m away from the camera. Therefore the HD map uses additional information to improve the accuracy of the sign features. LiDAR sensors are designed to accurately determine the distance to objects. Individual lidar points from a typical LiDAR scanner used for AV are in the range of +/−2 cm accuracy. Embodiments of the system use the lidar information to supplement the image information so that better accuracy can be achieved. The HD map operates on groups of 3D points and best fits a plane to further increase the accuracy, while constraining the overall 3D geometry of the resulting sign feature.

The overall process performed by the HD map for detecting sign features can be the following steps: (1.) Receive as input one or more images with labelled sign vertices (2.) Identify 3D points in the scene (3.) Identify the 3D points that belong to the sign (4.) Fit a plane to the 3D sign points (5.) Project image points onto the 3D plane.

The overall process performed by the HD map for detecting bike lane features can be the following steps: (1.) Receive as input one or more images with labelled sign vertices (2.) Identify 3D points in the scene (3.) Identify the 3D points that belong to the bike lane and/or sign (4.) Fit a plane to the 3D bike lane/sign points (5.) Project image points onto the 3D plane.

The camera captures the image, in which a portion of the image includes the entirety of the bike lane with or without traffic sign. The traffic sign is, for example, a stationary polygon which contains information regarding a route. Traffic signs may be differentiated according to various traffic sign types. Examples of types of traffic signs are regulatory signs (e.g., 'stop' sign, 'yield' sign, speed limit signs), warning signs (e.g., 'slippery when wet', 'winding road ahead', 'construction ahead'), guide signs (e.g. route marker signs, freeway signs, welcome signs, recreational signs), street signs, etc. Additionally, the image may contain metadata information, e.g., date, time, camera settings, etc. A portion of the image corresponding to the traffic sign is identified. As mentioned prior, the traffic sign is, for example, a stationary polygon such that it may be defined by its vertices. To identify the portion of the image corresponding to the traffic sign, an image classification model determines a location in the image that corresponds to the traffic sign. The image classification model also determines a polygon with minimal vertices which still encompasses the entirety of the traffic sign. In one or more embodiments, the image classification model utilizes a GAN neural network to partition the image and more effectively locate the portion of the image which corresponds to the traffic sign. Additionally, the image classification model could implement additional layers in its convolutional neural network for identifying text within the traffic sign. The image classification model may also identify whether or not the traffic sign is obscured by other objects in the image.

The system includes capturing a point cloud from a vehicle street view and converting the point cloud to a 3D model; applying a trained neural network to detect street signs, cross walks, obstacles, or bike lanes; and update a high definition (HD) map with the neural network output.

The system automatically detects and updates the HD map with the following. The obstacles include rock, construction, or semi-permanent structures on a street. The system can apply the neural network for detecting people or bicycles in the bike lane, detecting traffic lights. Text on the street can be detected and then converted into a rule, for example no crossing rule or stop. The system can detect the cross walk by detecting bars between two facing street sides. A concrete or painted street divider can be detected. The system includes detecting a street curb or railways on a street. The system can detect a transition zone from a street to grass or pavement and identifies the beginning of the lane by applying a minimum lane width as required by regulation. When parking areas are identified by detecting a series of white bars longer than a predetermined threshold (length of the smallest car), the system can update the HD map. A bike parking structure (such as a stand with a series of vertical wheel receiving bars) or markings for bicycles/motobikes can be detected. The system can detect pedestrians on a sidewalk as confirmation that the concrete is a sidewalk. The system can understand the environment around vehicle, as well as behaviors of people encountered. The system can formulate a response to the people and communicate with nearby people through audio or visual responses. When emergency actions require transgression into the bike lane or sidewalk where people may walk, the reasonableness of a vehicle transgression on a bike lane can be looked up through the HD map which analyzed similar vehicle actions at a similar location.

The method also includes receiving a depth map including the bike lane captured by a detection and ranging sensor. The depth map is a 2D map which can be a plurality of points with each point describing a distance of a physical object to the detection and ranging sensor. The detection and ranging sensor can be a light detection and ranging sensor (LIDAR) or a radio detection and ranging sensor (RADAR). The depth map includes one or more points which correspond to the bike lane. The detection and ranging sensor may actively filter out points in the depth map corresponding to moving objects The method additionally includes constructing a 3D map by mapping the depth map into 3D space. The plurality of points in the depth map describing distance is utilized to construct a 3D map of an environment of the vehicle. Each point of the depth map can be mapped as a position vector of an object from the detection and ranging sensor in the 3D environment map. The position of a point in the depth map describes a direction of a corresponding position vector from the detection and ranging sensor and the distance of the point describes a magnitude of the position vector. From the plurality of points, the 3D map can be constructed with each point of the depth map mapping to a 3D point as defined by the position vector in the 3D map. In additional embodiments, more than one depth map can be integrated into the 3D map. Points from each depth map are added into the 3D map to provide a more comprehensive 3D map of the environment.

In addition, the method includes identifying 950 a subset of at least three points in the depth map corresponding to the bike lane. Of all the points in the depth map, some points describe distances of the bike lane. To identify at least three points corresponding to the bike lane, there are various methods for quickness and effectiveness. In one or more embodiments, a bounding box in the depth map is determined by a transformation of the portion of the image to the depth map. The transformation from camera image to detection and ranging sensor depth map can be determined by taking an image and a depth map of a single object in an environment. The points in the depth map and the portion of the image all corresponding to the single object could be used to calculate the transformation from image to depth map or vice versa. In one or more embodiments, a frustum in the 3D map which contains the bike lane in the 3D map is determined based on a calculated minimum depth and a calculated maximum depth for the bounding box. The calculated minimum depth and the calculated maximum depth can be approximated from the size of the portion of the image corresponding to the bike lane. In some embodiments, the classification of the bike lane may be associated with dimensions of the bike lane, which the HD map 110 may recall to estimate approximate depth of the bike lane. For example, the image classification model determines the bike lane to be a stop sign such that the HD map 110 recalls a standard set of dimensions for stop signs. The standard dimensions in comparison with the size of the portion of the image can provide approximate distance of the sign from the image.

The frustum is a volumetric construct in the 3D map which helps filter out points in the 3D space not close to the bike lane thus would not correspond to the bike lane. The frustum is constructed so as to match the shape of the bounding box, e.g., a square frustum for a square bounding box or a circular frustum for a circular bounding box. In one or more other embodiments, a first method is used for identifying the subset of at least three points by first determining a minimum point in the depth map within the frustum. The first method then identifies other points in the frustum within a threshold depth. The first method selects at least three points determined to be within the threshold depth as the subset of at least three points in the bounding box corresponding to the bike lane. In one or more embodiments, a second method is used for identifying the subset of at least three points by first partitioning the bounding box into a plurality of cells. For each cell, the second method determines a minimum point in that cell. Then the second method calculates and selects one or more cells which have minimum points which are closest in proximity. The second method selects at least the three minimum points of the selected one or more cells as the subset of at least three points corresponding to the bike lane. Depth within a cell is set by a metric distance from the closest point within that cell.

The method also includes fitting a plane in the 3D map based at least in part on the subset of at least three points. The subset of at least three points corresponding to the bike lane are the basis to determine the plane in the 3D map which corresponds to where the bike lane resides spatially. With a subset of exactly three points, the HD map determines the plane which contains the three points. With a subset of more than three points, the HD map 110 may utilize a variety of fitting methods. One potential fitting method is a regression analysis. Another potential fitting method is random sample consensus (RANSAC). RANSAC is an iterative process which fits the plane by iteratively increasing influence of inliers in the subset of points while iteratively decreasing influence of outliers in the fitting process. Once the plane is established, it can be further reduced with the bounding box.

The method further includes projecting the identified portion of the image corresponding to the bike lane onto the fitted plane in the 3D map. Projecting the identified portion of the image corresponding to the bike lane onto the fitted plane in the 3D map takes the 2D image and places the 2D image onto the fitted plane. This can be done using various methods. In one potential projection method, the portion of the image corresponding to the bike lane can be projected through drawing a ray from the detection and ranging sensor through each individual pixel to determine an intersection of the ray with the fitted plane. The intersection is the projected position of that pixel. After repeating for all pixels of the portion of the image, all pixels are projected on the 3D map in the fitted plane for the bike lane. In some embodiments, only the image points corresponding to the sign vertices are projected. In other embodiments, all pixels of the sign image may be projected to obtain color information for the sign. The intersection is the projected position of that pixel. In one or more additional embodiments, there are one or more geometric constraints applied in the projected image for refining the projected image by fixing dimensions of the projected image. One geometric constraint may be determined by the shape of the identified bike lane. For example, the projected image may be distorted so as to fit a stop sign into a regular octagon by insuring the vertices are equidistant from a centroid point in the 3D map. The projected image in the 3D map may be further processed with color adjustments, sharpening, noise reduction, other image correction, etc.

To determine the 3D location of the bike lane, traffic light, and signs, the HD map determines the 3D geometry of the scene. Since a vehicle is scanning the world using LiDAR sensor(s), the HD map efficiently and accurately creates a 3D representation of the image scene. At each image sample there is an associated lidar scan. This scan may or may not contain enough data to capture a 3D representation of the sign. If there is enough information (at least 3 non-collinear points) on the sign then the HD map has enough data and can continue. If the HD map does not have enough data the HD map uses one of the following approaches. According to an embodiment, the HD map merges point clouds relative to the current sample. The HD map selects poses that are nearby and likely to contain the data points on the sign and merges the lidar scans at each of these poses into a single point cloud on which the system can operate. By using the LiDAR data, the HD map is able to identify the 3D location of sign features from monocular imagery. When the HD map merges multiple point clouds, the HD map ensures that samples are at least a certain distance apart to avoid redundant data points. The HD map also supports variable distances both forward and backward along a track for selecting the point cloud to merge. In an embodiment, the HD map computes the merged point cloud on the failure in a single point cloud due to inadequate amount of data or if the plane fitting did not meet certain criteria for orientation based upon the vertical component of the normal.

The 3D scene points typically contain a large number of points, with only a small selection of those points representing the sign. By knowing the transformation from the 3D LiDAR points to camera coordinates, the HD map performs a frustum check produced by the image bounding box and a minimum and maximum depth to filter the points. Using stereo images or by knowing the approximate real world size of the sign for a single image, the HD map produces the estimated minimum and maximum depth for the frustum. For the resulting points in the frustum the HD map uses the calibrated camera projection matrices to project the 3D points onto the image. According to another embodiment, the HD map projects all the points onto the image and checks whether or not the sign's 2D bounding box in the image contains the point. After the points outside of the image bounding box are filter out, the HD map processes points which may lie behind the sign in 3D but which project onto the same 2D space. The HD map filters out these points in a number of ways. According to an embodiment, the HD map selects the closest point in 3D and selects only other points which are close to this point. This works well for unoccluded signs which have a reasonable distance between its points and the points of any other object.

According to another embodiment, the HD map selects the closest point that falls into each 2D cell, where a 2D cell could be a pixel or any other larger or smaller 2D grid element. In some embodiments, the HD map uses 3D cells and selects the closest point that falls in each 3D cell. This selects only the front points of the sign as viewable from the image. This method is ideal in the case that the sign plane is complete with minimal noise in 3D, but LiDAR is sparse so there are holes where a farther away point could be selected and if there are many points of noise in front of the sign then this method will make a poor selection of points. The best method depends on the characteristics of the data which is dependent on the method of merging point clouds. Other embodiments use the first n-points for a cell, weight average of points for a cell and a hybrid combination of the max distance from the minimum point and some measure of selecting the first point.

A benefit of allowing arbitrary vertices to describe a sign rather than the tightest rectangular bounding box is that it allows for a superior segmentation of the LiDAR points. This method of filtering points using the image information is a more efficient approach to dealing with the large quantity of points as compared to most techniques that only use 3D point information. In an embodiment, the HD map performs a correction for rolling shutter cameras. In order to correctly project the 3D points onto the image, the HD map transforms the 3D coordinates of the points according to the image row that they would project on. The row of the image indicates at what time that point was captured by the image such that the HD map can shift it accordingly. This correction ensures that the 3D points correctly project onto the image.

In some embodiments, the HD map generates a lane element graph that represents a network of lanes to allow a vehicle to plan a legal path between a source and a destination. A lane element graph allows navigation of autonomous vehicles through a mapped area. Each lane element is associated with the traffic restrictions that apply to it such as speed limit, speed bump, and bike lanes and signals. A lane element graph represents the navigable road surface that is divided into lane elements, and includes connectivity among lane elements (e.g., where vehicles can go from current lane element) as well as semantic association between lane elements and features (e.g., speed limit in current lane element) to assist in on-vehicle routing and planning needs. The lane elements are topologically connected, and each lane element is known to its successors, predecessors, and left and right neighbors.

Lane elements are stored as pieces of a lane element graph. Within the lane element graph, individual lane elements are represented as nodes on the graph connected by edges to other nodes, representing neighboring lane elements of the graph. The edges connecting two lane elements indicate physical connection between two lane elements that a vehicle can legally traverse. For example, an edge between two lane elements may represent a dashed white line over which vehicles can change lanes, but may not represent a median over which vehicles not legally cross. In some embodiments, boundaries between lane lines over which cars cannot cross have a representation distinct from the above edges of the lane element graph. Additionally, within geographical regions, lane elements transition from a current lane element to a subsequent lane element. Similarly, crossing the boundary of two geographical regions and transitioning from the current geographical region to an adjacent one, the lane element of the current geographical region also transitions to the connecting lane element with the adjacent geographical region.

Lane cuts can be generated by analyzing lane lines and navigable boundaries. A lane line represents a boundary of a lane (e.g., explicitly marked by white and yellow stripes, or implicit paths). A lane line may be represented by a head control point, a tail control point, and a line segment. A control point may include a latitude, a longitude, and an altitude. A navigable boundary represents a boundary of navigable road surface and is one in which vehicles should not cross or go beyond these boundaries (e.g., curb edge, median edge, traffic island edge, etc.). A lane cut is generated where there is a topological change in the road network (e.g., an intersection, a split or a merge of lanes) or where there is a semantic change in the lane (e.g., a change in speed limit). A lane cut goes through the width of the road, cutting it into adjacent segments. A lane cut ends at a navigable boundary. The lane lines and navigable boundaries may be generated from received image frames from an imaging system mounted on a vehicle. Lane elements, also referred to as cells or LaneEls, have left and right edges that are defined by lane lines or navigable boundaries. Lane elements have a bottom and a top edge defined by lane cut segments. Lane elements have 0 or 1 left and right neighbors and 0 or more predecessor and successor neighbors. Each lane elements can be associated with features that only affect local lane elements (e.g., stop sign, yield sign, or traffic light). The HD map generates lane connectors for connecting lane elements together and indicating where a vehicle can go from a current lane element. In some embodiments, human operators can draw lane connectors between the lane elements at intersections to annotate their connectivity to create successor and predecessors for the lane elements. A lane element may be generated to represent a lane connector at an intersection, and the left and right edges of the lane element can be derived from the geometry of the lane connectors and the lane elements it connects. In one embodiment, the lane connector generates lane connectors using tracked trajectory of a data-collecting vehicle at an intersection. The tracked trajectory represents a known path through the intersection. The lane connector module can simplify the tracked trajectory to find a centerline for the lane connector. The lane connectors are produced from the previously traversed routes in a data collecting trip. In other embodiments, lane connectors are generated by using template matching. The lane connector can generate an intersection configuration dictionary or collection of known intersection configurations in the real world. All such intersection configurations can be added to the dictionary. Each configuration can be represented as a directed graph, with node being the lane elements drive into/out of the intersection, and edges are the lane connectors. Each node is labeled with diving restrictions. For example, a left-only lane element is labelled with "L", a lane element where car can either make a right turn or go straight cross the intersection is labelled with "RS". Edges are left/right neighbors and predecessor/successor relationships. The intersection of lane elements may already have some lane connectors inferred from tracked trajectory. The remaining lane connectors can be inferred by finding a best match to one configuration in the configuration dictionary. The lane connector generates lane connectors for the lane elements in the intersection based the known configuration that best matches the intersection. In one embodiment, human operators can qualify the result and may modify the lane connectors after they are automatically inferred for quality assurance.

The vehicle can use the HD map in generating a connected graph of lane elements. First, lane cut lines and navigable boundaries are generated from a plurality of received image frames from an imaging system mounted on a vehicle. Lane cuts are converted into lane cut segments across a single lane. For each lane cut segment, the boundaries of the lane element include the lane cut segment as a bottom edge of the lane element, a right and left edge of the lane element, and a top edge of the lane element. In one embodiment, the lane element graph module 470 (*i*) identifies two lane lines the lane cut segment intersects and (ii) a corresponding lane cut segment that the two lane lines intersect. In some embodiments, the bottom edge or the top edge may include two lane cut segments. In the case of a road split, the lane element graph module 470 (*i*) identifies two lane lines the lane cut segment intersects and (ii) two lane cut segments that the two lane lines intersect. The two lane cut segments are joined form the top edge of the lane element and the two lane lines are the right and left edge of the lane element. In the case of a road merge, the lane element graph module 470 (*i*) identifies one lane line the lane cut segment intersects, (ii) an neighboring lane cut segment where the lane cut segment does not intersect a lane line, (iii) a neighboring lane line the neighboring lane cut segment intersects, and (iv) a corresponding lane cut segment that the one lane line and the neighboring lane line intersect. The lane cut segment and neighboring lane cut segment are joined to form the bottom edge of the lane element, the one lane line and the neighboring lane line form the right and left edges of the lane element, and the corresponding lane cut segment is the top edge of the lane element. For each lane element, the lane element graph module 470 identifies 3608 successor lane elements. These successor lane elements of an intersection may be identified by tracking trajectory information of a data-collecting vehicle and connecting lane elements based on the tracked trajectory information. The successor lane elements may be identified by creating a collection of directed graphs from known intersection configurations with nodes being lane elements and edges being lane connectors. An intersection configuration of lane elements can be matched to a single directed graph out of the collection, the matching may be based in part on the lane elements of the intersection configuration including some identified successor lane elements based on the tracked trajectory information. The lane elements of the intersection may be connected based on the known intersection configuration in the directed graph. A high definition map of the local area can then be generated including the lane element graph for use in driving by one or more autonomous vehicles.

Lane Cut Generation

Features are everything on a map that is either drawn by operators or automatically generated. A feature can be a lane boundary, navigable boundary, or a lane element, as well as traffic lights, bike lanes, etc. Each feature may comprise a list of control points and an interpolation method. An interpolation method can be one of polyline, bezier curve, etc, which describes how to interpolate the geometry among the control points. Primary Features are features that are either drawn by operators, or a sign or lane boundary that is automatically generated. Primary features can also be automatically generated features that are further modified by human operators. For example, a lane cut or lane connector can be generated by automatic algorithms, but is later modified by a human operator during human curation. Examples of primary features are lane boundaries, crosswalks, stop lines, yield lines, traffic lights, and bike lanes. Derived features are features that are inferred and constructed from primary features. The properties of a derived feature depends on other features. In one embodiment, human operators are not allowed to directly add/modify derived features. An example of a derived feature type is a lane element. Primary features may include lane boundaries, navigable boundaries, lane cuts, lane connectors, and bike lane, signal, bumps, etc. Note that lane cuts may be drawn by users and may be primary features.

Lane cuts can be primary features. Lane cuts cut out a cross section of a road. Counting the intersections between a lane cut and the lane boundaries/navigable boundaries, all information of a road cross section can be inferred: how many lanes, what are the lanes directions, etc. A lane cut is needed whenever there are changes to roads: lane merging/splitting, upcoming intersection or junction, speed limit changes, speed bump. In some easy cases a lane cut can be automatically generated, for example, when a speed limit sign is encountered, shoot a ray orthogonal to the direction the sign is facing to produce a lane cut. In some complicated cases, such as lane merging, human operators may draw the lane cut precisely.

Lane connectors can be primary features. At intersections, roads become complicated and lane elements overlap. Lane cuts alone are not enough to describe the road connectivity. Assuming lane elements are generated until just before the intersections, lane connectors can be drawn by operators or automatically generated to describe how they are connected through the intersections.

In one embodiment, lane cuts are automatically generated. When lane cuts are automatically generated, lane cuts are not derived from raw image pixels or lidar points (e.g., lane boundaries and navigable boundaries may be derived from these features), but from lower level features such as lane lines and navigable boundaries. Having feature vectors instead of higher level features as input greatly reduces the complexity of detecting changes in road topology. However, the quality of input features has a greater impact on the quality of detected lane cuts as opposed to other automation tasks (e.g., lane lines, bike lanes that use raw image pixels or lidar points). If input lane line features are not well aligned to the road, have missing segments, or have extra pieces that do not exist, the output lane cuts will likely not be useful for generating a network graph.

A roundabout can be cut into segments with a lane cut to break it into several intersections. For example, a four-way roundabout will be cut into 4 T-intersections. Lane connectors can be drawn for each of the T-intersections. There may be other traffic marks painted on the road surface, some examples are 'bus lane', 'slow', 'keep clear' etc. A polygon feature can be created for each of these traffic marks such that it can be geometrically inferred which lane elements are affected by them. Roads can terminate in many ways, driveway, parking lot, cul de sac, dead end. For these cases, a final lane cut can be drawn in front of such road terminations and this lane cut may be marked with a special flag 'road termination'.

In alternate embodiments the lane line generation process identifies lane lines from photographic images using deep learning techniques and merges the lane lines from multiple images into a single lane. Mapping between the two-dimensional representations of lane lines and the three-dimensional representations is performed by implementing triangulation techniques using stereo images. In some embodiments, lane line merging in instances resembling an intersection is performed during the process of generating a single lane line rather than in reference to the generation of a complete route. Additionally, in some embodiments, information used to facilitate lane line generation in real-time as a car travels along a path.

Road Side Object Based Navigation

Figure 2D:
FIG. 2A shows an exemplary car electronic system.
FIG. 2C illustrates an exemplary navigation method applied to exemplary road objects in FIGS. 2D-2E to perform road side object identification or detection.
FIGS. 2F-2L show exemplary lane marking arrangements detectable using learning machines.
Figure 2E:

FIGS. 2C-2E illustrate exemplary navigation techniques with road side object identification or detection. Camera based sensors in FIGS. 2A-2B are great at lane detection when the weather is clear. However, during severe rain, fog or snow conditions, camera lane detection may not work well. Thus, during bad weather, the present system uses sonar and radar to detect road markers to guide the path of the vehicle when visibility is poor. In certain cases, the camera can capture nearby images of these road markers as well.

To supplement camera image recognition during fog or snow conditions, the system uses radar/lidar/sonar sensors to detect road side objects. Road side objects that can be recognized by the system includes Rumble Strips, but they have other names such as sleeper lines, growlers, or even woo woo boards. They can be raised or indented, i.e. cut into the asphalt or made of raised pieces of asphalt, or even plastic or metal strips or hobnails bolted to the road. They serve to provide both an auditory & tactile warning when driven over to alert the driver to an upcoming hazard or edge of the roadway/lane. In the US they are very common on the side of the highway or the centerline if there is no divider to warn drivers they're crossing out of their lane. If a driver dozes off and drifts out of lane, the noise and jolt will wake most people up. Ones that are set across the roadway are typically there to warn traffic of an upcoming hazard, such as an intersection, speed limit change, particularly on sections of road that have few interruptions where there is a high chance of highway hypnosis setting in. Other roadside objects include road reflectors which are small objects on the road that glow in the rain. These devices include road markers, street reflectors, road studs, traffic delineators, and pavement reflectors. "Cat's eye" refers to the original design, which was thought to resemble a cat's eyes shining in the dark. Road reflectors, which guide drivers by reflecting headlights, are used mainly on highways and secondary roads. However, they can also be found around shopping malls, residential subdivisions, municipal buildings, fire stations, and other locations. They also sometimes identify pedestrian crossing zones. One less well-known usage is marking the location of fire hydrants, which assists firefighters in responding to blazes at night. There are four primary road reflector colors and they each have a meaning: white reflectors are placed along white traffic lines; yellow reflectors are placed along yellow traffic lines; red reflectors tells drivers that they are going the wrong way up a one-way ramp or that they should not enter; blue reflectors mark fire hydrants. Other colors are used for other purposes. Snow-plowable road reflectors are specially designed to be able to deflect hits from snowplow blades. Their shape and metal casing help protect them from snowplows.

In one aspect shown in FIG. 2C, a method to navigate includes:

- detecting objects using a camera and a sensor to delimit boundaries of a road;
- creating a 3D model based on outputs of the camera and sensor; and
- navigating the road with a vehicle.

Implementations may include one or more of the following. The sensor can be lidar/radar/sonar sensors aimed on the bottom sides of the car to detect road side objects. The object can be grass on a side of the road. The object can be periodic depressions on a side of the road. The object can be a side rail on a side of the road. The object can be reflective panels on a side of the road. The object can be periodic street signs on a side of the road. The object can be a curvature on a side of the road. The object can be an incoming vehicle, or a vehicle traveling in the same direction as the current vehicle. The object can be a neighboring vehicle. The object can be road reflectors, raised pavement markers, or cat's eyes on a side of the road. The object can be rumble strips on a side of the road.

Object classification involves assigning a class label to LIDAR/sonar/radar returns, or as discussed below, to images, whereas object localization involves drawing a bounding box around one or more objects from sensor readings. Object detection combines these two tasks and draws a bounding box around each object of interest in the sensor output and assigns them a class label. As a preliminary matter, the road object recognition process performs feature extraction of the sensor reading of the road. Exemplary extractors are detailed below for road objects detected by LIDAR, sonar or radar sensors such as grass, side rail, or reflective panels, for example.

Turning now to extraction of road objects, one embodiment extracts as features the Radar Cross Section (RCS) of roadside objects for signature analysis. RCS is used to determine the amount of backscatter or energy an object directs back towards a receiver. The RCS is solely a characteristic of the scatterer which depends upon parameters such as object shape, orientation, frequency, polarization, and material properties, among others. The echo signal of the millimeter-wave radar contains two kinds of objects, the moving object with a certain Doppler speed and the stationary object with strong RCS energy. The stationary objects provide surrounding road information, such as road, guardrails, lamp posts and other information, which conventionally are treated as background noise and discarded. Since the target materials and the reflecting surfaces of the objects are different, the received RCS energy values are distinct. This feature can be used for distinguishing vehicles and roadside objects of interest by setting certain RCS energy thresholds. For example, road side guide posts have a unique RCS signature and it can be used to discriminate them from metal posts measurements of traffic signs. The RCS data is provided to a feature selection process to determine the number of features to be extracted. In one embodiment, an SVM is used to find the optimal number of features. Every iteration of the SVM is trained on 80% of the data and tested on the remaining 20%. When implementing feature selection algorithms and determining the optimal number of features, 20% of the data was set aside as the test set and the remaining 80% of the data was used in a 5-fold external stratified cross validation, where the data were split into training and validation sets. Once the optimal number of features is chosen, the original 80% is retrained and tested on the unused test set. Feature selection can be done using Fisher Score. The features are then sorted by score in which a threshold can be used to pick the desired number of features. Typically a higher F-score corresponds to better discrimination to separate the classes at that particular feature. Alternatively, a Relief-F method ranks each feature by a weight. After a number of iterations, the final vector is a vector of weights, where large positive weights correspond to more important features.

In another embodiment to generate training data, a generative adversarial network (GAN) is used to generate synthetic radar images for training. In GAN, two neural networks contest with each other in a game (in the sense of game theory, often but not always in the form of a zero-sum game). Given a training set, this technique learns to generate new data with the same statistics as the training set. For example, a GAN trained on radar or sonar or lidar images can generate new sensor images that look at least superficially authentic to human observers, having many realistic characteristics. The generative network generates candidates while the discriminative network evaluates them. The contest operates in terms of data distributions. Typically, the generative network learns to map from a latent space to a data distribution of interest, while the discriminative network distinguishes candidates produced by the generator from the true data distribution. The generative network's training objective is to increase the error rate of the discriminative network (i.e., "fool" the discriminator network by producing novel candidates that the discriminator thinks are not synthesized (are part of the true data distribution)). A known dataset serves as the initial training data for the discriminator. Training it involves presenting it with samples from the training dataset, until it achieves acceptable accuracy. The generator trains based on whether it succeeds in fooling the discriminator. Typically the generator is seeded with randomized input that is sampled from a predefined latent space (e.g. a multivariate normal distribution). Thereafter, candidates synthesized by the generator are evaluated by the discriminator. Backpropagation is applied in both networks so that the generator produces better images, while the discriminator becomes more skilled at flagging synthetic radar images. The generator is typically a deconvolutional neural network, and the discriminator is a convolutional neural network. GAN can also be used to recognize the roadside objects.

Next, learning machines for detecting the road side objects are discussed. One embodiment uses Faster Region-Based Convolutional Neural Networks, or R-CNNs, for addressing object localization and recognition tasks, designed for model performance. You Only Look Once, or YOLO, is a second family of techniques for object recognition designed for speed and real-time use. Faster R-CNN proposes and refines region proposals as part of the training process, referred to as a Region Proposal Network, or RPN. These regions are then used in concert with a Fast R-CNN model in a single model design to reduce the number of region proposals and accelerate the test-time operation of the model to near real-time. Fast RCNN architecture is comprised of two modules: Module 1: Region Proposal Network. Convolutional neural network for proposing regions and the type of object to consider in the region; and Module 2: Fast R-CNN. Convolutional neural network for extracting features from the proposed regions and outputting the bounding box and class labels. Both modules operate on the same output of a deep CNN. The region proposal network acts as an attention mechanism for the Fast R-CNN network, informing the second network of where to look or pay attention. RPN takes the output of a pre-trained deep CNN, such as VGG-16, and passing a small network over the feature map and outputting multiple region proposals and a class prediction for each. Region proposals are bounding boxes, based on so-called anchor boxes or predefined shapes designed to accelerate and improve the proposal of regions. The class prediction is binary, indicating the presence of an object, or not, so-called "objectness" of the proposed region. A procedure of alternating training is used where both sub-networks are trained at the same time, although interleaved. This allows the parameters in the feature detector deep CNN to be tailored or fine-tuned for both tasks at the same time.

In another embodiment, YOLO uses a single neural network trained end to end that takes a photograph as input and predicts bounding boxes and class labels for each bounding box directly. The technique offers lower predictive accuracy (e.g. more localization errors). YOLO model works by first splitting the input image into a grid of cells, where each cell is responsible for predicting a bounding box if the center of a bounding box falls within it. Each grid cell predicts a bounding box involving the x, y coordinate and the width and height and the confidence. A class prediction is also based on each cell. For example, an image may be divided into a 7×7 grid and each cell in the grid may predict 2 bounding boxes, resulting in 94 proposed bounding box predictions. The class probabilities map and the bounding boxes with confidences are then combined into a final set of bounding boxes and class labels.

As noted above, cameras can still be used to detect short range objects/symbols useful for navigation. For example, objects can include pavement markings which are used to convey messages to roadway users and to the camera and vision system. They indicate which part of the road to use, provide information about conditions ahead, and indicate where passing is allowed. Yellow lines separate traffic flowing in opposite directions. The autonomous vehicle is controlled to stay to the right of yellow lines. A solid yellow line indicates that passing is prohibited. A dashed yellow line indicates that passing is allowed. White lines separate lanes for which travel is in the same direction. A double white line indicates that lane changes are prohibited. A single white line indicates that lane changes are discouraged. A dashed white line indicates that lane changes are allowed. Further, the cameras capture symbols used to indicate permitted lane usages. A diamond indicates a lane reserved for use by high-occupancy vehicles. A bicycle indicates a lane reserved for bicyclists. Arrows show required or permitted movements at intersections. A row of solid triangles indicates that the road user must yield. Pavement markings are also used to alert the vehicle of potentially hazardous conditions ahead. A letter X with a letter R on each side indicates a highway-rail grade crossing ahead. A hollow triangle indicates a yield ahead. A series of progressively wider lines across a lane indicates a speed hump ahead.

Turning now to extraction of road markings or standardized road objects, lane markings are bands of a particular width painted on the roadway, most of the time in white. Hence, single image extractors are generally based on two kinds of characteristics: geometric and photometric. These criteria are generally combined in different ways, and used often partially, depending on the local extraction algorithm. Road feature extractors can be classified with respect to the kind of feature they rely on: geometric selection: segments; geometric and photometric selection: pair of positive and negative gradients, response to a convolution filter at a given scale, ridges at a given scale; photometric selection: light pixels, edges. One embodiment uses the positive-negative gradients extractor which is mainly based on a geometric selection with respect to feature width. The first approach consists in performing an inverse perspective mapping, to build a top-view image of the road. This algorithm processes each image line below the horizon independently, in a sequential fashion. It first selects positive intensity gradients with a norm greater than a given threshold. Then, the algorithm looks for a pair of positive and negative gradients fulfilling the width constraint. Contrasts being smooth in general, the positive-negative gradient algorithm may detect several beginning position associated to the same marking. To tackle this problem, the extractions are superimposed in an extraction map, of the same size as the image. Steerable filters are optimal for one marking width and are not able to tackle a large width range. One way of tackling the problem of non uniform lighting conditions in a thresholding algorithm is to use local statistics of the image intensity within a small neighborhood of the current pixel. If (x, y) is the current pixel position, and $I^-$ the local image intensity mean, the acceptance test is $I(x, y)>TG+I^-(x, y)$. To deal with perspective, the averaging is performed independently on each line, and the size of the image averaging decreases linearly with respect to the line height. All extracted pixels are saved in an extraction map and horizontally connected features wider than Sm(x) are selected as marking elements. This extractor mainly performs a photometric selection, followed by a partial geometrical selection. Symmetrical local threshold can be used. Every image line is processed independently in a sequential fashion. On each line at position x, it consists of three steps. First, for each pixel at position y, the left and right intensity averages are computed, i.e the image average. Second, given threshold TG, the pixels with intensity higher than TG are selected. Third, sets of connected pixels in the extraction map wider than Sm(x) are considered as marking elements. The processing of color images consists in first applying any of the previously described algorithms separately on each color channel and then, combining the three obtained extraction maps using a logical "and". Next, learning machines for detecting the road side objects from images and cameras such as the Faster Region-Based Convolutional Neural Networks, or R-CNNs, or YOLO can be used for object recognition from camera images.

Figure 2F:
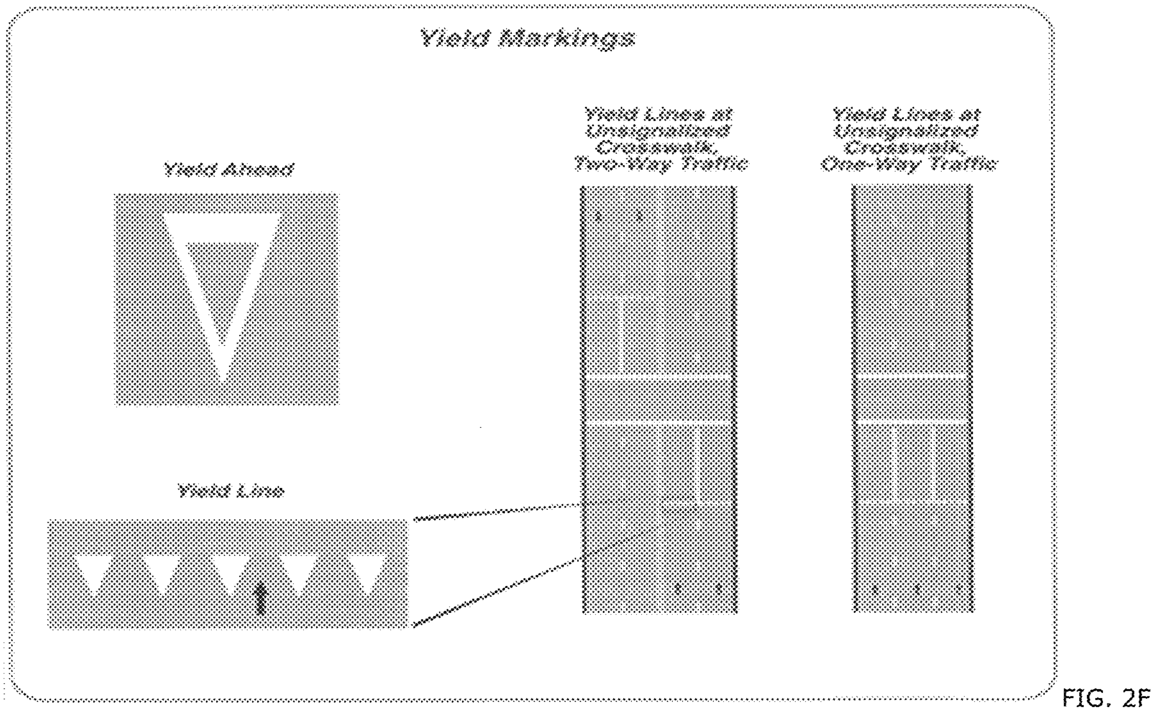

The learning machines are trained to recognize yield markings as follows. In the embodiment shown in FIG. 2F, the learning machine is trained to recognize the "Yield Ahead" marking which has a white, open outline isosceles triangles pointing toward approaching traffic. The "Yield Lines" figure shows a row of five solid white isosceles triangles. A black arrow shows the direction of travel, which is toward the points of the triangles. The "Yield Lines at Unsignalized Crosswalk, Two-Way Traffic" has a roadway with two lanes traveling in each direction, with opposing directions separated by a solid double yellow line. The lanes in the same direction are separated from each other by a broken white line. A crosswalk is denoted by two parallel solid white lines crossing all approaching lanes. On both sides of the crosswalk, a yield line of solid white isosceles triangles is shown across the approach lanes where the sign is placed. The "Yield Lines at Unsignalized Crosswalk, One-Way Traffic" has a roadway with three eastbound lanes separated from each other by a broken white line. A crosswalk is denoted by two parallel solid white lines crossing all lanes of the roadway. A yield line of solid white isosceles triangles may be shown across the three lanes where the signs are placed. FIG. 2G shows the patterns recognized by the learning machine on work zone pavement markings. The "Lane Closure on Two-Lane Road Using Traffic Control Signal" scenario shows a vertical two-lane roadway with one lane of traffic in each direction. Downward-pointing black arrows in the left lane and upward-pointing arrows in the right lane denote the direction of traffic. The opposing lanes are shown separated by a broken yellow line. A shoulder is shown to the right of each travel lane. The shoulders are shown separated from the travel lanes by a solid white line. A temporary white stop line is shown on the pavement extending across the northbound lane. In advance of the stop line, a solid yellow line is shown on the pavement to the right of the broken yellow line. A series of orange squares, denoting channelizing devices, is shown. The devices are shown beginning at the far right edge of the right shoulder and tapering to the white line separating the shoulder from the right lane. A black circle-and-arrow symbol, denoting a traffic signal, is shown at the right side of the shoulder facing oncoming northbound traffic, and another is shown opposite it in the middle of the left shoulder of the southbound lane, also facing northbound traffic. Beyond the signal, the channelizing devices are shown continuing to taper to the left to the broken yellow line separating the two lanes. The devices then are shown continuing in a straight line along the broken yellow line and to the left of the work space in the right lane, denoted by a vertical rectangle with diagonal black and white stripes. Another taper area is shown beyond the work space, where the channelizing devices are shown tapering back from the broken yellow line to the right edge of the right lane. Temporary pavement marking is shown along the length of the channelizing devices from the right edge of the pavement at the south end adjacent to the traffic signal symbol to the end of the taper at the left edge of the shoulder on the north end. The marking is shown as a solid white line to the left of the devices. Beyond the taper, a traffic signal symbol is shown on the right shoulder facing southbound traffic, and another is shown opposite it in the middle of the left shoulder of the southbound lane, also facing southbound traffic. The "Half Road Closure on Multi-Lane High Speed Highway" scenario shows a vertical four-lane highway with two lanes of traffic in each direction. Downward-pointing black arrows in the two left lanes and upward-pointing arrows in the two right lanes denote the direction of traffic. The opposing lanes are shown separated by a solid double yellow line. A shoulder is shown to the right of each right travel lane. The shoulders are shown separated from the travel lanes by a solid white line. The two lanes in each direction are shown separated from each other by a broken white line. A series of orange squares, denoting channelizing devices, is shown beginning at the far right edge of the right shoulder and tapering to the left to the white line separating the shoulder from the right lane. A series of channelizing devices is shown along the solid double yellow line and continuing past a horizontal rectangle with diagonal black and white stripes, denoting a work space. The channelizing devices are shown beginning to taper to the left again to the center of the roadway. The devices then are shown continuing straight along the center of the roadway to the left of the work space. White edge line is shown just to the left of the devices as they taper and continues straight. A double yellow line is also shown tapering to the left to the center of the southbound lanes, then running vertically to a point slightly beyond the work space. From this point, a single yellow line is shown tapering back to the middle of the roadway. Continuing straight along the broken white line through an undimensioned buffer space labeled optional, joining the devices from the original solid double yellow line, continuing past the work space in the northbound lane, tapering to the left again to the solid double yellow line, and then continuing straight along the line until they are opposite the arrow panel in the northbound lane.

Next, the learning machine detects Lane Shift on Freeway. The "Lane Shift on Freeway" configuration has one side of a vertical freeway with three lanes. Upward-pointing black arrows in each lane denote the direction of traffic. The lanes are shown separated from each other by broken white lines. Left and right shoulders are shown outside the lanes. The left shoulder is shown separated from the left lane by a solid yellow line. The right shoulder is shown separated from the right lane by a solid white line. One-third from the bottom of the figure, a series of orange squares denoting channelizing devices is shown beginning and tapering from the left edge of the left shoulder to the left edge of the solid yellow line between the shoulder The yellow edge line is shown extending from the solid yellow edge line and angling upward toward the right, shifting the left travel lane to the right one lane. The yellow edge line is shown extending vertically past a series of closely spaced white rectangles, representing temporary barriers, and a vertical rectangle with diagonal black stripes, representing a work space. The yellow edge line then is shown angling upward to the left for a rejoin with the solid yellow edge line. Two solid single white lines are following exactly the same pattern. They are shown as extensions of the two normal broken white lane lines and the white edge line and are shown shifting the normal middle and right lanes one lane width to the right. Above the channelizing device closest to the left edge of the shoulder, a series of closely spaced channelizing devices is shown continuing the row of channelizing devices that taper the shoulder by extending upward from the solid yellow edge line at an angle to the right edge of the left lane. The channelizing devices are shown on the left side of the temporary yellow edge line and continuing along that line to the beginning of the work space. The work space is shown straddling the left shoulder and the closed left travel lane. From the end of the work space, a series of channelizing devices is shown tapering to the left to the left edge of the shoulder, which is opposite the point where the lane shift to the left is shown ending.

Figure 2H:
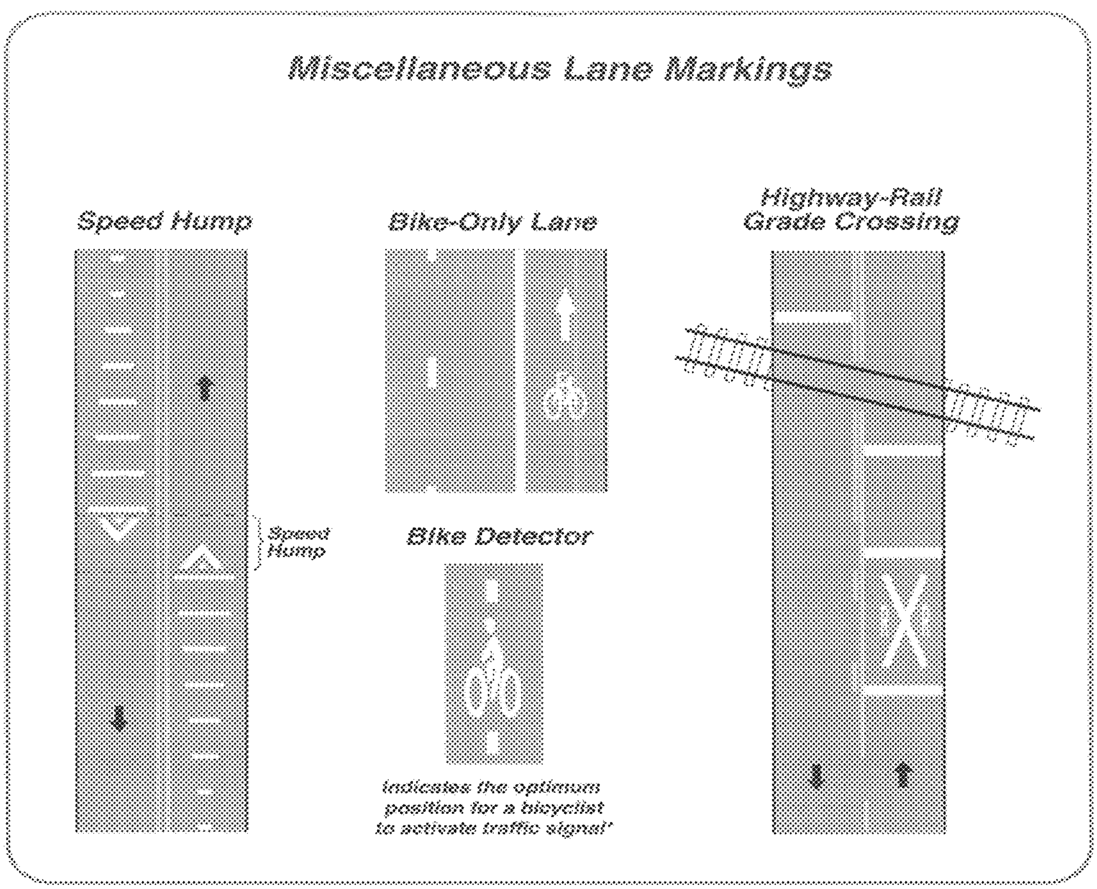
Figure 2G:
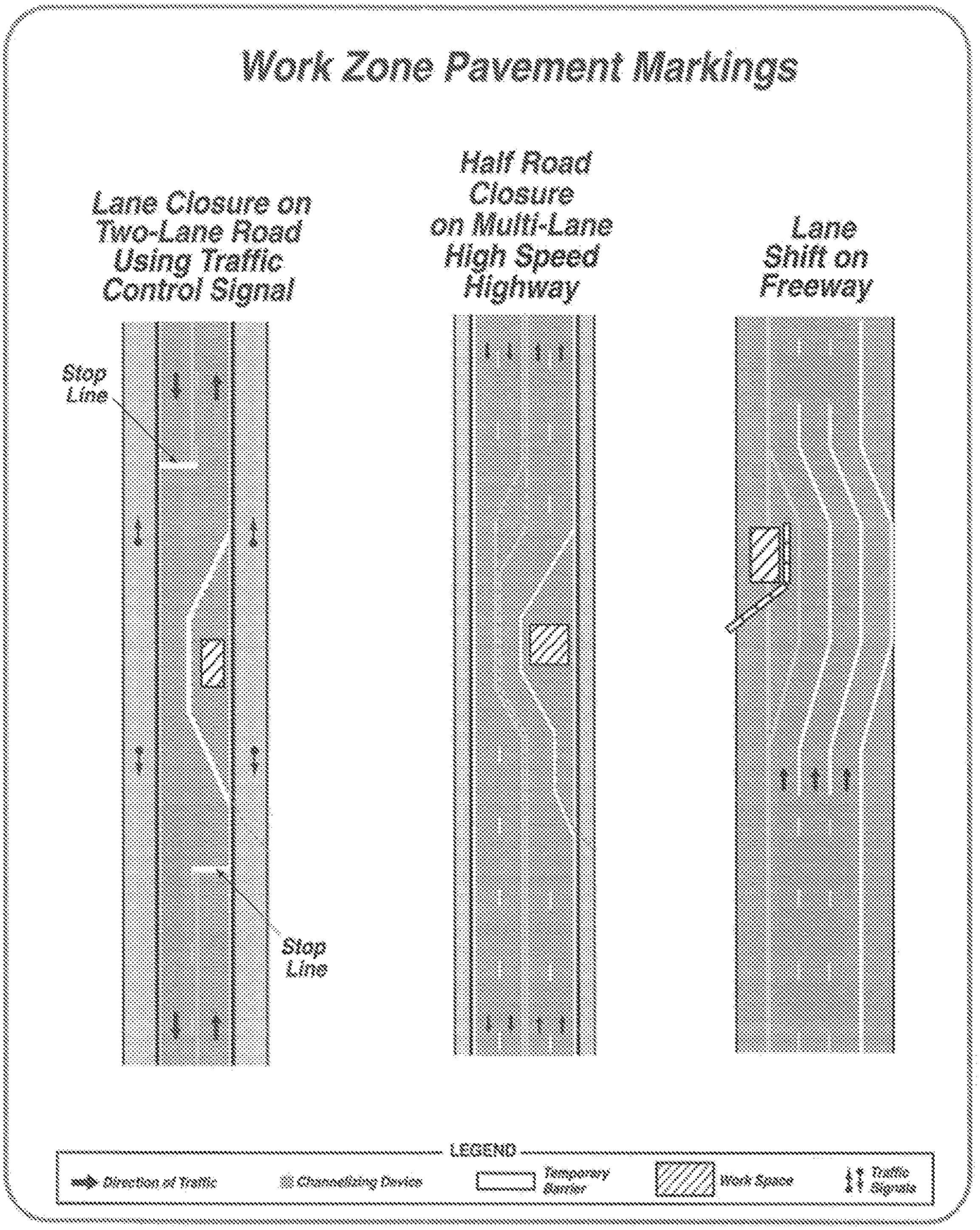

The learning system can identify various miscellaneous lane markings shown in FIG. 2H. The "Speed Hump" arrangement shows a vertical two-lane roadway is shown. Arrows show that the direction of travel is one lane in each direction. A solid double yellow line separates the two lanes. In the middle of the figure, a speed hump is shown with white speed hump markings for each of the two lanes, with the base of the "v" for each direction shown at the near edge of the speed hump and the point of the "v" for each direction at the center of the speed hump. In each direction, a series of eight white horizontal lines is shown on the pavement, each centered on the centerline of each travel lane. The "Bike-Only Lane" arrangement shows a vertical section of a roadway. A vertical solid normal white line is shown. separating two adjacent lanes of traffic. In the rightmost of these two lanes, a white symbol of a bicycle is shown marked in the center of the lane in advance of a white forward-pointing vertical arrow shown marked in the center of the lane. The "Bike Detector" arrangement shows a vertical symbol of a person wearing a helmet riding a bicycle with a vertical line segment above the symbol and one below it. The "Highway-Rail Grade Crossing" arrangement shows a segment of a vertical two-lane roadway. At the top of the figure, a symbol of a railroad track is shown, placed diagonally across the roadway at an acute angle, slanting from the northwest on the left to the southeast on the right. A legend shows a black arrow indicating the direction of travel. Black arrows on the roadway show the direction of travel as one lane in each direction. At the top of the figure, the opposing lanes are shown separated by a solid double yellow line. At the bottom of the figure, the opposing lanes are shown separated by a broken yellow line to the left of a solid yellow line. At the bottom of the figure, a horizontal white line is shown extending across the right lane. Beyond the horizontal white line, a "RXR" pavement marking symbol and another horizontal white line are shown. Beyond the "RXR" marking, a horizontal white line is shown extending across the right lane in advance of the railroad track.

Figure 2I:
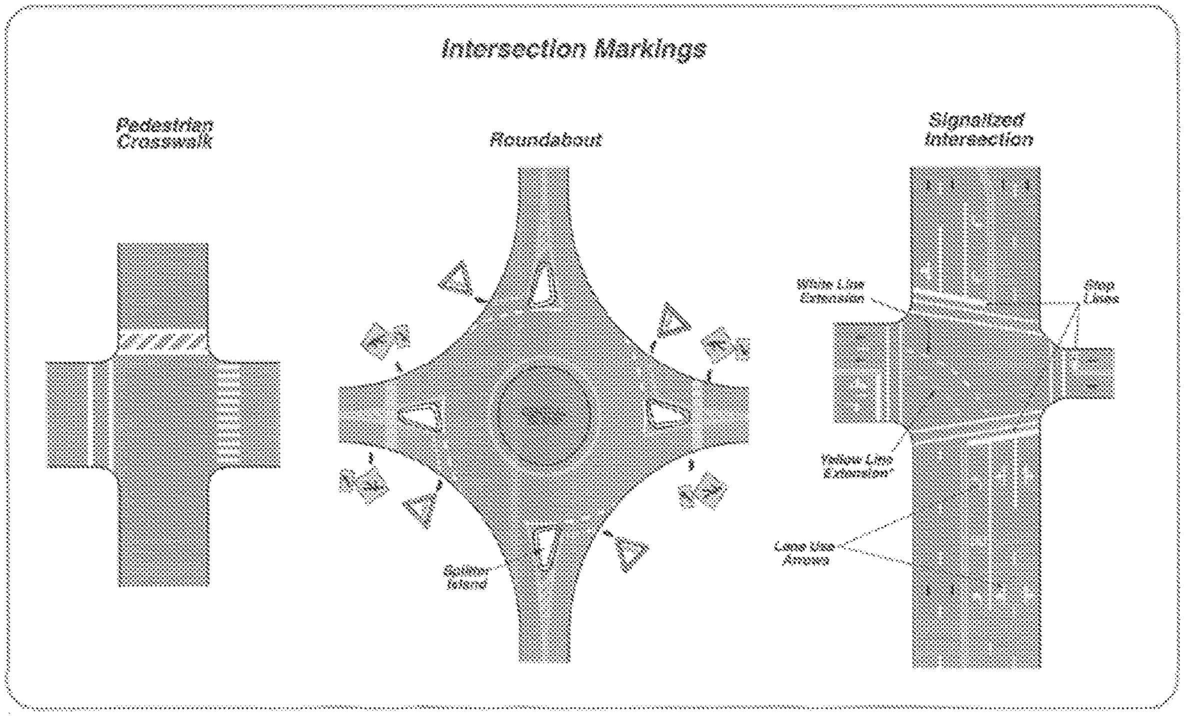

The system can detect intersectional markings such as those of FIG. 2I. The "Pedestrian Crosswalk" arrangement shows three styles of crosswalk markings shown at a roadway intersection. On the west side of the vertical roadway, a crosswalk is shown marked at the intersection with two parallel solid white lines. On the east side of the horizontal roadway, a crosswalk is shown marked at the intersection with solid white diagonal lines between two parallel solid white lines. On the east side of the vertical roadway, a series of closely spaced solid white lines are shown placed at the intersection parallel to the direction of travel. A note states that the spacing of the lines is selected to avoid the wheel path of vehicles. The "Roundabout" arrangement illustrates examples of markings for roundabout intersections with one-lane approaches. The figure shows a central island surrounded by a circular roadway. A solid yellow line is shown around the inner edge of the circular roadway. Four roadways enter the roundabout from the north, south, east, and west. Each roadway is a two-lane road with one lane in each direction. A triangular splitter island separates the two lanes of each road where it intersects the circular roadway. Around the outer edge of the circular roadway, a solid white line is shown adjacent to each of the four splitter islands, a dotted white line is shown adjacent to each of the four entering lanes, and no line is shown adjacent to each of the four exiting lanes. On each of the four roadways entering the roundabout, the opposing directions of travel are separated by a solid double yellow line. As each roadway approaches the splitter island, the two solid yellow lines diverge to go alongside the two sides of the splitter island and diagonal yellow lines are shown in the area between the two diverging solid yellow lines and the near end of the splitter island. On the roadways entering the circular roadway from the north and south, a yield line of white triangles is marked on the pavement across the lane of traffic entering the circular roadway in advance of and parallel to the dotted white line. A yield sign is shown on the right of both entering lanes alongside the yield line. On the roadway entering the circular roadway from the west, a crosswalk of two parallel white lines is shown immediately west of the splitter island, and the solid yellow lines and yellow diagonal lines are omitted within the crosswalk. On both the eastbound and westbound side of this roadway, a sign assembly composed of a diamond-shaped person walking sign placed over a leftward/downward diagonal arrow sign is shown on the right of the roadway just in advance of the crosswalk. Where the eastbound lane enters the circular roadway, a yield line of white triangles is shown on the pavement in advance of and parallel to the dotted white line. A yield sign is shown on the right of the entering lane alongside the yield line. On the roadway entering the circular roadway from the east, a crosswalk of a row of closely spaced white lines parallel to the flow of traffic is shown immediately in advance of the splitter island, and the solid yellow lines and diagonal yellow lines are omitted within the crosswalk. On both the eastbound and westbound side of this roadway, a sign assembly composed of a diamond-shaped person walking sign placed over a leftward/downward diagonal arrow sign is shown on the right of the roadway just in advance of the crosswalk. Where the westbound lane enters the circular roadway, a yield line of white triangles is marked on the pavement in advance of and parallel to the dotted white line. A yield sign is shown on the right of the entering lane alongside the yield line. The "Signalized Intersection" arrangement shows a vertical five-lane roadway. Arrows show that the direction of travel is two lanes of through traffic in each direction and a center lane used for left turns in opposing directions. A horizontal roadway is shown intersecting the vertical one. Arrows show that the direction of travel is two lanes in each direction on the left side of the intersection and only one lane in each direction on the right side of the intersection. A solid double yellow line is shown separating lanes in opposing directions. Crosswalks are shown by parallel white lines across all four corners of both roadways. Wide solid white stop lines are shown in advance of the crosswalks. On the vertical roadway, the center left-turn lane is shown separated from the adjacent through lane in the same direction by a solid white line. On the south side of the intersection on the vertical roadway, the double yellow line to the left of the left-turn lane and the solid white line on the right of the left-turn lane are shown extending into the intersection (starting beyond the crosswalk on the south side of the intersection) as single broken yellow and broken white lines, respectively. They are shown curving to the left to proscribe a path leading into the leftmost westbound through lane of the horizontal roadway (ending at the crosswalk on the west side of the intersection). On the south side of the vertical roadway, white left-turn arrows are shown in the left-turn lane, combined left-turn and through arrows are shown in the middle lane, and combined right-turn and through arrows are shown in the right lane. The left-turn arrows are shown required where through lane becomes mandatory turn lane, and the word "ONLY" marked in the left-turn lane. The combined right-turn and through arrows are marked as optional. The yellow and white line extensions through the intersection are denoting that they may be solid or dotted lines. Left-turn arrows and combined right-turn and through arrows on the north side of the intersection on the vertical roadway are denoted as optional. On the horizontal roadway, on the west side of the intersection, two lanes in the eastbound direction are shown separated with a solid white line, one with combined left-turn and through arrows marked as optional, and one with a right-turn arrow. A legend shows a black arrow indicating the direction of travel on the roadway, to show that arrows are required where a through lane becomes a mandatory turn lane. FIG. 2J shows the "Two-Lane Roadways" Passing Permitted which is a two-way marking with passing permitted in both directions." A two-lane roadway is shown with a centerline marking of a broken yellow line. Arrows show that the direction of travel is one lane in each direction. No Passing Zones and Edge Lines is a two-way marking with no-passing zones. A two-lane roadway is shown with centerline markings of (from the top to the bottom of the figure): a single broken yellow line; a solid yellow line adjacent to the left lane and a broken yellow line adjacent to the right lane; a double solid yellow line; a broken yellow line adjacent to the left lane and a solid yellow line adjacent to the right lane; and a single broken yellow line. In the middle of the figure, each section of solid yellow line, this overlaps in the section having a double solid yellow line. A solid white line is marked on the outside edge of each lane. Arrows show that the direction of travel is one lane in each direction. The "Multi-Lane Roadways" arrangement shows a Without Left Turn Lanes is a four-lane roadway is shown. Arrows show that the direction of travel is two lanes in each direction. The roadway has a centerline marking of a solid double yellow line. A broken white line separates lanes traveling in the same direction Channelized Left Turn Lanes is a five-lane roadway is shown with the fifth, center lane used for left turns. Arrows show that the direction of travel is two through lanes in each direction and left turns from the center lane. The roadway has markings of a solid double yellow line and alternating left turn channels marked with a solid white line to separate the turn lane from through traffic lanes traveling in the same direction. The turn lanes have optional white left-turn arrows marked on the pavement. A broken white line separates through lanes traveling in the same direction. Two-Way Left Turn Lane in Center is vertical five-lane roadway is shown. Black arrows show that the direction of travel is southbound in two left lanes and northbound in two right lanes. A fifth lane is in the center. A solid white line is marked on the right edge of each side of the roadway. Along the entire length of the figure (except within intersections), a broken white line separates the two southbound through lanes and a broken white line separates the two northbound through lanes. The innermost southbound through lane is separated from the center lane by a solid yellow line. A broken yellow line is east of it just inside the center lane. Another broken yellow line is on the east side of the center lane adjacent to a solid yellow line separating it from the innermost northbound through lane. A horizontal street is shown intersecting the vertical roadway. South of this intersection, the markings separating each of the lanes are shown continuing in the same pattern as north of the intersection. In the center lane, a white left-turn arrow is shown curving to the south and east. Just beyond it, another white left-turn arrow is shown curving to the north and west. Just south of these arrows, the broken yellow lines in the center lane are not shown. After a short distance, a second solid yellow line is shown adjacent to the solid yellow line separating the center lane and the innermost northbound through lane. Beyond this point, a solid white line is shown separating the center and the innermost southbound through lane, and a white left-turn arrow is shown in the center lane, curving to the south and east. Just below the left-turn arrow, an intersection is shown of the vertical roadway with a horizontal street. South of this intersection, another white left-turn arrow is shown in the center lane, curving to the north and west. South of the intersection, a solid double yellow line separates the center and the innermost southbound through lane, and a solid single white line separates the center and the innermost northbound lane. The system can also handle a Three-Lane Roadways displaying Passing Permitted in Direction Having Single Lane, Passing Prohibited in Direction Having Signal Lane, Travel Direction Changing in Center Lane, and Reversible Center lane. The "Three-Lane Roadways" arrangement shows Passing Permitted in Direction Having Single Lane is a two-way marking with passing permitted in single-lane direction. A three-lane roadway is shown with arrows indicating the direction of travel as a single lane traveling south and two lanes traveling north. A broken yellow line is shown adjacent to the southbound lane, and a solid yellow line is shown adjacent to the leftmost of the two northbound lanes. A broken white line is shown separating the two northbound lanes. A solid white line is shown on the outer edge of the southbound lane and the rightmost northbound lane. Passing Prohibited in Direction Having Single Lane is a two-way marking with passing prohibited in single-lane direction." A three-lane roadway is shown with arrows indicating the direction of travel as a single lane traveling south and two lanes traveling north. A solid double yellow line is shown separating the southbound lane from the leftmost northbound lane. A broken white line is shown separating the two northbound lanes. A solid white line is shown on the outer edge of the southbound lane and the rightmost northbound lane. Travel Direction Changing in Center Lane is a vertical three-lane roadway is shown. A solid double yellow line is shown separating each lane from the others. Two southbound lanes are shown transitioning to one lane. A solid double yellow line is shown separating each lane from the others. A solid double yellow line is shown adjacent to the southbound lane. From the bottom of the figure, two northbound lanes are shown transiting to one lane. A solid yellow line is shown adjacent to the northbound lane in this taper. The taper is shown the Buffer Zone in the end of the southbound and northbound lane. Reversible Center Lane is a vertical three-lane, two-way roadway is shown. Arrows show that the direction of travel in the left lane is southbound, the right lane is northbound, and the center lane can be either. Broken double yellow lines are shown separating the lanes from each other. A legend shows a black arrow indicating the direction of travel in the lanes.

Figure 2K:
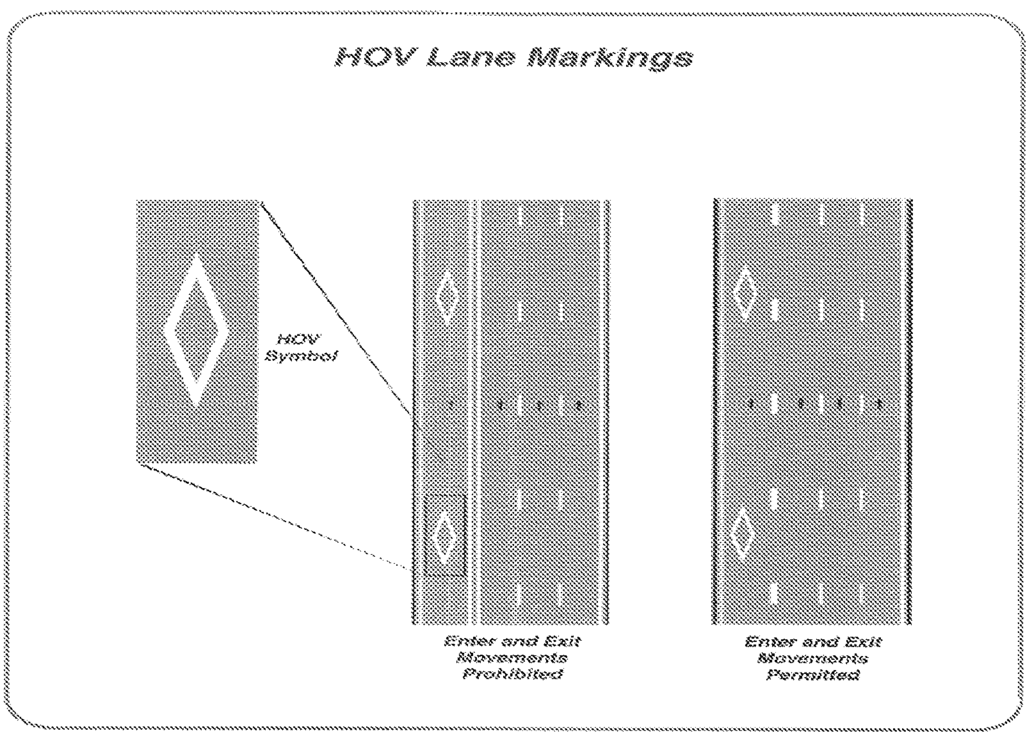
Figure 2J:
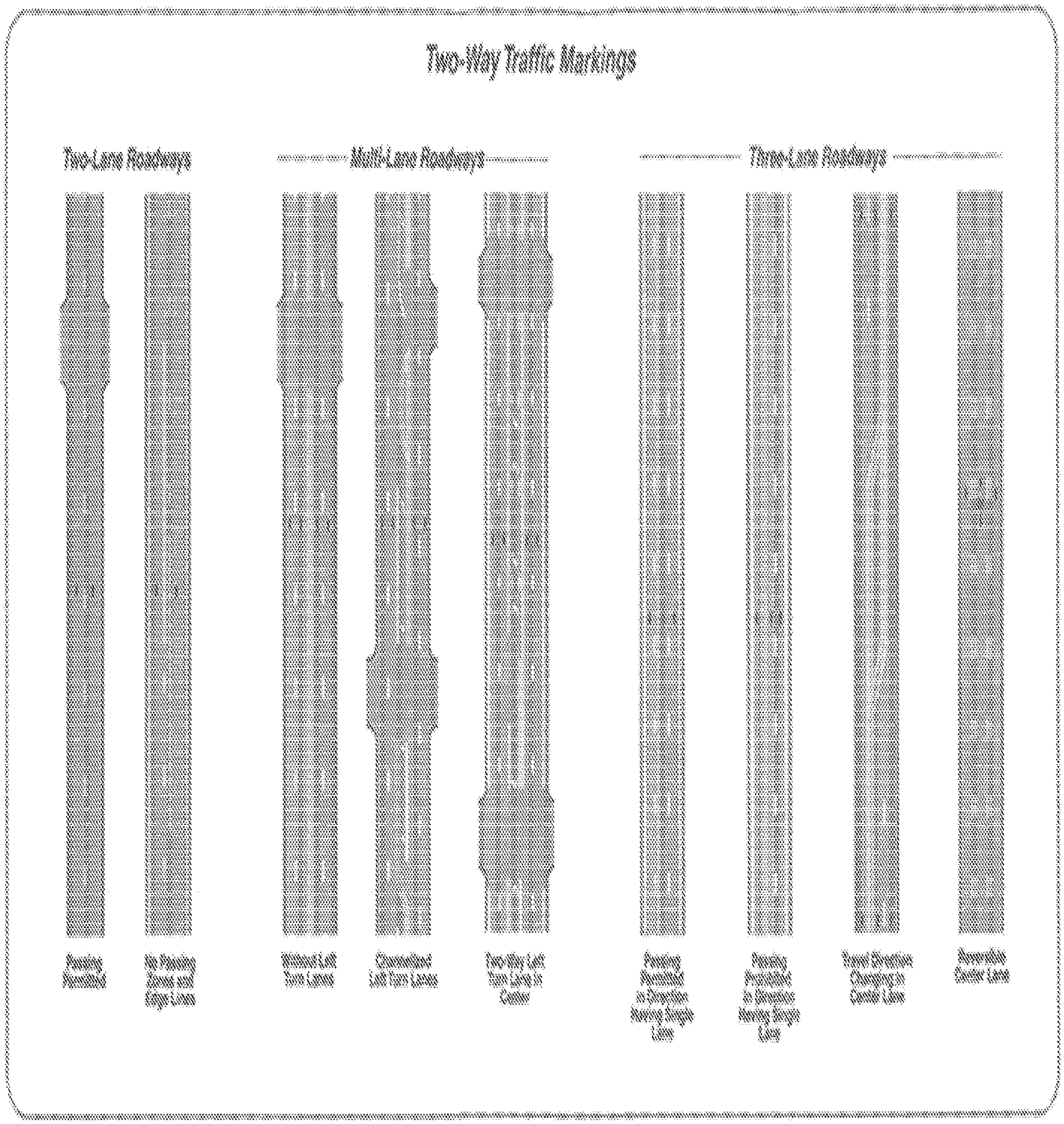

FIG. 2K shows an arrangement detected by the learning system as HOV lane markings. The "HOV symbol" is a white lines formed in a diamond shape symbol. The "Enter and Exit Movements Prohibited" arrangement shows full-time concurrent lane(s) where enter/exit movements are prohibited. One preferential lane is shown as the leftmost lane of a total of four lanes on the roadway. Two HOV symbol are shown in the left side of this lane. It is separated from the adjacent non-preferential lane by a double solid wide white line. The solid yellow line on the left edge of the roadway is noted as "Double yellow if centerline of 2-way roadway." The "Enter and Exit Movements Permitted" figure shows concurrent lane(s) where enter/exit movements are permitted. One preferential lane is shown as the leftmost lane of a total of four lanes on the roadway. A double asterisk denoting an applicable symbol or word is shown in the center of this lane. It is separated from the adjacent non-preferential lane by a single broken wide white line. The solid yellow line on the left edge of the roadway is noted as "Double yellow if centerline of 2-way roadway."

Figure 2L:
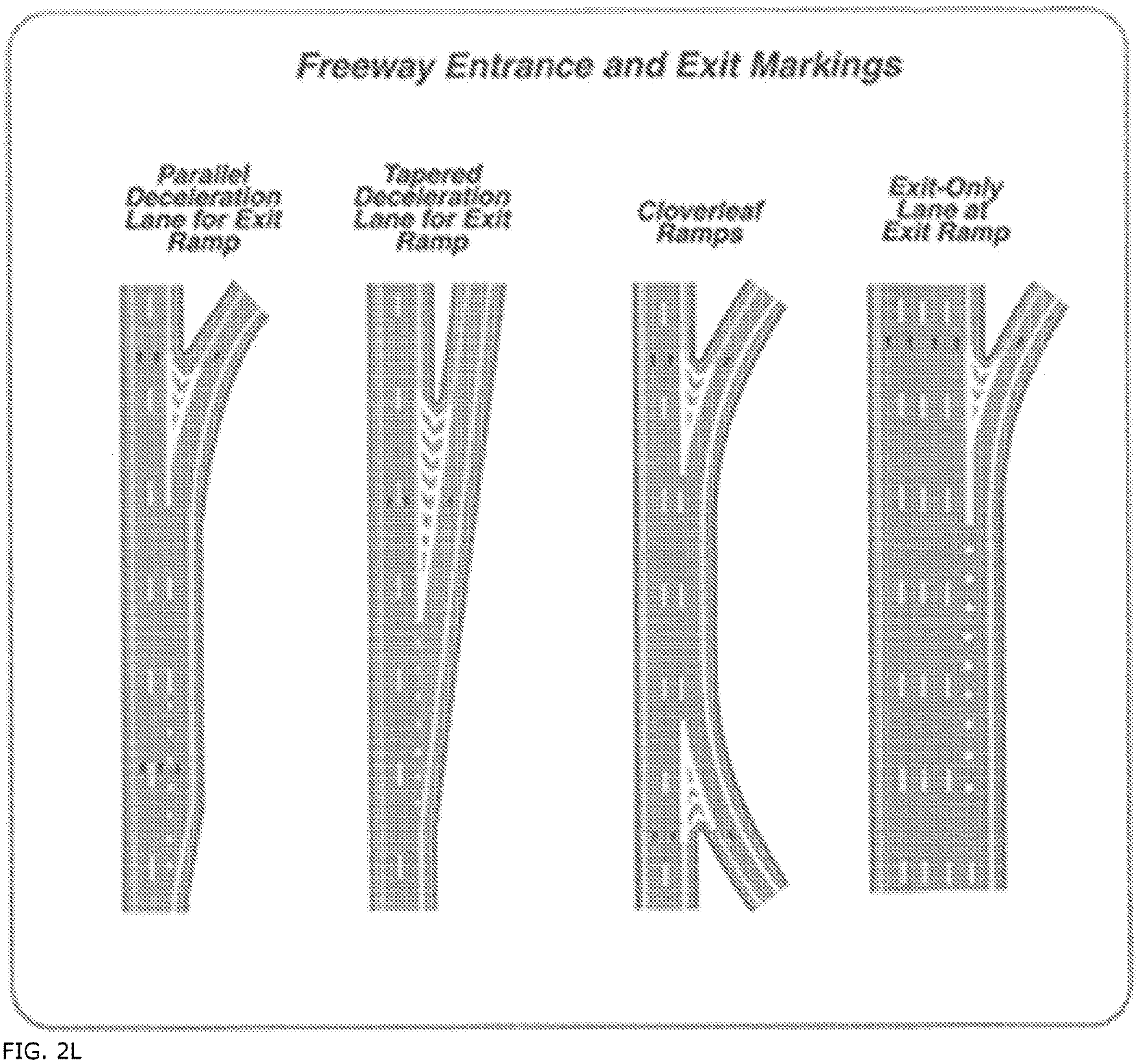

FIG. 2L shows exemplary Freeway Entrance and Exit Markings that are recognized by the learning systems. The "Parallel Deceleration Lane for Exit Ramp" arrangement shows the two lanes of one direction of a divided highway. Arrows indicate that the direction of travel is from the bottom of the figure to the top. A solid yellow line is to the left of the left most through lane, a solid white line separates the rightmost travel lane from the right shoulder, and the through lanes are separated from each other by a broken white line. Near the bottom of the figure, a deceleration lane is added to the right of the two through lanes, leading to a right exit ramp. The deceleration lane runs parallel to the through lanes and is separated from them by a dotted and then broken white line. A broken lane markings for one-half length of full-width deceleration lane and optional dotted extension of lane line. At the theoretical gore point, the broken white line becomes wide solid white "channelizing lines" that then becomes a white triangle in front of the gore.

The exit ramp curves away to the right. A legend shows a black arrow indicating the direction of travel in the lanes. The “Tapered Deceleration Lane for Exit Ramp” arrangement shows the two lanes of one direction of a divided highway. Arrows indicate that the direction of travel is from the bottom of the figure to the top. A solid yellow line is to the left of the leftmost through lanes, a solid white line separates the rightmost travel lane from the right shoulder, and the through lanes are separated from each other by a broken white line. Near the bottom of the figure, a deceleration lane is added to the right of the two through lanes, leading to a right exit ramp. The tapered deceleration lane immediately angles away from the through lanes and is separated from them by a dotted white line. A note shows this as an “optional dotted extension of right edge line. At the “theoretical gore point, the dotted white line becomes wide solid white “channelizing lines” and another wide solid white line angles off along the left edge of the exit ramp, forming an elongated white triangle in front of the gore. The exit ramp angles off to the right. A legend shows a black arrow indicating the direction of travel in the lanes. The “Cloverleaf Ramps” arrangement shows the two right lanes of one direction of a divided highway. Arrows indicate that the direction of travel is from the bottom of the figure to the top. A solid yellow line is to the left of the leftmost through lanes, a solid white line separates the rightmost travel lane from the right shoulder, and the through lanes are separated from each other by a broken white line. Near the bottom of the figure, an entrance ramp from the right side joins the through roadway. As the entrance ramp approaches the gore, the solid yellow line to the left of the entering lane changes to solid white channelizing lines that continue past the gore and join with the wide solid white line from the through lane to form a triangle. This triangle then changes into a broken white line that separates the acceleration lane from the through lanes. The acceleration lane continues next to the through lanes and then becomes a deceleration lane as it approaches a right exit ramp. At the theoretical gore point, the dotted white line becomes a wide solid white line that then becomes an elongated white triangle in front of the gore. The exit ramp curves off to the right. A legend shows a black arrow indicating the direction of travel in the lanes. The “Exit-Only Lane at Exit Ramp” arrangement shows a vertical highway with five lanes of one direction of a divided highway, four lanes of which continue through past an exit ramp, and the rightmost of which angles off to the right to become the exit ramp. Arrows indicate that the direction of travel is from the bottom of the figure to the top. A solid yellow line is shown to the left of the leftmost through lane, a solid white line is shown to the right of the rightmost travel lane, and the through lanes are shown separated from each other by a broken white line. An optional white speed measurement marking is shown to the left of the solid yellow line on the left shoulder of the highway. In the middle of the figure, the far right lane is shown becoming the deceleration lane, leading to a right exit ramp. The deceleration lane is shown separated from the rightmost of the four remaining through lanes by a dotted white line. The rightmost lane then is shown angling off to the right and becoming the exit ramp. An arrow indicates the direction of travel on the ramp.

Gesture Sensor for Vehicular Control

FIG. 3 shows an exemplary gesture recognition system. The system takes advantage of the numerous cameras onboard the vehicle for navigation and mapping purposes, and additionally includes the gesture control feature. System 800 includes a pair of cameras 802, 804 coupled to an image-analysis system 806. Cameras 802, 804 can be any type of camera, including cameras sensitive across the visible spectrum or, more typically, with enhanced sensitivity to a confined wavelength band (e.g., the infrared (IR) or ultraviolet bands); more generally, the term “camera” herein refers to any device (or combination of devices) capable of capturing an image of an object and representing that image in the form of digital data. For example, line sensors or line cameras rather than conventional devices that capture a two-dimensional (2D) image can be employed. The term “light” is used generally to connote any electromagnetic radiation, which may or may not be within the visible spectrum, and may be broadband (e.g., white light) or narrowband (e.g., a single wavelength or narrow band of wavelengths).

Cameras 802, 804 are preferably capable of capturing video images (i.e., successive image frames at a constant rate of at least 15 frames per second), although no particular frame rate is required. The capabilities of cameras 802, 804 are not critical to the invention, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

System 800 also includes a pair of light sources 808, 810, which can be disposed to either side of cameras 802, 804, and controlled by image-analysis system 806. Light sources 808, 810 can be infrared light sources of generally conventional design, e.g., infrared light-emitting diodes (LEDs), and cameras 802, 804 can be sensitive to infrared light. Filters 820, 822 can be placed in front of cameras 802, 804 to filter out visible light so that only infrared light is registered in the images captured by cameras 802, 804. In some embodiments where the object of interest is a person’s hand or body, use of infrared light can allow the motion-capture system to operate under a broad range of lighting conditions and can avoid various inconveniences or distractions that may be associated with directing visible light into the region where the person is moving. However, a particular wavelength or region of the electromagnetic spectrum is required.

It should be stressed that the foregoing arrangement is representative and not limiting. For example, lasers or other light sources can be used instead of LEDs. For laser setups, additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, cameras 802, 804 are oriented toward a region of interest 812 in which an object of interest 814 (in this example, a hand) and one or more background objects 816 can be present. Light sources 808, 810 are arranged to illuminate region 812. In some embodiments, one or more of the light sources 808, 810 and one or more of the cameras 802, 804 are disposed below the motion to be detected, e.g., where hand motion is to be detected, beneath the spatial region where that motion takes place. This is an optimal location because the amount of information recorded about the hand is proportional to the number of pixels it occupies in the camera images, the hand will occupy more pixels when the camera’s angle with respect to the hand’s “pointing direction" is as close to perpendicular as possible. Because it is uncomfortable for a user to orient his palm toward a screen, the optimal positions are either from the bottom looking up, from the top looking down (which requires a bridge) or from the screen bezel looking diagonally up or diagonally down. In scenarios looking up there is less likelihood of confusion with background objects (clutter on the user's desk, for example) and if it is directly looking up then there is little likelihood of confusion with other people out of the field of view (and also privacy is enhanced by not imaging faces). Image-analysis system 806, which can be, e.g., a computer system, can control the operation of light sources 808, 810 and cameras 802, 804 to capture images of region 812. Based on the captured images, image-analysis system 806 determines the position and/or motion of object 814.

For example, as a step in determining the position of object 814, image-analysis system 806 can determine which pixels of various images captured by cameras 802, 804 contain portions of object 814. In some embodiments, any pixel in an image can be classified as an "object" pixel or a "background" pixel depending on whether that pixel contains a portion of object 814 or not. With the use of light sources 808, 810, classification of pixels as object or background pixels can be based on the brightness of the pixel. For example, the distance (rO) between an object of interest 814 and cameras 802, 804 is expected to be smaller than the distance (rB) between background object(s) 816 and cameras 802, 804. Because the intensity of light from sources 808, 810 decreases as 1/r2, object 814 will be more brightly lit than background 816, and pixels containing portions of object 814 (i.e., object pixels) will be correspondingly brighter than pixels containing portions of background 816 (i.e., background pixels). For example, if rB/rO=2, then object pixels will be approximately four times brighter than background pixels, assuming object 814 and background 816 are similarly reflective of the light from sources 808, 810, and further assuming that the overall illumination of region 812 (at least within the frequency band captured by cameras 802, 804) is dominated by light sources 808, 810. These assumptions generally hold for suitable choices of cameras 802, 804, light sources 808, 810, filters 810, 812, and objects commonly encountered. For example, light sources 808, 810 can be infrared LEDs capable of strongly emitting radiation in a narrow frequency band, and filters 810, 812 can be matched to the frequency band of light sources 808, 810. Thus, although a human hand or body, or a heat source or other object in the background, may emit some infrared radiation, the response of cameras 802, 804 can still be dominated by light originating from sources 808,180 and reflected by object 814 and/or background 816.

In this arrangement, image-analysis system 806 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some embodiments, light sources 808, 810 are bright enough that reflected light from an object at distance rO produces a brightness level of 1.0 while an object at distance rB=2rO produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 802, 804 allows image-analysis system 806 to determine the location in 3D space of object 814, and analyzing sequences of images allows image-analysis system 806 to reconstruct 3D motion of object 814 using conventional motion algorithms.

In identifying the location of an object in an image according to an embodiment of the present invention, light sources 808, 810 are turned on. One or more images are captured using cameras 802, 804. In some embodiments, one image from each camera is captured. In other embodiments, a sequence of images is captured from each camera. The images from the two cameras can be closely correlated in time (e.g., simultaneous to within a few milliseconds) so that correlated images from the two cameras can be used to determine the 3D location of the object. A threshold pixel brightness is applied to distinguish object pixels from background pixels. This can also include identifying locations of edges of the object based on transition points between background and object pixels. In some embodiments, each pixel is first classified as either object or background based on whether it exceeds the threshold brightness cutoff. Once the pixels are classified, edges can be detected by finding locations where background pixels are adjacent to object pixels. In some embodiments, to avoid noise artifacts, the regions of background and object pixels on either side of the edge may be required to have a certain minimum size (e.g., 2, 4 or 8 pixels).

In other embodiments, edges can be detected without first classifying pixels as object or background. For example, Δβ can be defined as the difference in brightness between adjacent pixels, and |Δβ| above a threshold can indicate a transition from background to object or from object to background between adjacent pixels. (The sign of Δβ can indicate the direction of the transition.) In some instances where the object's edge is actually in the middle of a pixel, there may be a pixel with an intermediate value at the boundary. This can be detected, e.g., by computing two brightness values for a pixel i: βL=(βi+βi−1)/2 and βR=(βi+βi+1)/2, where pixel (i−1) is to the left of pixel i and pixel (i+1) is to the right of pixel i. If pixel i is not near an edge, |βL−βR| will generally be close to zero; if pixel is near an edge, then |βL−βR| will be closer to 1, and a threshold on |βL−βR| can be used to detect edges.

In some instances, one part of an object may partially occlude another in an image; for example, in the case of a hand, a finger may partly occlude the palm or another finger Occlusion edges that occur where one part of the object partially occludes another can also be detected based on smaller but distinct changes in brightness once background pixels have been eliminated.

Detected edges can be used for numerous purposes. For example, as previously noted, the edges of the object as viewed by the two cameras can be used to determine an approximate location of the object in 3D space. The position of the object in a 2D plane transverse to the optical axis of the camera can be determined from a single image, and the offset (parallax) between the position of the object in time-correlated images from two different cameras can be used to determine the distance to the object if the spacing between the cameras is known.

Further, the position and shape of the object can be determined based on the locations of its edges in time-correlated images from two different cameras, and motion (including articulation) of the object can be determined from analysis of successive pairs of images. An object's motion and/or position is reconstructed using small amounts of information. For example, an outline of an object's shape, or silhouette, as seen from a particular vantage point can be used to define tangent lines to the object from that vantage point in various planes, referred to herein as "slices." Using as few as two different vantage points, four (or more) tangent lines from the vantage points to the object can be obtained in a given slice. From these four (or more) tangent lines, it is possible to determine the position of the object in the slice and to approximate its cross-section in the slice, e.g., using one or more ellipses or other simple closed curves. As another example, locations of points on an object's surface in a particular slice can be determined directly (e.g., using a time-of-flight camera), and the position and shape of a cross-section of the object in the slice can be approximated by fitting an ellipse or other simple closed curve to the points. Positions and cross-sections determined for different slices can be correlated to construct a 3D model of the object, including its position and shape. A succession of images can be analyzed using the same technique to model motion of the object. Motion of a complex object that has multiple separately In some embodiments, the pulsing of light sources 808, 110 can be used to further enhance contrast between an object of interest and background. In particular, the ability to discriminate between relevant and irrelevant (e.g., background) objects in a scene can be compromised if the scene contains object that themselves emit light or are highly reflective. This problem can be addressed by setting the camera exposure time to extraordinarily short periods (e.g., 800 microseconds or less) and pulsing the illumination at very high powers (i.e., 5 to 20 watts or, in some cases, to higher levels, e.g., 40 watts). This approach increases the contrast of an object of interest with respect to other objects, even those emitting in the same general band. Accordingly, discriminating by brightness under such conditions allows irrelevant objects to be ignored for purposes of image reconstruction and processing. Average power consumption is also reduced; in the case of 20 watts for 800 microseconds, the average power consumption is under 80 milliwatts. In general, the light sources 808, 110 are operated so as to be on during the entire camera exposure period, i.e., the pulse width is equal to the exposure time and is coordinated therewith. It is also possible to coordinate pulsing of lights 808, 810 for purposes of by comparing images taken with lights 808, 810 on and images taken with lights 808, 810 off.

Safety Handling

FIG. 4 shows an exemplary child or animal safety protection process, while FIG. 5 shows an exemplary driver impairment protection process. In one embodiment, the systems generally include at least one child seat sensor such as a weight sensor, a temperature sensor, an infrared sensor, a camera, or any other sensor that can sense the presence of a child in a child safety seat. For example, a weight sensor may be disposed at the base of the child safety seat, on either side of an optional seat cover, generally where the child's posterior would be disposed. Thus, the weight of the child would impinge on the sensor and indicate that the child is disposed in the car seat. A temperature sensor disposed in the same location would generally sense the temperature of the child. A threshold discriminator in the processor would then be employed to determine whether a child is disposed in the seat or not. An infrared sensor may also be employed to sense the temperature and thus the existence of the child. Other sensors may include a microphone, auditory sensors, smell sensors, or any other type of sensor that can sense the presence of a biologic in a vehicle. The trigger may sense conditions that are dangerous in the absence of a parent or caregiver as well as conditions that are dangerous even in the presence of a parent or caregiver, such as dangerous temperature (extreme heat or cold temperature) conditions, via use of temperature sensor.

The trigger can be a sensor that senses the operation of the vehicle, the temperature within the vehicle, or any other sensor that can determine if a deleterious condition exists for a child disposed therein. The trigger may include motion sensor such as accelerometer or wheel sensors to detect if the vehicle is moving without the driver. Other potential triggers include an engine noise sensor or engine heat sensor placed in the engine compartment of the vehicle. For both cases, a decrease in either may be recognized as the vehicle ceasing motion, and each would be convenient to retrofit, especially where such sensors are provided with a wireless communications capability. Many of the triggers disclosed above may also be convenient to retrofit. In some embodiments, multiple sensors are provided for redundancy. For example, if a parent or caregiver suffers an illness that makes response or other child care impossible, the other sensor can still cause an alarm. In a particular example, if the parent suffers a heart attack in the seat, a driver seat sensor would not cause an alarm. If, however, the temperature rises deleteriously, a redundant temperature sensor may still cause an alarm to occur.

The sensors can also detect driver impairment or failure, to help the driver to navigate safely. For example, the vehicle can detect that the driver has become incapacitated by a stroke and automatically come a complete stop at designated safety points. In addition to changing the way the vehicle brake, the vehicle may change the way it maneuvers in other ways as well, such as accelerating differently or changing directions. For instance, the vehicle may accelerate more slowly if the driver pulse rate is excessively high. The vehicle may also turn more or less tightly in order to reduce shock to the passengers. The vehicle may also use other systems and methods to determine the state of a vehicle driver. For example, the vehicle may monitor how far it takes the car to stop compared to expected braking distance. If the distance is longer than expected, such as taking longer than it has in the past, the computer system may determine that the brakes are worn and start braking earlier. The system and method may also estimate the state of a component based on its repair service record. In that regard, the processor may query data or an external database (e.g., a server with which the vehicle is in wireless communication) for medical records and get assistance.

Modeling of the patterns of changes in the driver's performance and conditions, as well as modeling of the patterns of changes in the driving environment, may be performed by the autonomous driving computer system. Alternatively, predetermined models may be stored in the autonomous driving system. The computer system may process the observed data, fit them into the 3D models in FIGS. 7A-7I, and issue compensation signals accordingly.

The vehicle may take the steps necessary to get medical assistance for the driver/passenger. By way of example, the vehicle may autonomously and without direct human assistance navigate to a hospital or medical clinic, notify the facility of the medical emergency, safely transferring the passenger and/or the driver to the medical facility and return to its original location when done.

Obstacle Detection

In some embodiments, a vehicle identifies obstacles on the road, and the computer system may use one or more sensors to sense the obstacles. For example, the computer system may use an image-capture device to capture images of the road and may detect the obstacles by analyzing the images for predetermined colors, shapes, and/or brightness levels indicative of an obstacle. As another example, the computer system may project LIDAR to detect the obstacle. The computer system may estimate the location of the obstacle and control the vehicle to avoid the vehicle and yet maintain a predetermined distance from neighboring vehicles in both directions. Other vehicles behind the lead vehicle can then simply follow the lead vehicle as part of a flock. The computer system may then control the vehicle to maintain a distance between the vehicle and the at least one neighboring vehicle to be at least a predetermined minimum distance to avoid colliding with the at least one neighboring vehicle.

Figure 6A:
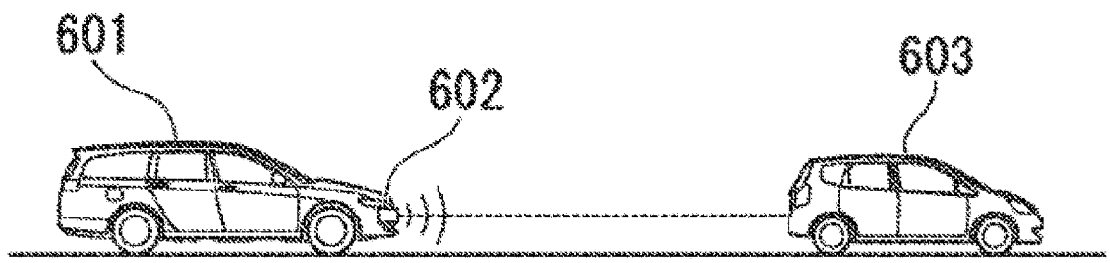
FIGS. 6A-6C show exemplary obstacles that may be encountered by vehicles.
Figure 6B:
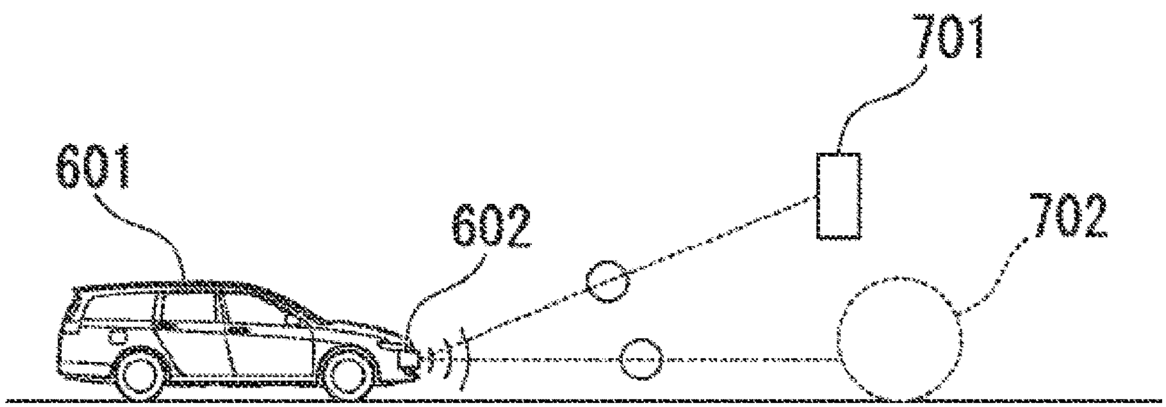
Figure 6C:
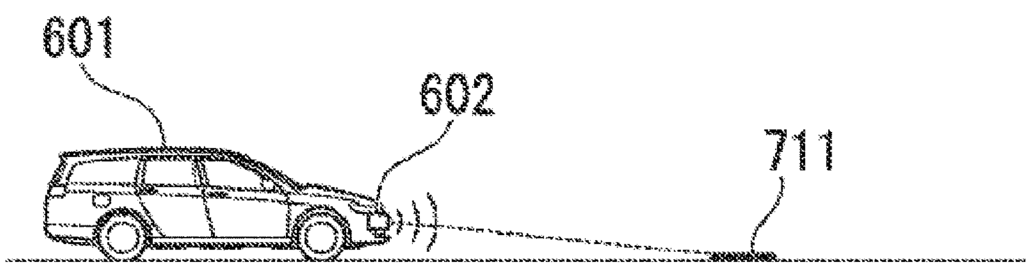
Figure 7A:
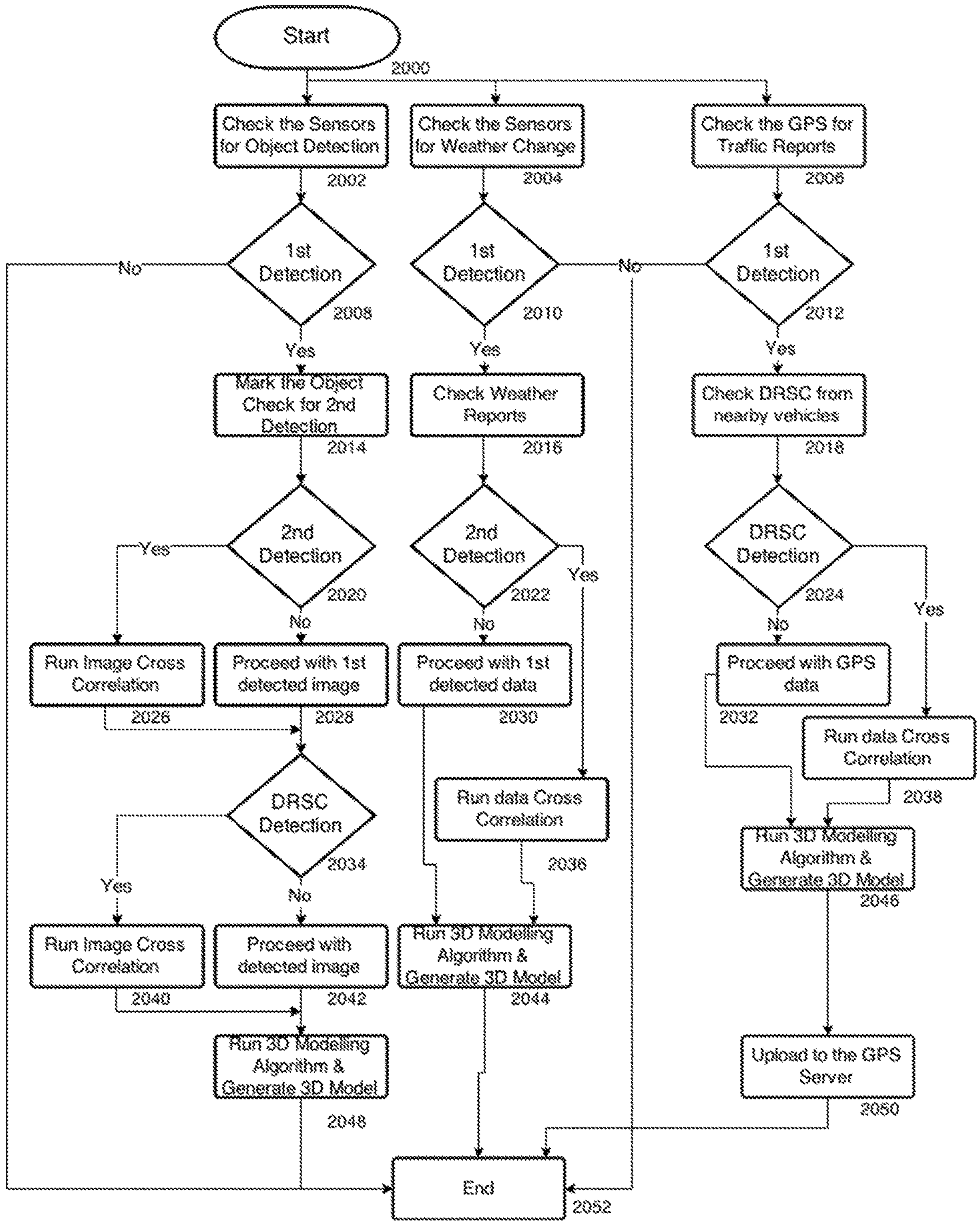
FIGS. 7A-7H illustrate an exemplary process to fuse data for 3D models used for car navigation.
Figure 7B:
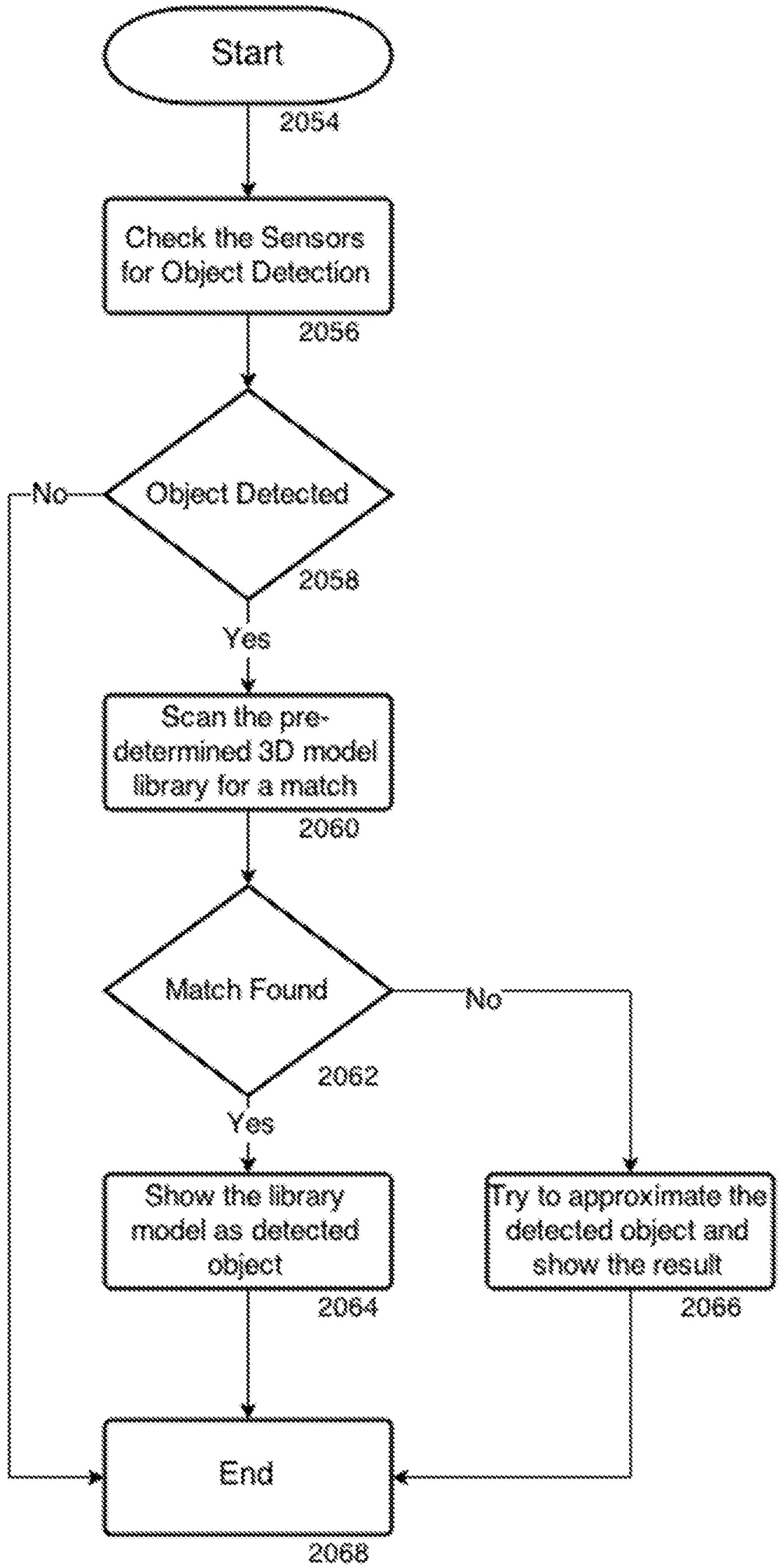
Figure 7C:
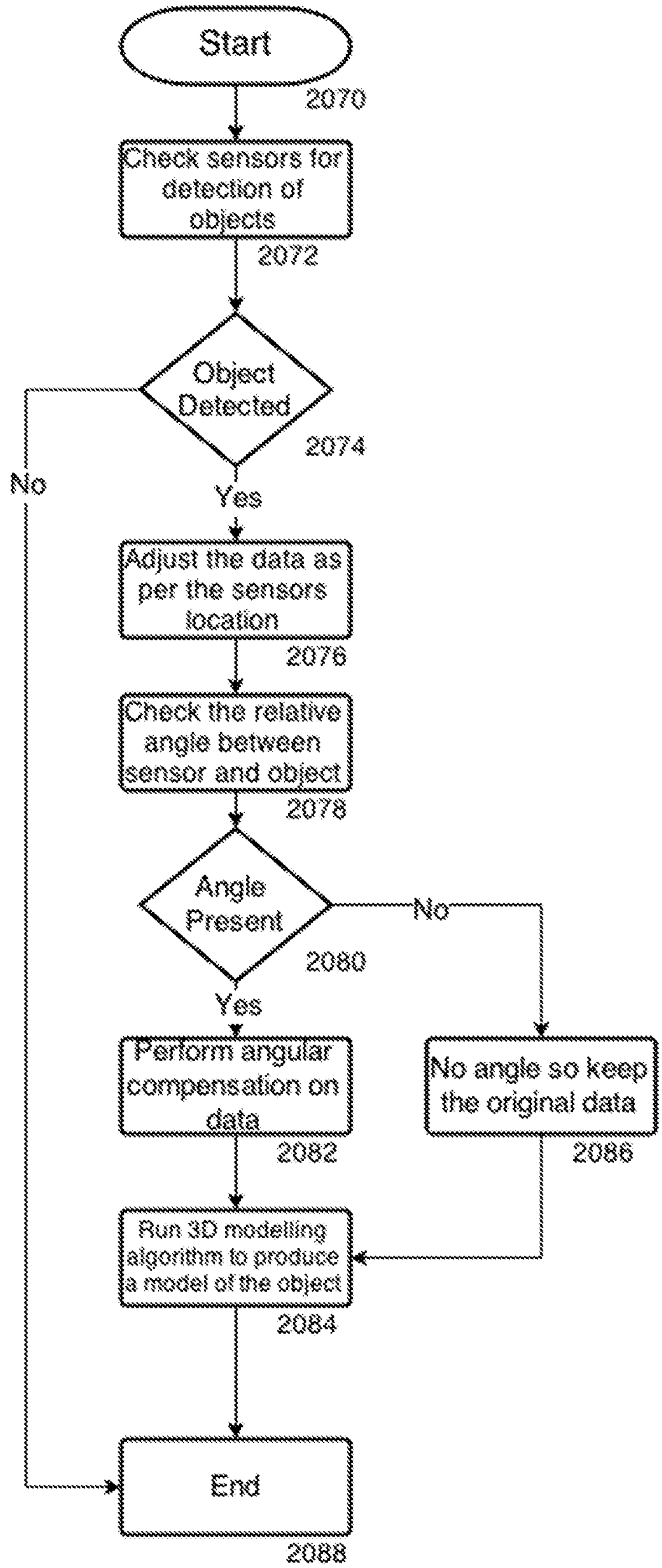
Figure 7D:
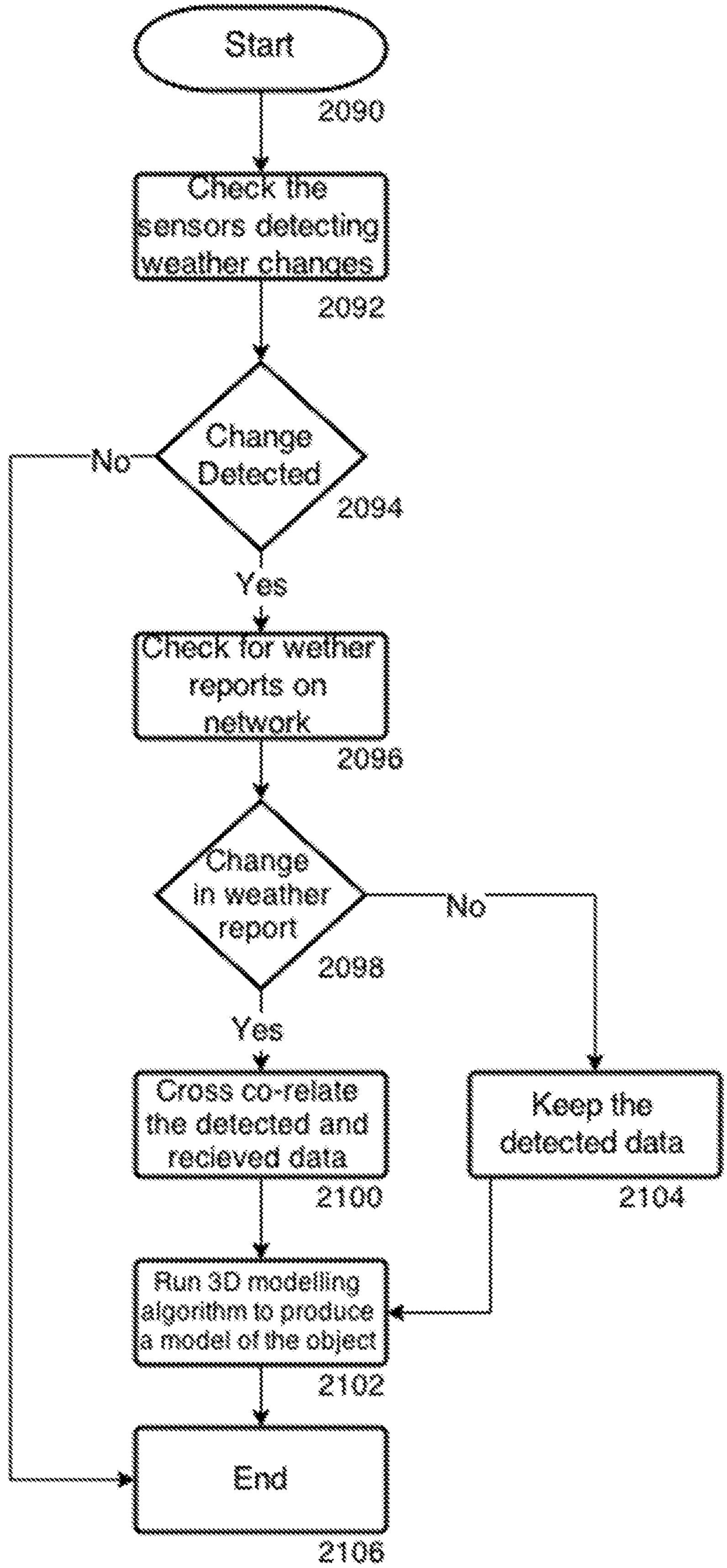
Figure 7E:
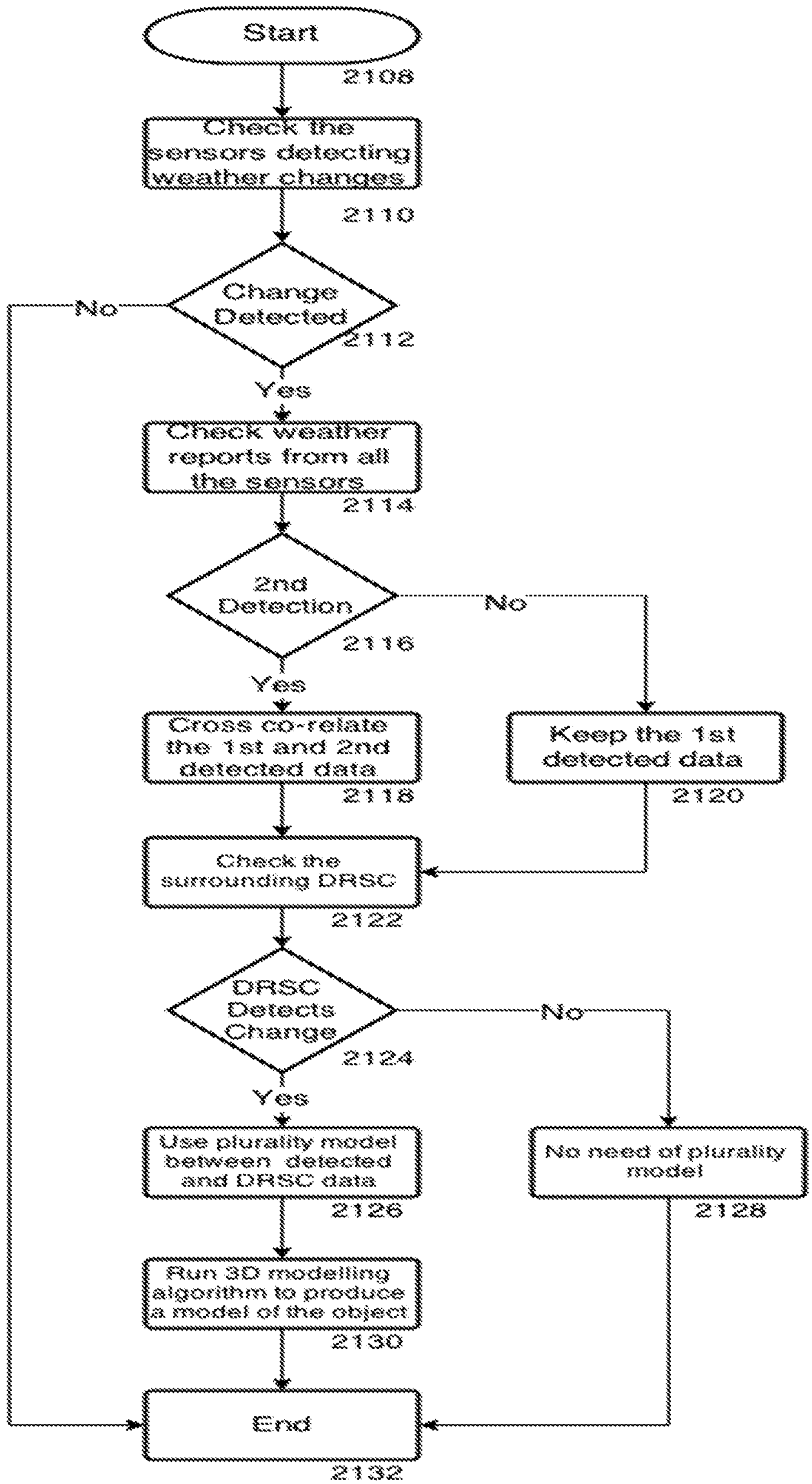
Figure 7F:
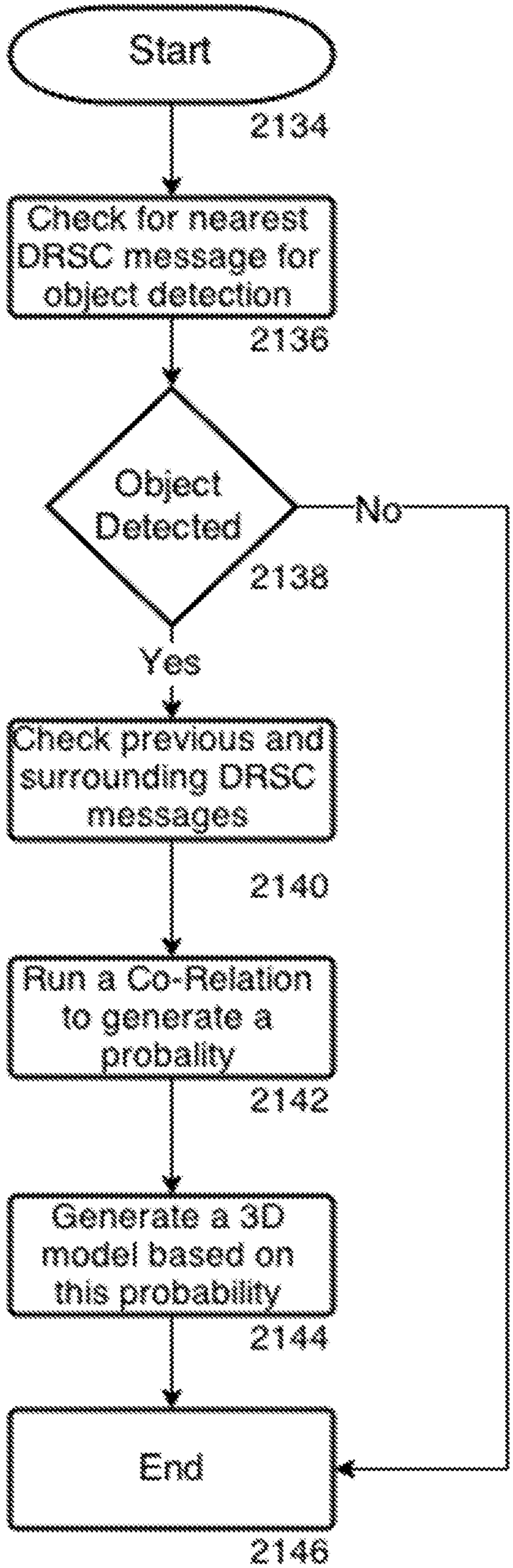
Figure 7G:
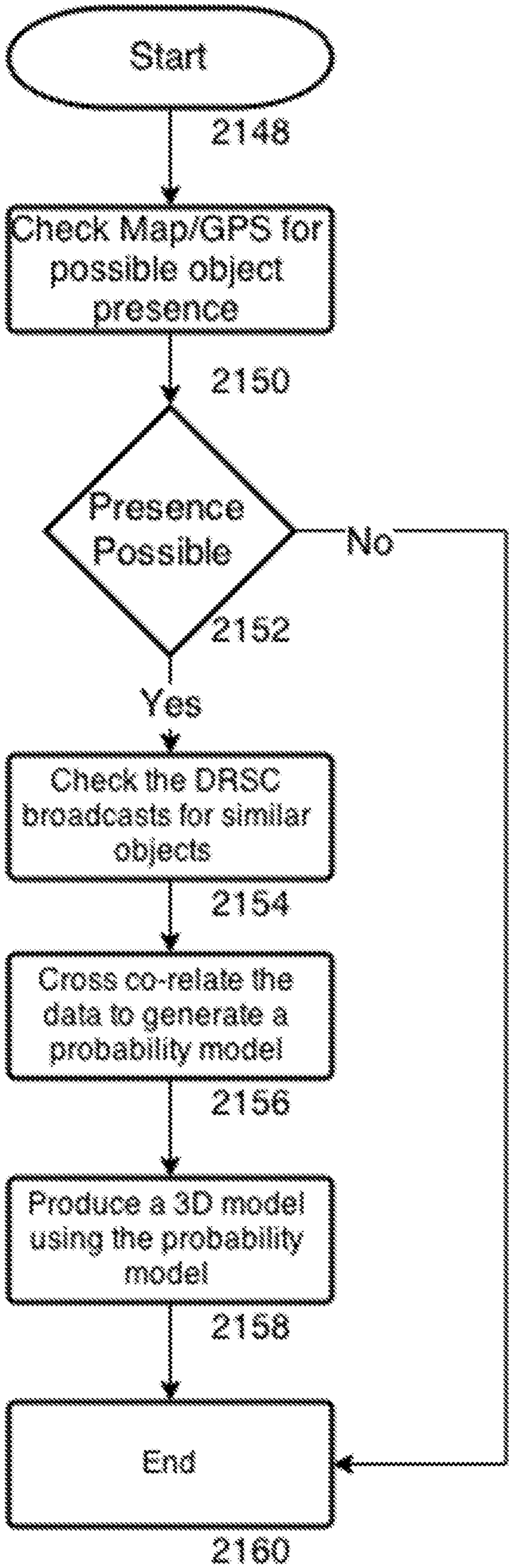
Figure 7H:
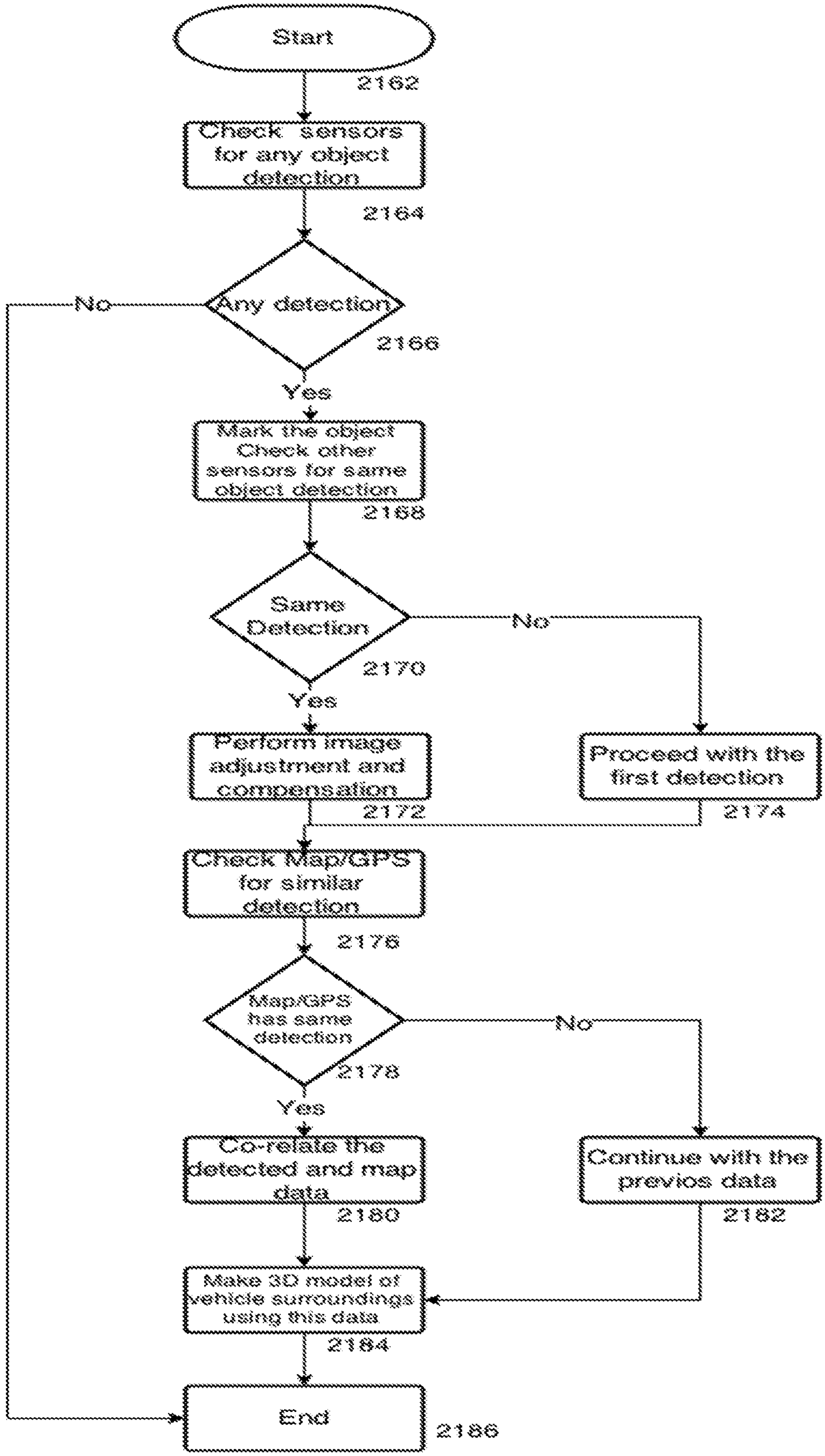

FIGS. 6A-6C show exemplary obstacles that may be encountered by vehicles. FIGS. 7A-7H illustrate an exemplary process to fuse data for 3D models used for car navigation. FIG. 7A shows an exemplary system that performs data fusion based on sensor based detection of objects, change in weather and traffic, and holiday/emergency conditions, among others. The process checks all the sensors for change in weather (2004), detection of object (2002) and the GPS for current traffic conditions (2006). For each given sensor for detecting objects in a vehicle's environment, the process generates a 3D model of the given sensor's field of view; obstacle information from front cars using vehicle-vehicle communication (DRSC); neighboring car driver preference information; traffic information including emergency information. The process can adjust one or more characteristics of the plurality of 3D models based on the received weather information to account for an impact of the actual or expected weather conditions on one or more of the plurality of sensors. After the adjusting, aggregating, by a processor, the plurality of 3D models to generate a comprehensive 3D model; combining the comprehensive 3D model with detailed map information; and using the combined comprehensive 3D model with detailed map information to maneuver the vehicle. In FIG. 7A, the process checks sensors for object detection (2008) and then checks for confirmations from other vehicles over V2V communication such as DSRC and then generates 3D model therefrom. The process can also check for weather change (2004) and correlate the weather change to generate an updated 3D model. Similarly, the process integrates traffic flow information (2006) and updates the 3D model as needed. FIG. 7B shows an exemplary process for identifying the object, while FIG. 7C-7H show in more details the object modeling process. The process checks sensors for object detection and scans the object against 3D library for matches. If a match is found, the process sets the object to the object in the library, and otherwise the process performs a best-guess of what the object is and send the object identification for subsequent 3D modeling use.

FIGS. 8A-8F show exemplary detection of objects outside of the vehicle and guidance on their handling. The detected objects can include automobile, a pedestrian, structure, or a bicycle, for example. The system assists the driver by identifying the objects as potential "threats" and recommend options for the driver. For example, the system can perform the following:

- detecting an object external to a vehicle using one or more sensors;
- determining a classification and a state of the detected object;
- estimating the destination of the object;
- predicting a likely behavior of the detected object based on prior behavior data and destination;
- preparing the vehicle to respond based at least in part on the likely behavior of the detected object; and
- notifying a driver of options based on the likely behavior.

Figure 8A:
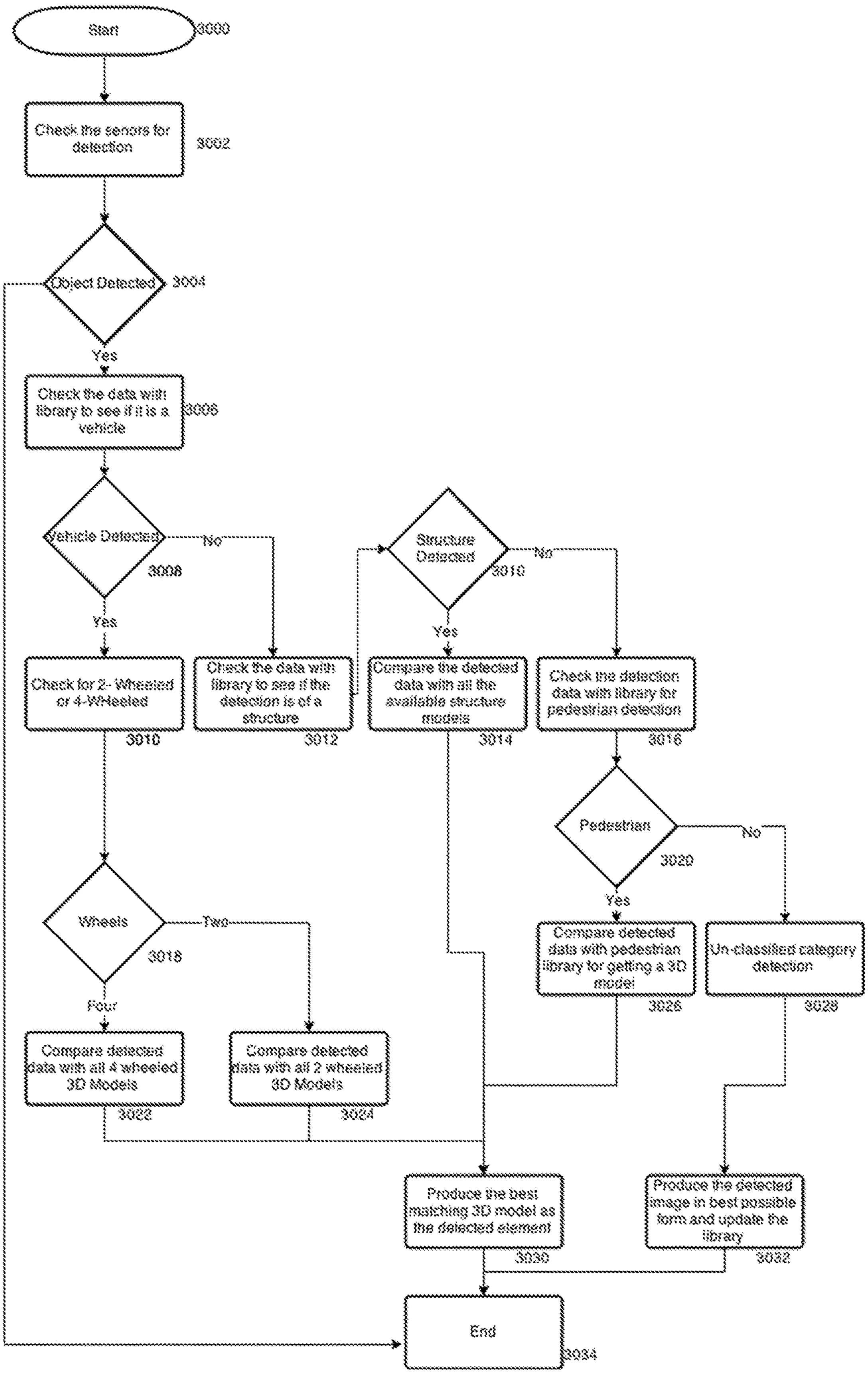
FIGS. 8A-8F show exemplary detection of objects outside of the vehicle and guidance on their handling.
Figure 8B:
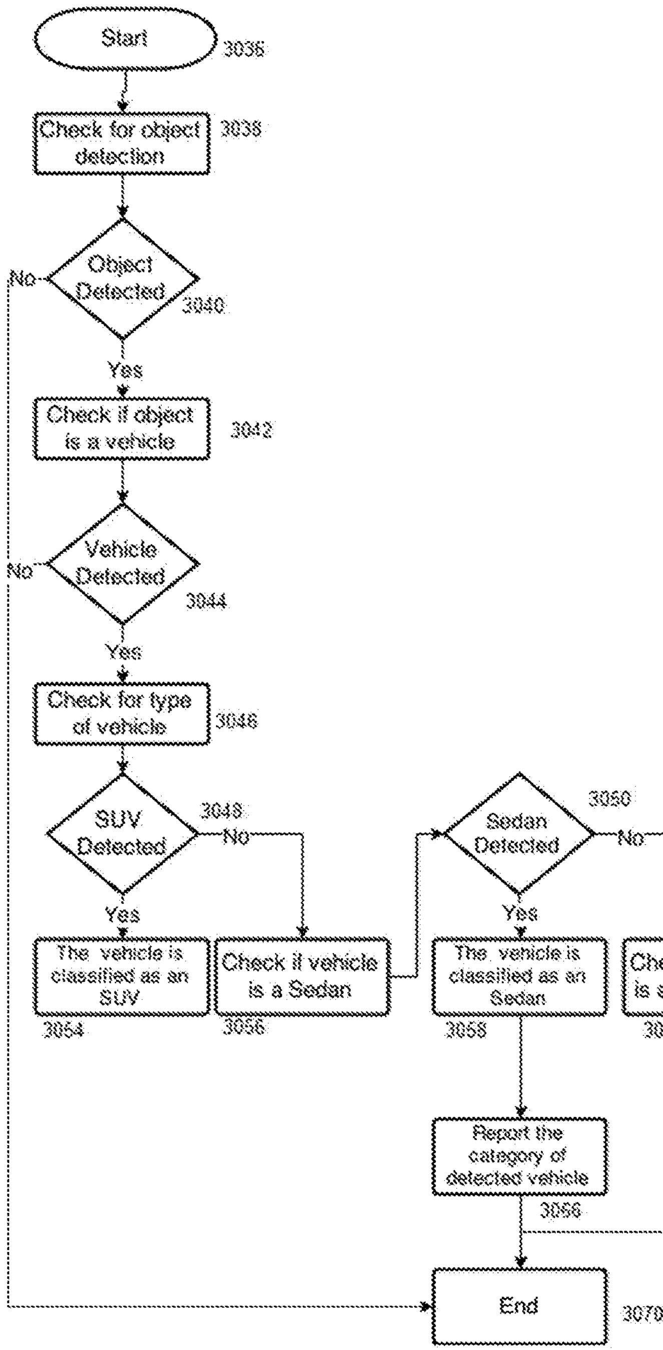
Figure 8C:
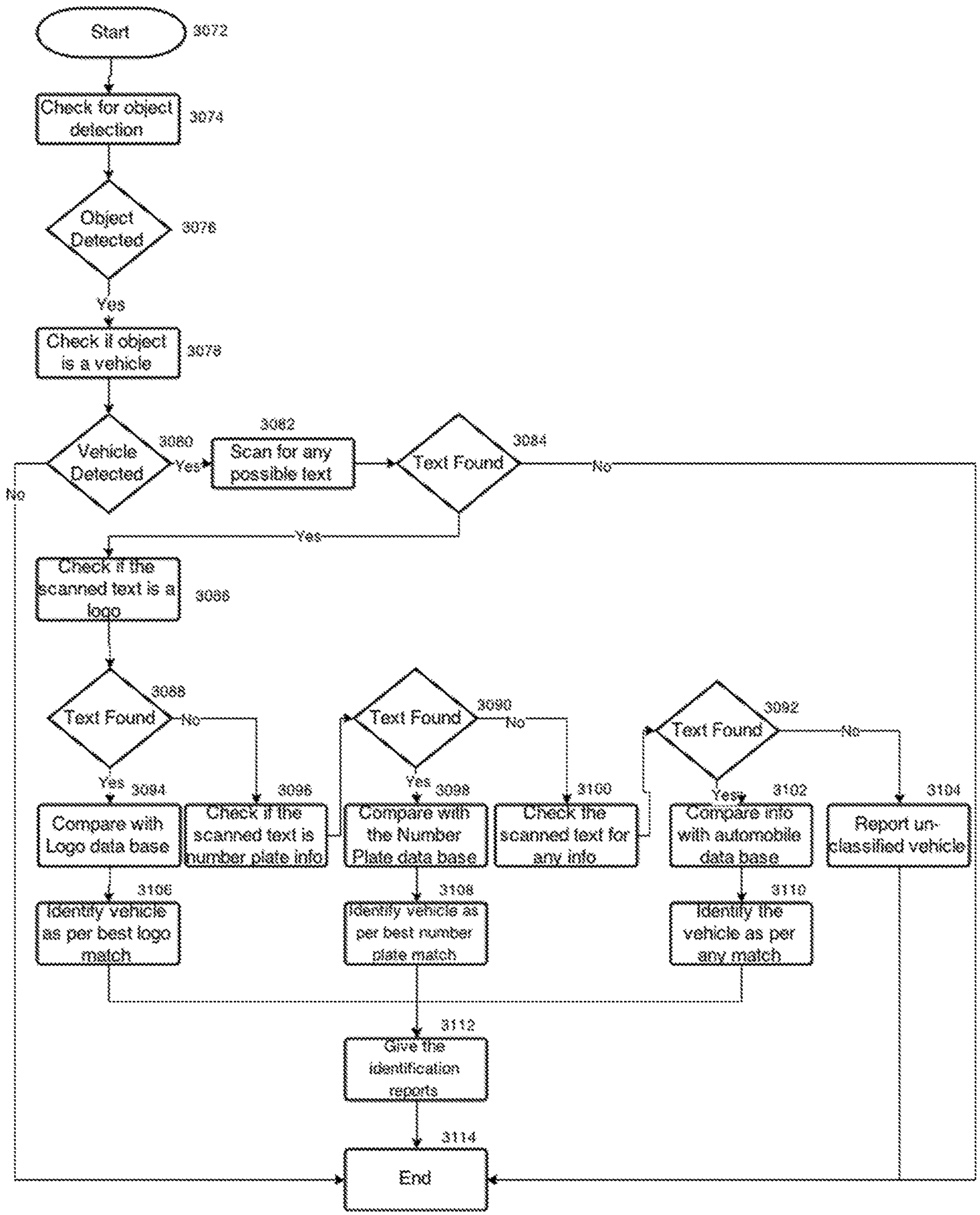
Figure 8D:
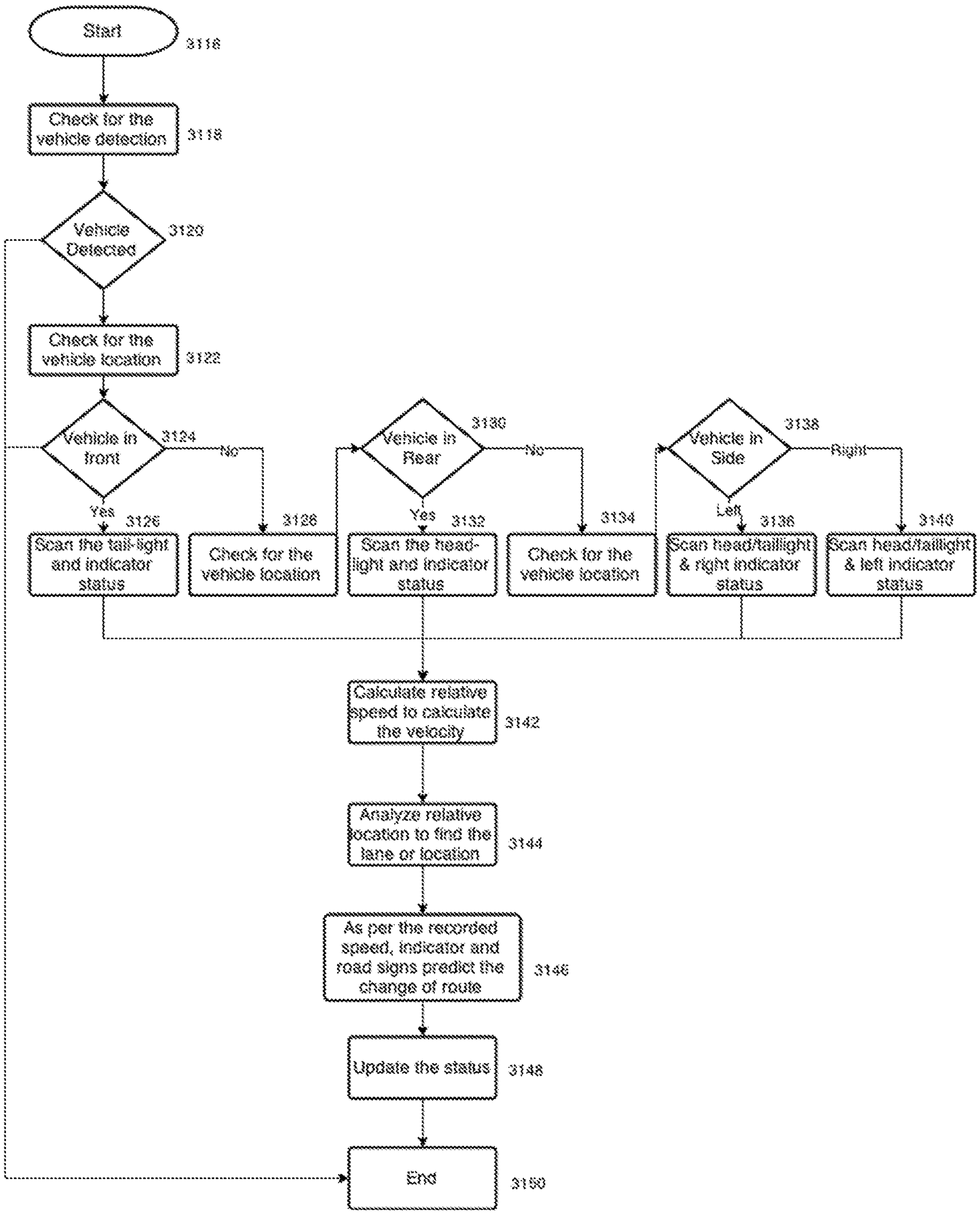
Figure 8E:
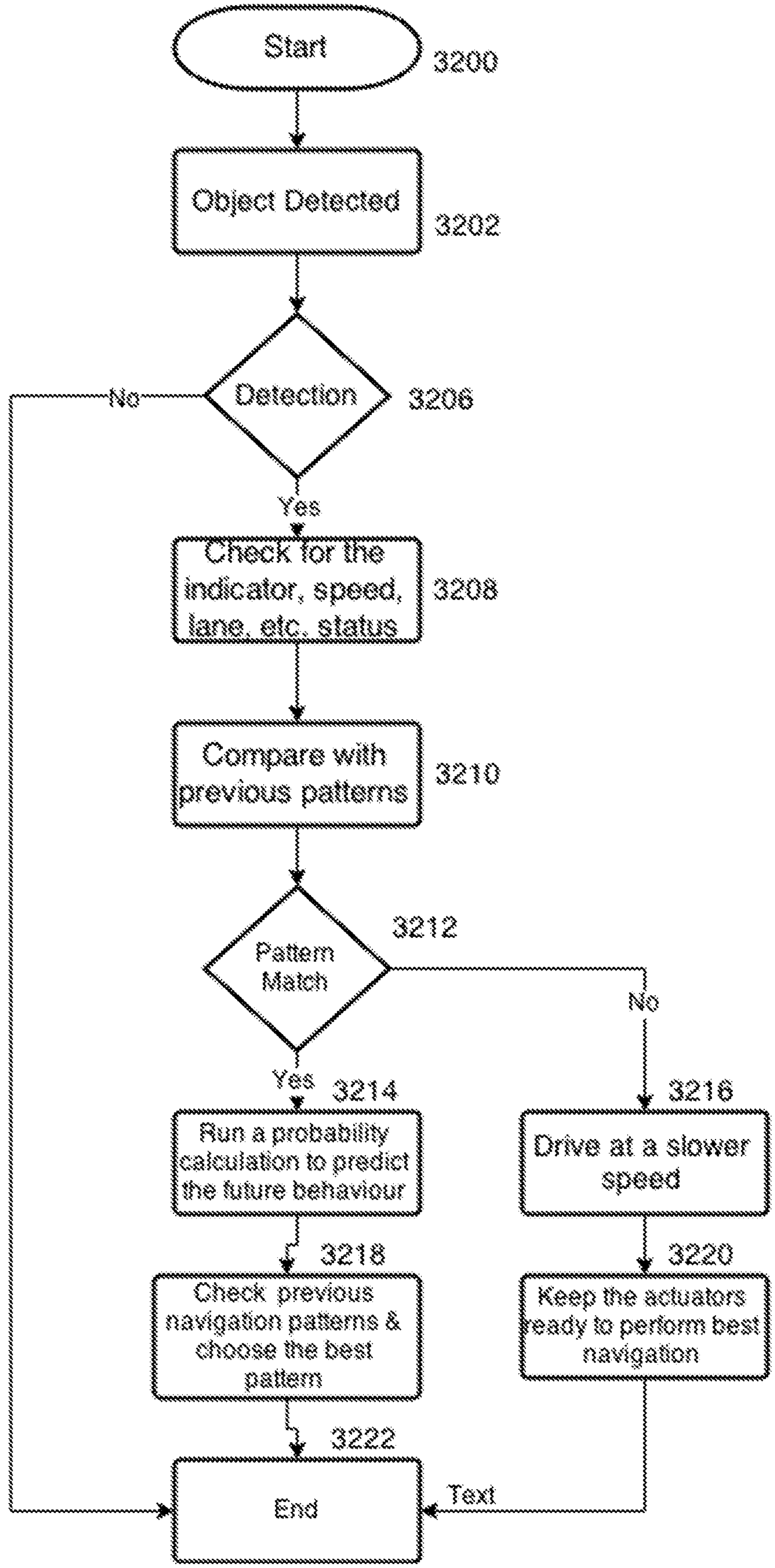
Figure 8F:
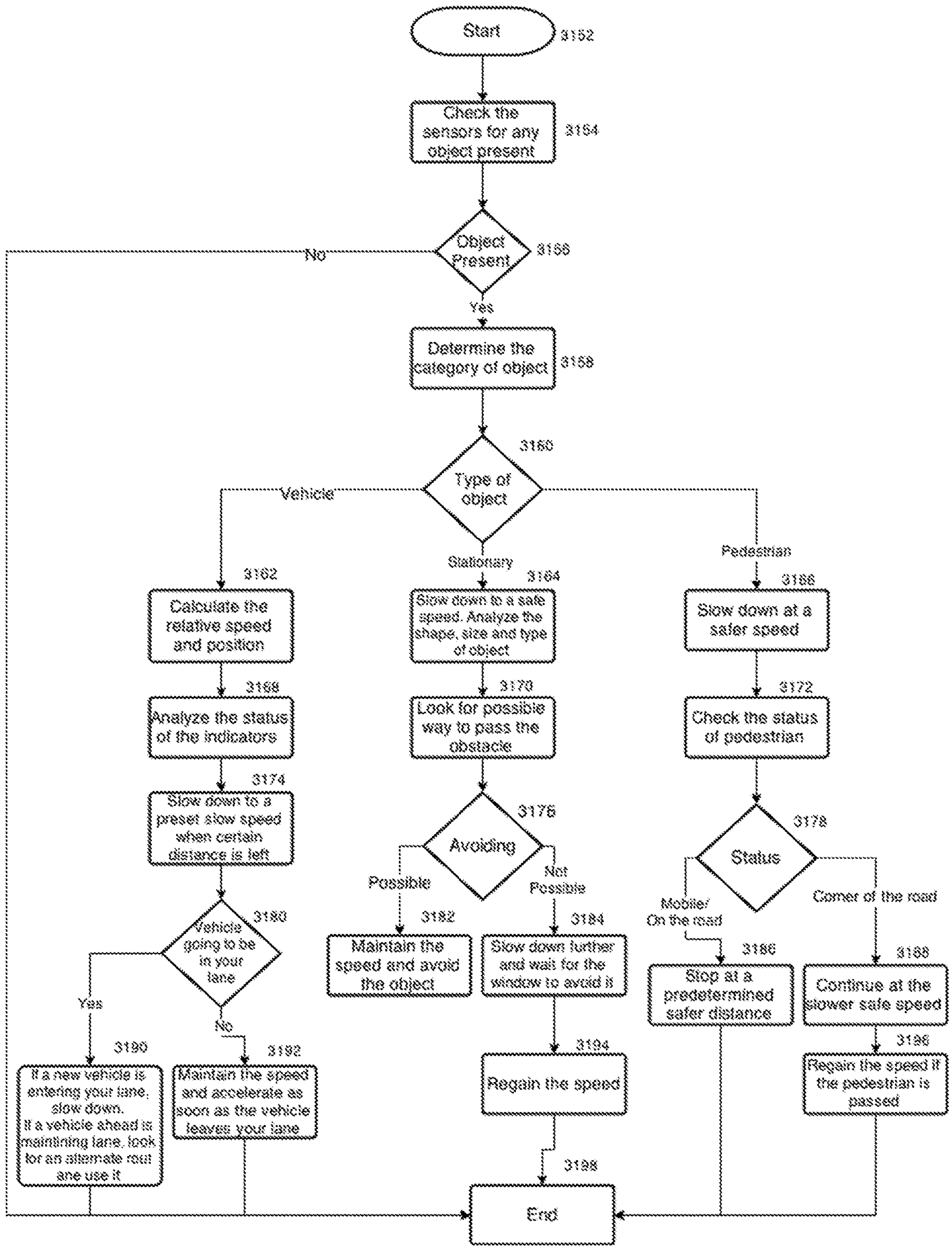

FIG. 8A shows an exemplary process to identify a vehicle based on the 3D models created in FIGS. 7A-7H. FIG. 8B shows an exemplary handling where the detected object is an automobile—the classification of the detected object includes the type of automobile. FIG. 8C shows a process to retrieve prior behavior data of the detected object by identifying at least one of a logo, a bumper sticker, or a license plate. Such information is then used to look up driver behavior. Public information such as driving ticket and Insurance information can be extracted to see if the driver has a bad driving history and if so the system can take a defensive driving posture. FIG. 8D shows an exemplary process to determine the state of the object. For example, the state of the detected object can be related to at least one of: location, traffic lane in which the detected object is traveling, speed, acceleration, entry onto a road, exit off of a road, activation of headlights, activation of taillights, or activation of blinkers. The behavior data is based on movement data for a plurality of other objects at one or more locations. The movement data are tracked using one of: satellite imagery, roadside cameras, on-board GPS data, or sensor data acquired for other nearby vehicles. FIG. 8E shows an exemplary process to identify predict other driver/rider behavior, while FIG. 8F generates proposed response to the object's expected behavior. The system can send a driver recommendation or vehicle command to orient the vehicle includes positioning the vehicle at a predetermined distance from the detected object, the predetermined distance being based, at least in part, on the classification of the detected object. The likely behavior of the detected object can be provided as a probability of the detected object entering to one or more states. The process includes receiving updated behavior data; and wherein predicting the likely behavior of the detected object is based at least in part on the updated behavior data. The driver can be informed of the options using haptic interface or a heads-up display. The process can also share the likely behavior of the object to neighboring vehicles using vehicle-to-vehicle communication.

The process may cause the vehicle to take particular actions in response to the predicted actions of the surrounding objects. For example, if other car is turning at the next intersection, the process may slow the vehicle down as it approaches the intersection. In this regard, the predicted behavior of other objects is based not only on the type of object and its current trajectory, but also based on some likelihood that the object may obey traffic rules or predetermined behaviors. In another example, the process may include a library of rules about what objects will do in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human built set of rules which may be improved by the vehicle's observations. Similarly, the library may begin as rules learned from vehicle observation and have humans examine the rules and improve them manually. This observation and learning may be accomplished by, for example, tools and techniques of machine learning. In addition to processing data provided by the various sensors, the computer may rely on environmental data that was obtained at a previous point in time and is expected to persist regardless of the vehicle's presence in the environment. For example, the system can use highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane). These objects may have particular behavior patterns that depend on the nature of the object. For example, a bicycle is likely to react differently than a motorcycle in a number of ways. Specifically, a bicycle is more likely to make erratic movements when compared with a motorcycle, but is much slower and thus can be handled with ease compared to a speeding motorcycle. For each classification, the object data may also contain behavior information that indicates how an object having a particular classification is likely to behave in a given situation. Vehicle may then autonomously respond to the object based, in part, on the predicted behavior.

FIG. 9A shows an exemplary system for crowd-sourcing navigation data. The system includes a crowdsourcing server in communication with a plurality of vehicles 1 . . . n. The vehicles in FIG. 9A performs peer-to-peer discovery and crowd-sourced navigation as shown in FIG. 9B. The system receives proximity services for a group of vehicles traveling a predetermined route using peer-to-peer discovery, receives crowdsourcing data from said plurality of vehicles, sharing crowdsourcing data to the group of vehicles (or a subsequent group of vehicles) traveling the route of interest. Such information can be used in providing navigation guidance to the vehicle traveling the route using the crowdsourced data.

Crowd-Sourced Map Updating and Obstacle Annotating

Next, a system to crowd-source the updates of precision maps with data from smart vehicles is detailed. In embodiments, crowd-sourced obstacle data can be used to update a map with precision. The obstacles can be rocks, boulders, pot-holes, manhole, utility hole, cable chamber, maintenance hole, inspection chamber, access chamber, sewer hole, confined space or can be water pool or rising tidal waves that affect the road as detected by a plurality of vehicles. Such crowd-sourced information is updated into the map and annotated by time, weather and periodicity. The detected obstacle information may include a geographic location of the vehicle and a predetermined map of the road. The computer system may determine the geographic location of the obstacle by, for example, using a laser rangefinder or light detection and ranging (LIDAR) unit to estimate a distance from the obstacle to the at least two objects near the vehicle and determining the geographic location of the obstacle using triangulation, for example. Such information is updated into the map system and marked as temporal. During use, if recent vehicles take defensive driving around the temporary obstacle, the map adds the obstacles to the map for the route guidance module to advise vehicles. If recent vehicles drive the road as though the obstacle does not exist, the system removes the obstacle from the map database, but keeps track of the history in case it is a periodic obstacle. The obstacle information is also reported to government agency for repair/maintenance.

In another embodiment, if vehicles drive through the lane with a smooth line or curve, but abruptly brakes, the system infers that the road has defects or potholes, for example, and the bad infrastructure is reported for path planning (to add more travel time, or to change the route to avoid the bad road infrastructure if it is long.

The new information is used to update a digital map that lacks the current information or that contains inaccuracies or may be incomplete. The digital map stored in the map database may be updated using the information processed by a map matching module, matched segment module, and unmatched segment module. The map matching module, once it has received obstacle location and GPS traces, processes obstacle locations and GPS traces by matching them to a road defined in the digital map. The map matching module matches the obstacles and the GPS traces with the most likely road positions corresponding to a viable route through the digital map by using the processor to execute a matching algorithm. In one example, the matching algorithm may be a Viterbi matching algorithm. Where the GPS traces do match a road defined in the digital map, the matched trace to which the GPS traces match and obstacle information are sent to the matched segment module for further processing as will be described below. Where the GPS traces do not match a road defined in the digital map, the unmatched trace to which the GPS traces are correlated with and the obstacle position information are sent to the unmatched segment module for further processing. The matched segment module and unmatched segment module both provide metadata to the map updating module. The metadata may include obstacle metadata road geometry refinement metadata, road closure and reopening metadata, missing intersection metadata, missing road data and one-way correction metadata. The map updating module updates the digital map in the map database.

The process to update maps using crowd-sourced data may begin with the unmatched segment module clustering the unmatched GPS traces received from the map matching module. Many available algorithms may be suitable for this process, but in one example, an agglomerative clustering algorithm that iteratively compares GPS traces with each other and combines those that fall within a pre-determined tolerance into a cluster may be used. One example of such and algorithm uses the Hausdorff distance as its distance measure in the clustering algorithm. Once the cluster is selected, the unmatched segment module may produce a single road geometry for a cluster of unmatched GPS traces using a centerline fitting procedure in which the single road geometry describes a new road segment with the obstacle which is not described in the current map database. In one example, a polygonal principal curve algorithm or a Trace Clustering Algorithm (TC1) algorithm can be used. The digital map can be modified to include the new road, including possibly new intersections in the base map and any associated pointers or indices updated.

Lane Marking Visibility Handling

In some embodiments, a lead vehicle identifies lane information that may include lane markings on the road, and the computer system may use one or more sensors to sense the lane markings. At some point, the lead vehicle may determine that the lane information has become unavailable or unreliable. For example, severe fog may be present and severely affect the lane markings. In other examples, the vehicle may no longer be able to detect the lane markings on the road, the vehicle may detect contradictory lane markings on the road, the vehicle may no longer be able to determine a geographic location of the vehicle, and/or the vehicle may not be able to access a predetermined map of the road. Other examples are possible as well.

In response to determining that the lane information has become unavailable or unreliable, the computer system may use at least one sensor to monitor at least one neighboring vehicle, such as a neighboring vehicle in a neighboring lane or a neighboring vehicle behind the vehicle that is part of the flock. The computer system may then control the vehicle to maintain a distance between the vehicle and the at least one neighboring vehicle to be at least a predetermined minimum distance and even if the vehicle is unable to rely on the lane information to estimate a location of the lane on the road, the vehicle may avoid colliding with the at least one neighboring vehicle.

In other embodiments, the lane information may include a geographic location of the vehicle and a predetermined map of the road. The computer system may determine the geographic location of the vehicle by, for example, querying a location server for the geographic location of the vehicle. Alternatively, if the predetermined map indicates a geographic location of at least two objects near the vehicle, the computer system may determine the geographic location of the vehicle by, for example, using a laser rangefinder or light detection and ranging (LIDAR) unit to estimate a distance from the vehicle to the at least two objects near the vehicle and determining the geographic location of the vehicle using triangulation. Other examples are possible as well. In any case, the computer system may then locate the geographic location of the vehicle on the predetermined map to determine a location of the lane relative to the geographic location of the vehicle.

In still other embodiments, the lane information may be derived from a leading vehicle that is in front of the vehicle in the lane and correlation with other information such as map data and independent lane analysis to prevent the blind-following-the blind situation. The computer system may estimate a path of the leading vehicle using, for example, a laser rangefinder and/or a LIDAR unit. Other examples are possible as well. Once the computer system has estimated the path of the leading vehicle, the computer system may estimate the location of the lane based on the estimated path. For example, the computer system may estimate the location of the lane to include the estimated path (e.g., extend by half of a predetermined lane width on either side of the estimated path). Other examples are possible as well.

In some embodiments, the computer system may maintain a predetermined threshold for the lane information, and the computer system may determine that the lane information has become unavailable or unreliable when the computer system detects that a confidence of the lane information (e.g., how confident the computer system is that the lane information is reliable) is below the predetermined threshold. In some embodiments, the computer system may additionally maintain a predetermined time period for the lane information, and the computer system may determine that the lane information has become unavailable or unreliable when the computer system detects that a confidence of the lane information is below the predetermined threshold for at least the predetermined amount of time.

Upon determining that the lane information has become unavailable or unreliable, the computer system may use at least one sensor to monitor at least one neighboring vehicle. The at least one neighboring vehicle may include, for example, a neighboring vehicle in a lane adjacent to the lane in which the vehicle is traveling. As another example, the at least one neighboring vehicle may include a neighboring vehicle behind the vehicle in the lane in which the vehicle is traveling. As still another example, the at least one neighboring vehicle may include a first neighboring vehicle and a second neighboring vehicle, each of which may be either in a lane adjacent to the lane in which the vehicle is traveling or behind the vehicle in the lane in which the vehicle is traveling. Other examples are possible as well.

When the lane information has become unavailable or unreliable, the computer system may control the vehicle to maintain a distance between the vehicle and the at least one neighboring vehicle to be at least a predetermined distance. The predetermined distance may be, for example, a distance determined to be a safe distance and/or a distance approximately equal to the difference between a predetermined lane width and a width of the vehicle. Other predetermined distances are possible as well.

In order to maintain the distance between the vehicle and the at least one neighboring vehicle to be at least the predetermined distance, the computer system may continuously or periodically use the at least one sensor on the vehicle to monitor the distance between the vehicle and the at least one neighboring vehicle. The computer system may monitor the distance between the vehicle and the at least one neighboring vehicle using, for example, a laser rangefinder and/or LIDAR unit. If the distance between the vehicle and the at least one neighboring vehicle becomes less than the predetermined distance, the computer system may move the vehicle away from the at least one neighboring vehicle in order to maintain the distance between the vehicle and the at least one neighboring vehicle to be at least the predetermined distance.

In some embodiments, in addition to maintaining the distance between the vehicle and the at least one neighboring vehicle to be at least the predetermined distance, the computer system may additionally maintain the distance between the vehicle and the at least one neighboring vehicle to be within a predetermined range of the predetermined distance. In these embodiments, if the distance between the vehicle and the at least one neighboring vehicle becomes too large (e.g., no longer within the predetermined range of the predetermined distance), the computer system may move the vehicle closer to the at least one neighboring vehicle. This may, for example, prevent the vehicle from drifting so far away from the neighboring vehicle that the vehicle drifts into a lane on the opposite side of the vehicle from the neighboring vehicle.

As noted above, in some embodiments the at least one vehicle may include a first neighboring vehicle and a second neighboring vehicle. In these embodiments, maintaining the distance between the vehicle and the at least one neighboring vehicle may involve maximizing both a first distance between the vehicle and the first neighboring vehicle and a second distance between the vehicle and the second neighboring vehicle (e.g., such that the vehicle remains approximately in the middle between the first neighboring vehicle and the second neighboring vehicle). Each of the first distance and the second distance may be at least the predetermined distance.

In some embodiments, in addition to maintaining the distance between the vehicle and the at least one neighboring vehicle to be at least the predetermined distance, the computer system may determine an updated estimated location of the lane. To this end, the computer system may use the at least one sensor to monitor at least a first distance to the at least one neighboring vehicle and a second distance to the at least one vehicle. Based on the first distance and the second distance, the computer system may determine a first relative position and a second relative position (e.g., relative to the vehicle) of the at least one neighboring vehicle. Based on the first relative position and the second relative position, the computer system may estimate a path for the at least one neighboring vehicle. The computer system may then use the estimated path to determine an updated estimated location of the lane. For example, in embodiments where the at least one neighboring vehicle is traveling in a lane adjacent to the lane in which the vehicle is traveling, the computer system may determine the estimated location of the lane to be substantially parallel to the estimated path (e.g., the lane may be centered on a path that is shifted from the estimated path by, e.g., a predetermined lane width and may extend by half of the predetermined lane width on either side of the path). As another example, in embodiments where the at least one neighboring vehicle is traveling behind the vehicle in the lane in which the vehicle is traveling, the computer system may determine the estimated location of the lane to be an extrapolation (e.g., with constant curvature) of the estimated path. Other examples are possible as well.

In some embodiments, the computer system may additionally use a speed sensor to monitor a speed of the at least one neighboring vehicle and may modify a speed of the vehicle to be less than the speed of the at least one neighboring vehicle. This may allow the vehicle to be passed by the at least one neighboring vehicle. Once the at least one neighboring vehicle has passed the vehicle, the at least one neighboring vehicle may become a leading vehicle, either in a lane adjacent to the lane in which the vehicle is traveling or a leading vehicle that is in front of the vehicle in the lane in which the vehicle is traveling, and the computer system may estimate the location of the lane of the road based on an estimated path of the leading vehicle, as described above.

In some embodiments, the computer system may begin to monitor the at least one neighboring vehicle only in response to determining that the lane information has become unavailable or unreliable. In these embodiments, prior to determining that the lane information has become unavailable or unreliable, the computer system may rely solely on the lane information to estimate the location of the lane. In other embodiments, however, the computer system may also monitor the at least one neighboring vehicle prior to determining that the lane information has become unavailable or unreliable. In these embodiments, the computer system may additionally use the distance to the at least one neighboring vehicle to estimate the location of the lane in which the vehicle is traveling. For example, if the at least one neighboring vehicle is traveling in a lane adjacent to the lane in which the vehicle is traveling, the computer system may determine that the lane does not extend to the at least one neighboring vehicle. As another example, if the at least one neighboring vehicle is traveling behind the vehicle in the lane in which the vehicle is traveling, the computer system may determine that the lane includes the at least one neighboring vehicle. Other examples are possible as well. Alternatively, in these embodiments, prior to determining that the lane information has become unavailable or unreliable, the computer system may simply use the distance to the at least one neighboring vehicle to avoid collisions with the at least one neighboring vehicle.

Further, in some embodiments, once the vehicle begins to monitor the at least one neighboring vehicle, the computer system may stop using the lane information to estimate the location of the lane in which the vehicle is traveling. In these embodiments, the computer system may rely solely on the distance to the at least one neighboring vehicle to avoid collisions with the at least one neighboring vehicle until the lane information becomes available or reliable. For example, the computer system may periodically attempt to obtain updated lane information. Once the computer system determines that the lane information has become available or reliable, the lane information has become available or reliable, the computer system may once again rely on the updated estimated location of the lane and less (or not at all) on the distance to the at least one neighboring vehicle. The computer system may determine that the updated lane information is reliable when, for example, the computer system determines that a confidence of the updated lane information is greater than a predetermined threshold. The predetermined threshold may be the same as or different than the predetermined threshold.

Figure 11:
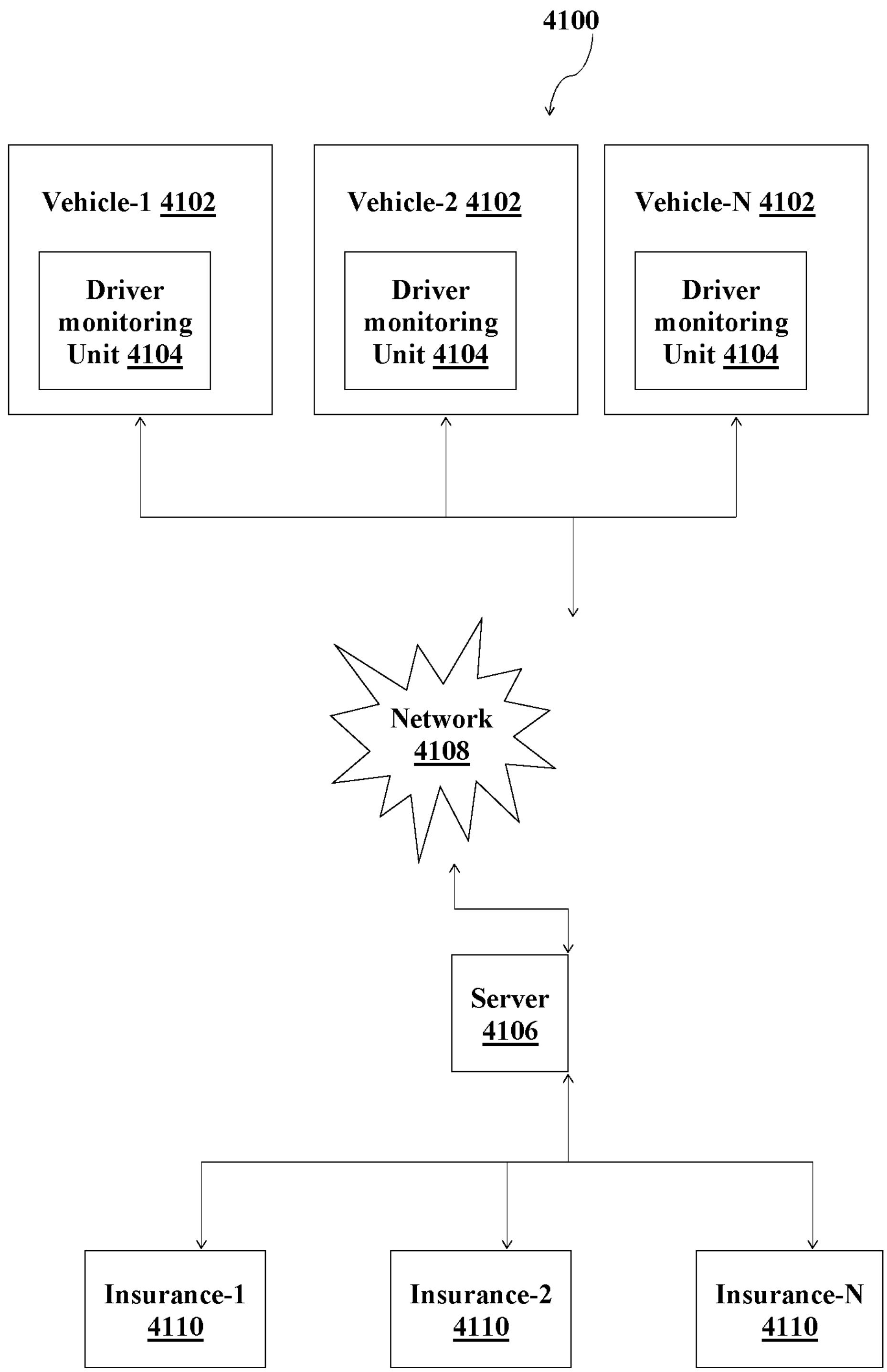
FIG. 11 illustrate a typical network environment in which the systems, methods for cloud based driver behavior capturing and monitoring.

FIG. 11 illustrate a typical network environment 4100 in which the systems, methods, and computer program products may be implemented, according to embodiments as disclosed herein. In an embodiment, the environment 4100 includes a plurality of drivers who are seeking insurance drive vehicles 4102. The vehicle 4102 described herein can be configured to include a driver monitoring unit 4104 installed thereon. The monitoring device may be self contained, such as a single unit mounted on a windshield or dashboard of the vehicle 4102. Alternatively, the monitoring device 4104 may include multiple components, such as a processor or central unit mounted under a car seat or in a trunk of the vehicle and a user interface mounted on a dashboard or windshield. Similarly, the monitoring unit 4104 may have a self-contained antenna in the unit or may be connected to remotely mounted antennas for communication with remote systems.

Further, the driver monitoring units 4104 may be connected to an on-board diagnostic system or data bus in the vehicle 4104. Information and behavior data associated with the driver may be collected from the on-board diagnostic system. The driver monitoring system may receive inputs from internal and external sources and sensors such as accelerometers, global positioning systems (GPS), vehicle on-board diagnostic systems, seatbelt sensors, wireless device, or cell phone use detectors, alcohol vapor detectors, or trans-dermal ethanol detection. Further, the details related to the driver monitoring unit 4104 are described in conjunction with the FIG. 12.

Further, the information may be exchanged between driver monitoring unit 104 and central monitoring system or server 4106 in real-time or at intervals. For example, the driver behavior parameters may be transmitted to server 4106 via a communication network 4108. In an embodiment, the communication network 4108 described herein can include for example, but not limited to, a cellular, satellite, Wi-Fi, Bluetooth, infrared, ultrasound, short wave, microwave, global system for mobile communication, or any other suitable network. The information sent to the server 4104 may then be forwarded with one or more insurance providers 4110. The server 4106 can be configured to process the driver behavior parameters and/or store the data to a local or remote database. The drivers or insurance provider can access the data on the server 4106. In some embodiments, the data captured by monitoring unit 4104 in the vehicle 4102 may be transmitted via a hardwired communication connection, such as an Ethernet connection that is attached to vehicle 4102 when the vehicle is within a service yard or at a base station or near the server 4106. Alternatively, the data may be transferred via a flash memory, diskette, or other memory device that can be directly connected to the server 4106.

In one embodiment of the invention, the data captured by driver monitoring unit 4104 can be used to monitor, provide feedback, mentor, provide recommendations, adjust insurance rates, and to analyze a driver's behavior during certain events. For example, if vehicle 4102 is operated improperly, such as speeding, taking turns too fast, colliding with another vehicle, or driving in an unapproved area, then the driver monitoring unit 4104 or server 4106 may adjust the insurance rates for the driver and provide feedback and suggestions to the driver, such as to improve the diving skills. Additionally, if the driver's behavior is inappropriate or illegal, such as not wearing a seatbelt or using a cell phone while driving then feedback and suggestions can be provided to the driver to improve the diving skills.

In an embodiment, the insurance price may be adjusted based on the driver behavior. For example, if an insurance company, supervisor, or other authority determines that the driver is uninsured, underinsured, lacking coverage required in a particular jurisdiction, that the driver's insurance premiums are delinquent, and/or if the vehicle is not properly registered and/or delinquent in registration with the state, then the driver monitoring unit 102 may be directed to disable or deactivate the vehicle. Alternatively, the driver monitoring unit 102 can provide feedback and recommendations to the driver if it is determined that the driver behavior is uninsured, underinsured, lacking coverage required in a particular jurisdiction, or that the driver's insurance premiums are delinquent. In an embodiment, the driver's behavior is typically evaluated while driving the vehicle 102 with the driver monitoring unit 104 installed thereon. After receiving the driver behavior data from the driver monitoring unit 104, the insurance rates can be adjusted accordingly.

Figure 12:
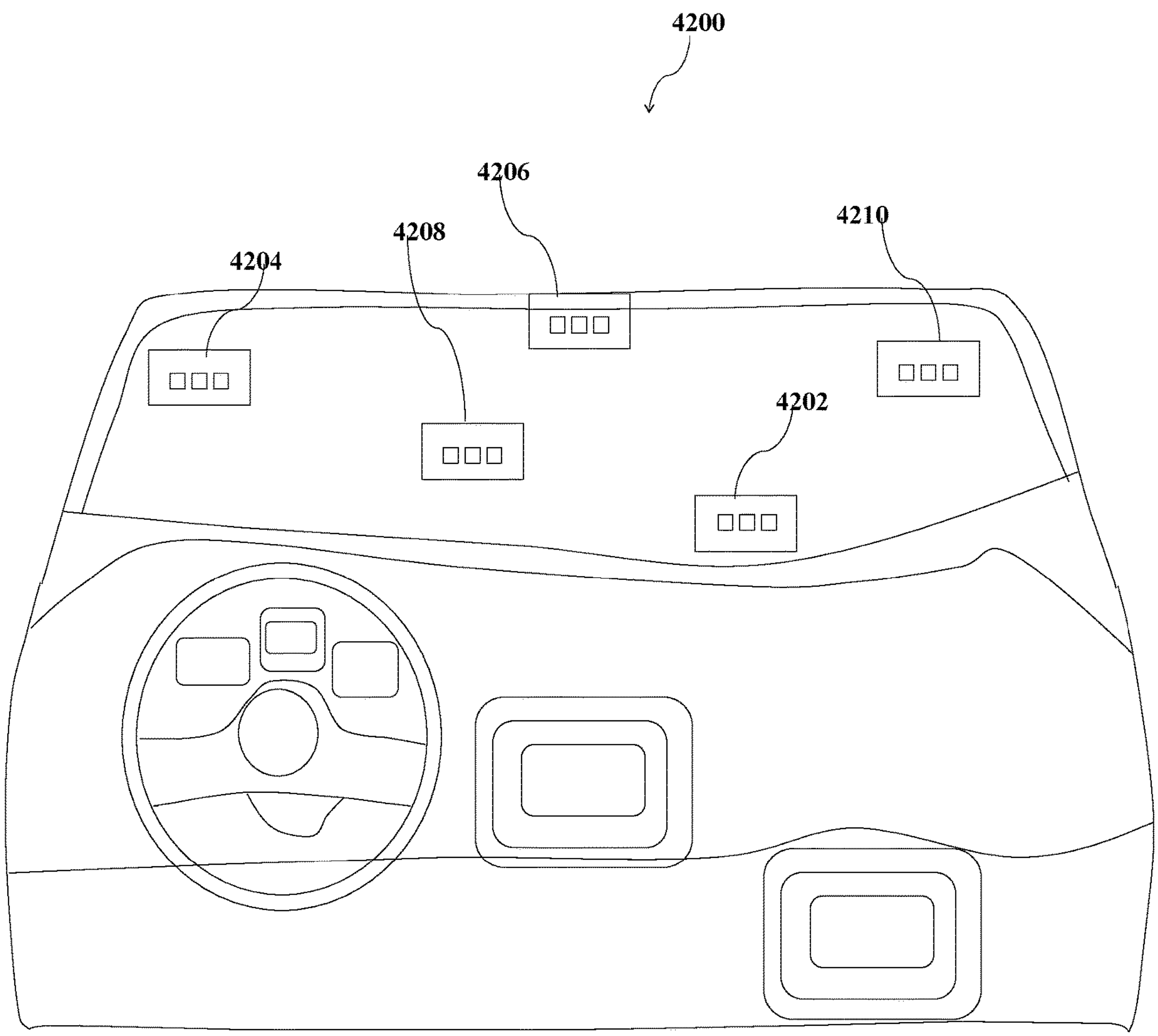
FIG. 12 is a diagram illustrating generally, a portion of vehicle alone with possible locations of sensors, cameras, among others.

FIG. 12 is a diagram illustrating generally, a portion of vehicle 4200 alone with possible locations of sensors, cameras, and/or other technologies, according to embodiments described herein. In an embodiment, exemplary mounted locations for the driver monitoring unit 4104 are illustrated, such as on a dashboard 4202, windshield 4204, headliner 4206, surface 4208, corner 4210. It will be understood that all or parts of the driver monitoring unit 4104 can be mounted in any other location that allows for audio and/or visual feedback to the driver of the vehicle 4102 while the vehicle is in operation. The driver monitoring unit 4104 is illustrated as being coupled to on-board diagnosis, from which it may receive inputs associated with the driver and vehicle operating parameters. The driver monitoring units such as 4202, 4204, 4206, 4208, and 4210 can be coupled to on-board diagnosis (not shown). Moreover, the driver monitoring system may be coupled to other sensors, such as a sensor for detecting the operation and use of a cellular or wireless device in the vehicle 4102.

In an embodiment, the driver monitoring units can be configured to include for example, but not limited to, accelerometer, cameras, gyroscope, magnetometer, and the like sensors. In an embodiment, the accelerometer can include at least one accelerometer for measuring a lateral (sideways), longitudinal (forward and aft) and vertical acceleration in order to determine whether the driver is operating the vehicle in an unsafe or aggressive manner. For example, excessive lateral acceleration may be an indication that the driver is operating the vehicle at an excessive speed around a turn along a roadway. Furthermore, it is possible that the driver may be traveling at a speed well within the posted speed limit for that area of roadway. However, excessive lateral acceleration, defined herein as "hard turns," may be indicative of aggressive driving behavior by the driver and may contribute to excessive wear on tires and steering components as well as potentially causing the load such as a trailer to shift and potentially overturn.

As such, it can be seen that monitoring such driver behavior by providing feedback and recommendations to the driver during the occurrence of aggressive driving behavior such as hard turns can improve safety and reduce accidents. In addition, providing recommendations for such aggressive driver behavior can reduce wear and tear on the vehicle and ultimately reduce fleet maintenance costs as well as reduce insurance costs and identify at risk drivers and driving behavior to fleet managers.

In one aspect, the driver monitoring system may be in data communication with an on board diagnostic (OBD) system of the vehicle such as via a port. In some vehicle models, the driver monitoring system is in data communication with a controller area network (CAN) system (bus) to allow acquisition of certain driver and vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation and a multitude of various other diagnostic parameters such as engine temperature, brake wear, and the like. The OBD or CAN allows for acquisition of the above-mentioned vehicle parameters for processing thereby and/or for subsequent transmission to the server 4106.

In an embodiment, the driver monitoring system may also include a GPS receiver (or other similar technology designed to track location) configured to track the location and directional movement of the driver in either real-time or over-time modes. As is well known in the art, GPS signals may be used to calculate the latitude and longitude of a driver as well as allowing for tracking of driver movement by inferring speed and direction from positional changes. Signals from GPS satellites also allow for calculating the elevation and, hence, vertical movement, of the driver.

In an embodiment, the driver monitoring unit may further include a mobile data terminal (MDT) mounted for observation and manipulation by the driver, such as near the vehicle dash. The MDT can be configured to include an operator interface such as a keypad, keyboard, touch screen, display screen, or any suitable user input device and may further include audio input capability such as a microphone to allow voice communications. The driver monitoring unit receives inputs from a number of internal and external sources. The OBD/CAN bus, which provides data from the vehicle's on-board diagnostic system, including engine performance data and system status information. A GPS receiver provides location information. The CDR, XLM, or accelerometers provide information regarding the vehicle's movement and driving conditions. Any number of other sensors, such as but not limited to, a seat belt sensor, proximity sensor, driver monitoring sensors, or cellular phone use sensors, also provide inputs to the driver monitoring system.

In an embodiment, the driver monitoring system may have any type of user interface, such as a screen capable of displaying messages to the vehicle's driver or passengers, and a keyboard, buttons or switches that allow for user input. The system or the user interface may have one or more status LEDs or other indicators to provide information regarding the status of the device's operation, power, communications, GPS lock, and the like. Additionally, the LEDs or other indicators may provide feedback to the driver when a driving violation occurs. Additionally, monitoring system may have a speaker and microphone integral to the device.

In an embodiment, the monitoring system may be self-powered, such as by a battery, or powered by the vehicle's battery and/or power generating circuitry. Access to the vehicle's battery power may be by accessing the power available on the vehicle's OBD and/or CAN bus. The driver monitoring system may be self-orienting, which allows it to be mounted in any position, angle or orientation in the vehicle or on the dashboard. In an embodiment, the driver monitoring system determines a direction of gravity and a direction of driver movement and determines its orientation within the vehicle using this information. In order to provide more accurate measurements of driver behavior, the present invention filters gravitational effects out of the longitudinal, lateral and vertical acceleration measurements when the vehicle is on an incline or changes its horizontal surface orientation. Driver behavior can be monitored using the accelerometer, which preferably will be a tri-axial accelerometer. Acceleration is measured in at least one of lateral, longitudinal and/or vertical directions over a predetermined time period, which may be a period of seconds or minutes. An acceleration input signal is generated when a measured acceleration exceeds a predetermined threshold.

It will be understood that the present invention may be used for both fleets of vehicles and for individual drivers. For example, the driver monitoring system described herein may be used by insurance providers to monitor, recommend, provide feedback, and adjust insurance rates based on the driving. A private vehicle owner may also use the present invention to monitor the driver behavior and user of the vehicle. For example, a parent may use the system described herein to monitor a new driver or a teenage driver behavior.

An embodiment of the invention provides real-time recommendations, training, or other feedback to a driver while operating the vehicle. The recommendations are based upon observed operation of the vehicle and are intended to change and improve driver behavior by identifying improper or illegal operation of the vehicle. The driver monitoring system may identify aggressive driving violations. For example, based upon the inputs from an acceleration or CDR, aggressive driving behavior can be detected, such as exceeding acceleration thresholds in a lateral, longitudinal, or vertical direction, hard turns, hard acceleration or jackrabbit starts, hard braking, and/or hard vertical movement of the vehicle.

Further, in an embodiment, the sensor and camera described herein can be configured to communicate with the vehicle entertainment system. Typically, this functionality includes pre-installed software or a user-downloadable application from a network source (such as Apple's iTunes or Google's Android Market). The system functionality may include mapping functions, directions, landmark location, voice-control, and many other desirable features. When such mobile computing device is placed within the vehicle then a convenient vehicle entertainment system associated with the vehicle can be provided. In an embodiment, a remote switch can be used to initiate the vehicle entertainment software application by communicating with the cameras/sensors located in the vehicle and/or software residing on the mobile computing device. Remote switch described herein can include one of a number of well-known remote switches that uses wireless or wired technology to communicate with mobile computing device. For example, remote switch may include for example, but not limited to, a Bluetooth, RF, infrared, or other well-known wireless communication technology, or it may be connected via one or more wires to mobile computing device. The switch may be located on any vehicle interior surface, such as on a steering wheel, visor, dashboard, or any other convenient location.

Figure 13:
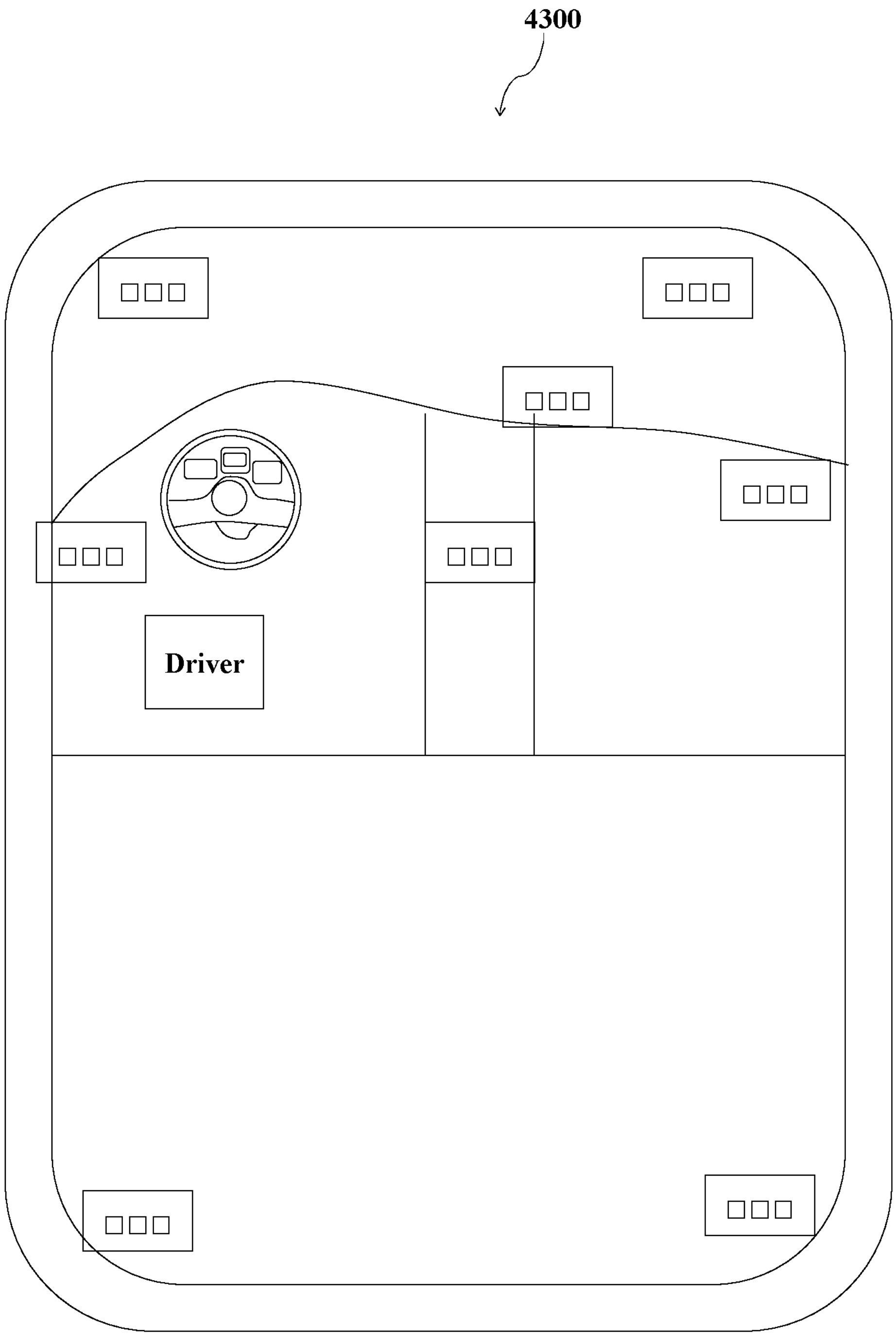
FIG. 13 is a diagram illustrating generally, possible locations of sensors, cameras, and/or other technologies.
Figure 14:
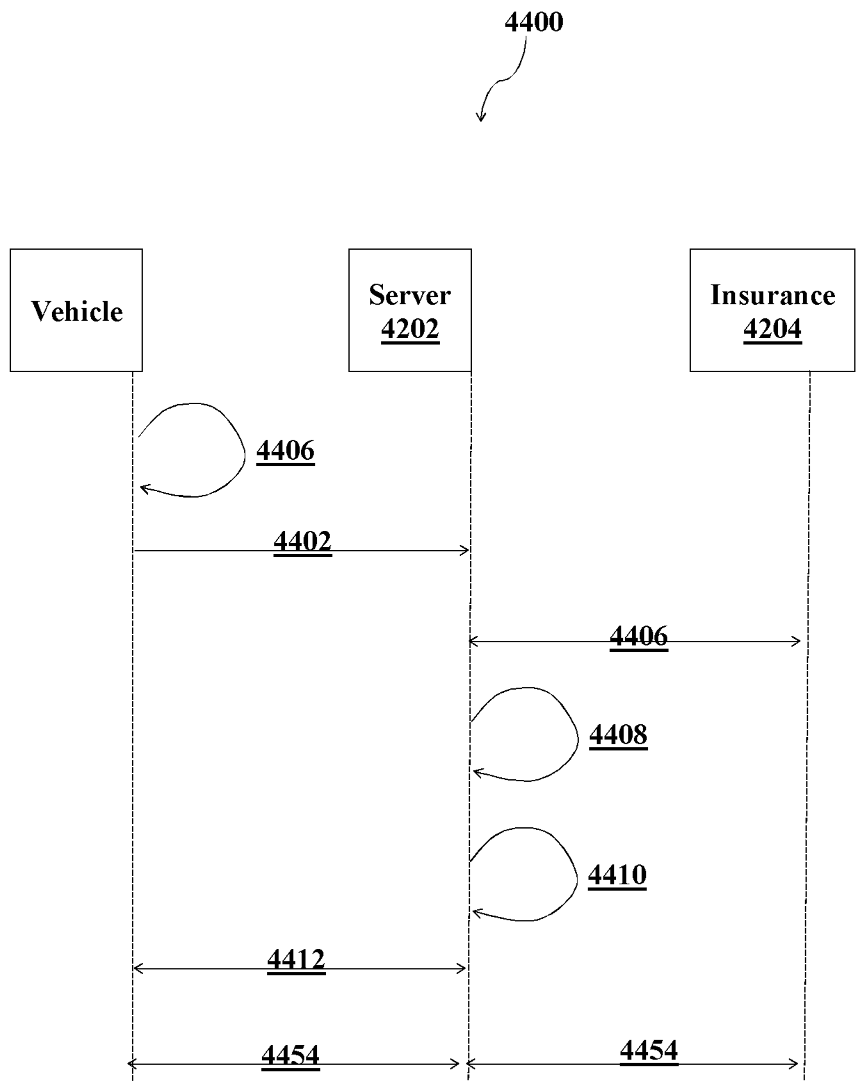
FIG. 14 is a sequence diagram illustrates generally, operations performed by the system as described in the FIG. 11.

FIG. 13 is a diagram 4300 illustrating generally, possible locations of sensors, cameras, and/or other technologies, according to embodiments described herein. FIG. 14 is a sequence diagram illustrates generally, operations 300 performed by the system as described in FIG. 11, according to embodiments described herein. In an embodiment, at 4402, the driver monitoring unit 104 can be configured to monitor the behavior of the driver. The system can be configured to include the driver monitoring unit 4104 installed in the vehicle 102 to monitor the behavior parameters of the driver while the vehicle 4102 is being driven. The vehicle 4102 can include cameras, gyroscope, magnetometer, accelerometer, and other sensors installed thereon to monitor the behavior parameter of the driver. In an embodiment, the cameras or sensors may be placed at any place in the vehicle, such as for example at four corners of the front windshield, in a way that it can directly capture the behavior parameters of the driver. For example, based on the driver gestures, the cameras can detect finger position to detect that driver is pointing at a particular object or vehicle and searches the internet for the vehicle. Further, in an embodiment, a flexible display film adhesively secured on the front windshield. The display can be used controlled by a computer to display info in a discrete way that may not take driver's eyes off the road and opposing vehicles. In an embodiment, at 4404, the driver monitoring unit 4102 can be configured to transmit the behavior parameters of the driver to the server 4106. In an embodiment, the driver behavior parameters described herein can include for example, but not limited to, vehicle speed, vehicle accelerations, driver location, seatbelt use, wireless device use, turn signal use, driver aggression, detection of CO2 vapor, detection of alcohol, driver seating position, time, and the like. In an embodiment, at 4406, the server 4106 can be configured to transmit the driver behavior parameters to one or more insurance providers. In an embodiment, at 4408, the server 4106 can be configured to analyze the driver behavior parameters and adjust the insurance rates for the driver. For example, if the driver is driving roughly by drinking alcohol then the insurance rate may get decreased. In an embodiment, at 4410, the server 4106 can be configured to match the driver behavior preferences with similar or substantially similar preferences of other drivers. The server 4104 can be configured to generate action recommendations best matching the behavior of the driver. In an embodiment at 4412, the server 4106 can be configured to provide the generated recommendations to the driver. Based on the driver behavior parameters the sever 4106 provides feedback and recommendations to the driver, such as to improve the driving skills. Further, in an embodiment, a flexible display film adhesively secured on the front windshield. The display can be used controlled by a computer to display info in a discrete way that may not take driver's eyes off the road and opposing vehicles. In an embodiment, at 4414, the server 4106 can be configured to frequently monitor the behavior parameters associated with the driver. Any changes in the behavior parameters can affect the overall system performance and the driver experience. The server 4106 can be configured to frequently monitor and dynamically update the insurance rate and action recommendations, which in turn helps the driver for effectively improving the driving skills.

Figure 15:
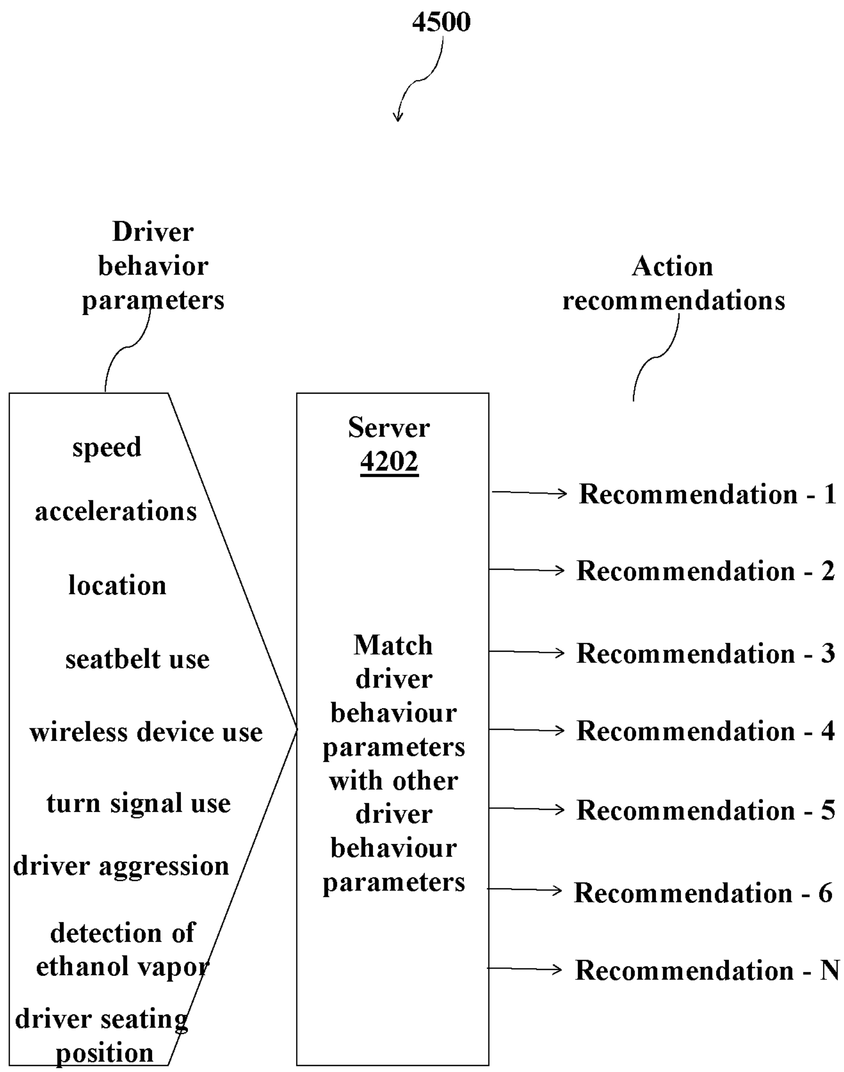
FIG. 15 is a diagram illustrates generally, an overview of a reasonableness determination system that may allow drivers to obtain action recommendations based on the driver behavior parameters, according to embodiments disclosed herein.

FIG. 15 is a diagram 4500 illustrates generally, an overview of a reasonable action determination system that may allow drivers to obtain action recommendations based on the driver behavior parameters, according to embodiments disclosed herein. In an embodiment, the driver behavior parameters can be used to provide customized recommendations to drivers by comparing the driver behavior parameters with other drivers who has similar or substantially similar behavior parameters. Unlike conventional system, the server 106 can be configured to adaptively generate action recommendations for the driver based on the behavior parameters. The server 106 can be configured to match the behavior parameters of the drivers to similar behavior parameters of the one or more drivers, such as to provide personalized action recommendations to the driver. In an embodiment, the recommendations can be filtered in advance of display. In an embodiment, filtered recommendations may be derived from the sources such as for example, but not limited to, those sources that have added the data within a specified time, from those sources that share specific similarities with the sources, those sources that have been preselected by the driver as relevant, those sources that are selected as friends or friends of friends, and the like, those sources that are determined to provide valuable reviews/ratings or are specifically declared to be experts within the system or by the driver, or those users that have entered at least a minimum amount of data into the system.

FIG. 16 is a diagram 4600 illustrates generally, an overview of preferences matching by the server 4106, according to embodiments disclosed herein. FIG. 16 outlines reasonableness determination functionality in accordance with an embodiment of the present invention. The system 4100 can monitor the driver behavior and uses the behavior data to match with the behavior data of other sources and provide reasonable recommendations to the driver. In an embodiment, the reasonableness recommendation rules may be established in the recommendation system such as described in the FIG. 16. Such rules derived from, for example, but not limited to, automatic generation machine learning, automatic generation using a generic algorithm, automatic generation using a neutral network, automatic generation using a rule inference system, data mining, generation using a preset list of recommendations, and/or a driver behavior. In an embodiment, the sever 106 can be configured to receive the recommendation rules such as unidirectional rules, bidirectional rules, generalized rules including multi-way rules, rules among items, rules among sets, rules among collections, rules with weight factors, rules with priorities, unweighted and un-prioritized rules, and the like.

Figure 17:
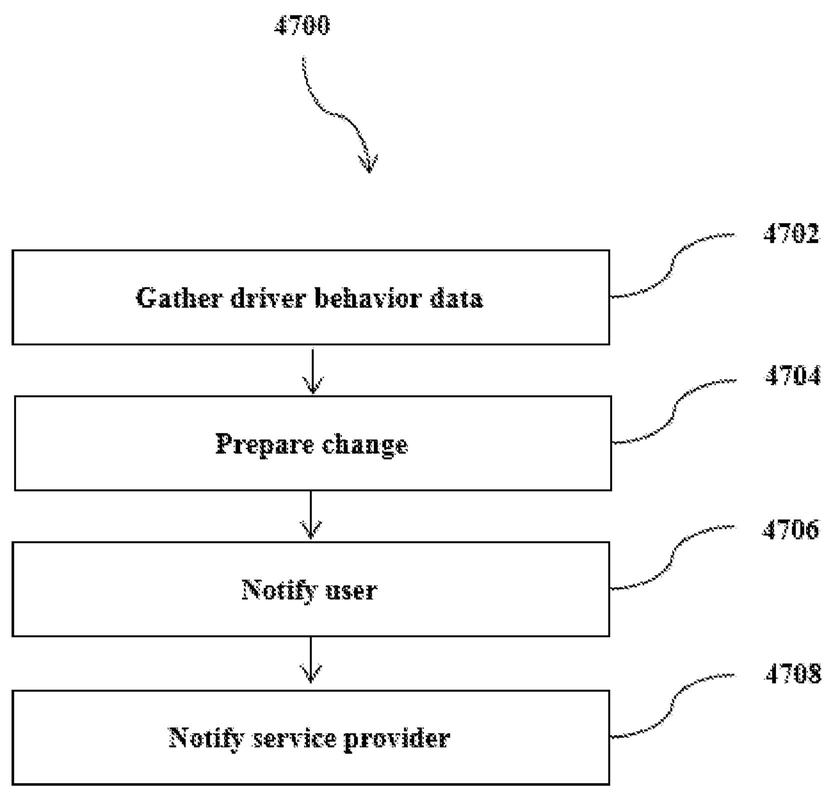
FIG. 17 is a flow chart illustrates generally, a method for selectively providing insurance information to a service provider, according to embodiments as disclosed herein.

FIG. 17 is a flow chart illustrates generally, a method 4700 for selectively providing reasonable driving information to a service provider, according to embodiments as disclosed herein. At step 4702, the autonomous behavior is monitored. The behavior data can include external parameters and/or internal parameters. In an embodiment, the autonomous behavior data/parameters described herein can include for example, but not limited to, vehicle speed, vehicle accelerations, driver location, seatbelt use, wireless device use, turn signal use, driver aggression, detection of ethanol vapor, driver seating position, time, and the like. In an embodiment, the behavior data can be over a period of hours, days, weeks, and so forth. In an embodiment, the behavior data gathering can be continuous, at predefined intervals, or at random intervals. In accordance with some aspects, data can be gathered while a vehicle is in operation and at other times (e.g., at two a.m. to determine where the vehicle is parked overnight). In an embodiment, a change to an insurance premium and/or an insurance coverage is prepared, at 4704. The change is based on one or more of the vehicle behavior data, wherein each item of driver behavior data can have a different weight assigned. For example, data gathered related to weather conditions might be given less weight than data gathered related to user distractions (e.g., passengers, use of a mobile device while vehicle is in operation, and so forth). In another example, excessive speed might be assigned a higher weight than data related to safety performance of the vehicle. As such, data with a higher weight can be given more consideration than data with a lower weight (e.g., data assigned a higher weight can have a greater impact on the cost of insurance). Thus, if the user is traveling at (or below) the speed limit and speed is assigned a greater weight, then the safe speed will tend to decrease (or remain constant) the cost of insurance.

In an embodiment, the autonomous controller is notified of the change, at 4706. The notification can be in any perceivable format. In an example, the notification is provided as a dashboard-mounted display. In another example, presenting the change can include displaying the modified cost of the insurance policy in a dashboard-mounted display and/or a heads-up display. In an embodiment, a service provider is notified of the change, at 708. At substantially the same time as notifying the service provider (or trusted third party) of the change, parameters taken into consideration (and associated weight) can also be provided. In such a manner, the service provider (or third party) can selectively further modify the cost of insurance, which can be communicated to the user though the vehicle display or through other means.

The service provider (or third party) might be provided the change information less often than the insurance cost change information is provided to the user. For example, the user can be provided the insurance cost change information dynamically and almost instantaneously with detection of one or more parameters that can influence the insurance cost. However, the insurance provider (or third party) might only be notified of the change after a specified interval (or based on other intervals). For example, insurance cost changes might be accumulated over a period of time (e.g., two weeks) and an average of the insurance cost changes might be supplied to insurance provider. In such a manner, the user has time to adjust parameters that tend to increase (or decrease) the cost of insurance, which allows the user to have more control over the cost of insurance.

In an embodiment, Vertical market specialization for insurance is provided where markets are defined based on granular aspects of coverage and presented to one or more insurance subsystems to obtain quotes for a coverage premium. Such specialization allows insurance companies to compete in more specific areas of insurance coverage, which allows for more accurate premium rates focused on the specific areas or one or more related scenarios. In addition, the granular aspects of coverage can be provided to one or more advertising systems in exchange for further lowered rates, if desired.

According to an example, an insurance market can be defined based on granular information received regarding an item, a related person, use of the item, etc. Based on the market, premium quotes can be obtained from one or more insurance subsystems related to one or more insurance brokers. In addition, rates can be decreased where the granular information can be provided to an advertising system, in one example. In this regard, targeted advertisements can additionally be presented to system related to requesting the insurance coverage. Policies can be automatically selected based on preferences, manually selected using an interface, and/or the like.

Figure 18:
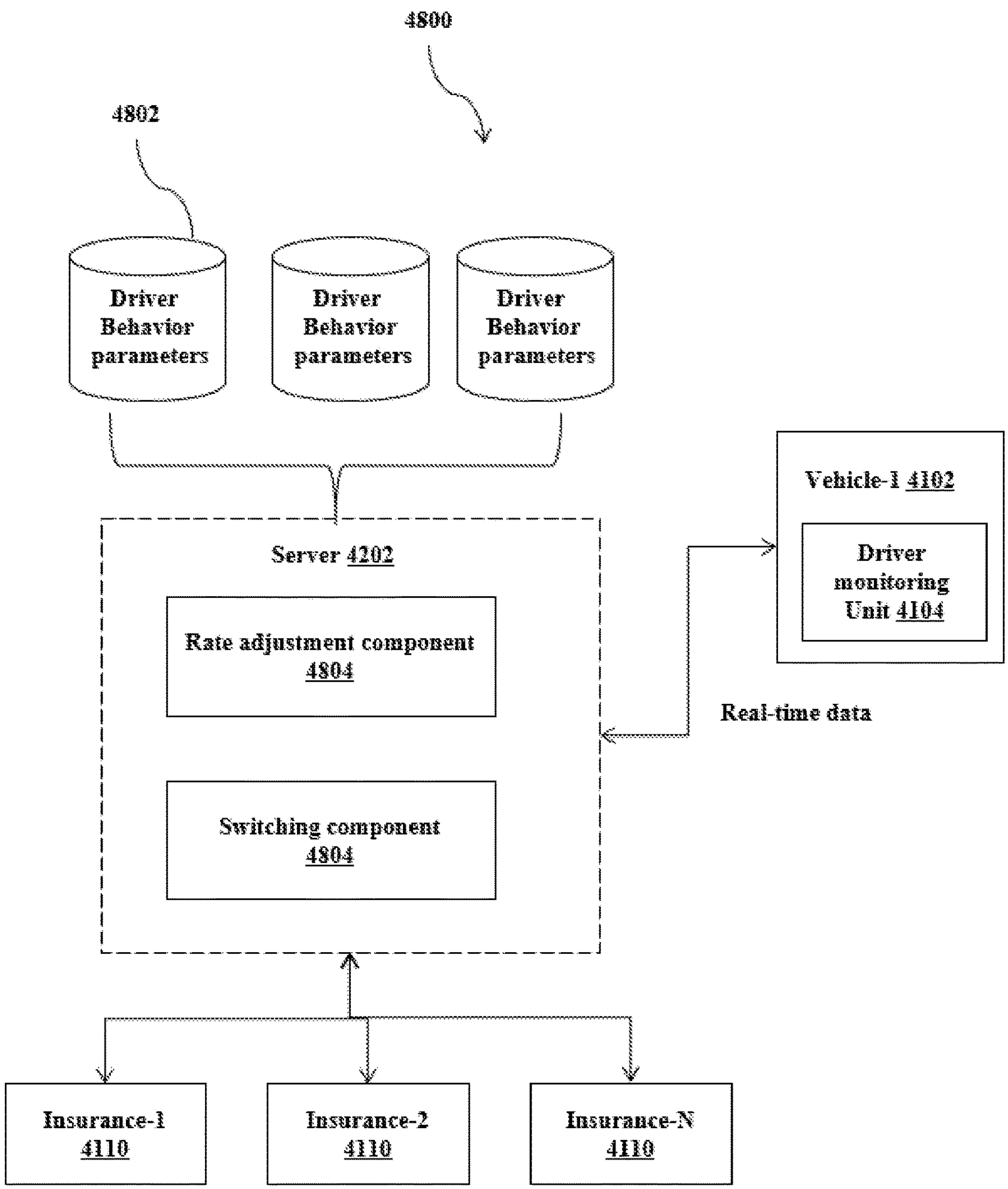
FIG. 18 is a diagram illustrates generally, an exemplary system that customizes insurance rates to correspond to behavior driver, according to embodiments as disclosed herein.

FIG. 18 is a diagram 4800 illustrates generally, an exemplary system that customizes insurance rates to correspond to behavior driver, according to embodiments as disclosed herein. In an embodiment, the server 4106 can be configured to maintain a database component 4802 including data related to different driver behaviors. Such leveraging from data banks enables insurance providers to bid in real time, and hence an owner and/or user of a vehicle can benefit from competition among various insurance providers, to obtain optimum rates. The server includes a rate adjustment component 4804 that in real time can determine the various rates from a plurality of insurance providers 4110 (1 to N, where N is an integer). In one particular aspect, a retrieval agent (not shown) associated with the rate adjustment component 4804 can pull insurance data from the insurance providers based on the contextual data supplied thereto. For example, such contextual data can be data records related to driver behavior, the vehicle 4102 (such as auto shop service records, current service status for the car, and the like), data related to the individual driver (such as health records, criminal records, shopping habits, and the like), data related to the environment (road condition, humidity, temperature, and the like) and data related to real time driving (frequency of braking, accelerating, intensity of such actions, and the like).

The retrieval agent (not shown) can pull data from the insurance providers 4110 and further publish such data to enable a rich interaction between the users on a display or a within a written communication environment. The retrieval agent can further generate an instance for a connection with the insurance providers. Accordingly, a connection instance can be employed by the rate adjustment component 4804 to store connection information such as the state of data conveyance, the data being conveyed, connection ID and the like. Such information can additionally be employed to monitor progress of data transfer to the written communication environment or display, for example.

Accordingly drivers/owners of motor vehicles can pull or receive data from the insurance providers 4110, wherein received data can be posted (e.g., displayed on a monitor) and the connection instance can be concurrently updated to reflect any successful and/or failed data retrievals. Thus, at any given moment the connection instance can include the most up-to-date version of data transferred between the motor vehicle and the insurance providers. In an embodiment, a switching component 4806 can be configured to automatically switch user/driver to an insurance provider/company that bids the best rate. Such switching component 4806 can employ interrupts both in hardware and/or software to conclude the switching from one insurance provider to another insurance provider. For example, the interrupt can convey receipt of a more optimal insurance rate or completion of a pull request to the insurance providers 4110 or that a configuration has changed. In one particular aspect, once an interrupt occurs, an operating system analyzes the state of the system and performs an action in accordance with the interrupt, such as a change of insurance provider, for example Such interrupts can be in form of asynchronous external events to the processor that can alter normal program flow. Moreover, the interrupts can usually require immediate attention from a processor(s) associated with the system. In one aspect, when an interrupt is detected, the system often interrupts all processing to attend to the interrupt, wherein the system can further save state of the processor and instruction pointers on related stacks.

According to a further aspect, the switching component 4804 can employ an interrupt dispatch table in memory, which can be accessed by the processor to identify a function that is to be called in response to a particular interrupt. For example, a function can accept a policy from an insurance provider, cancel an existing policy, and/or clear the interrupt for a variety of other reasons. The function can execute processes such as clearing the state of the interrupt, calling a driver function to check the state of an insurance policy and clearing, setting a bit, and the like.

Figure 19:
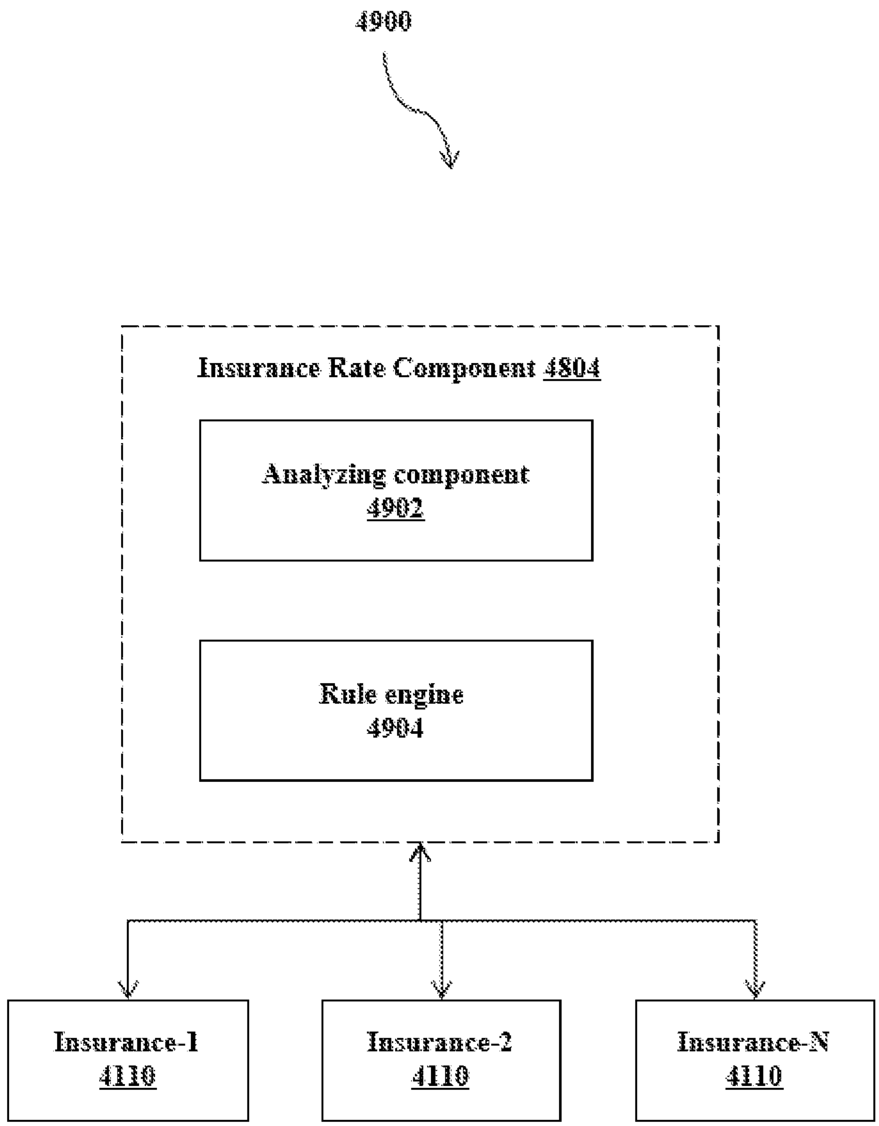
FIG. 19 is a diagram illustrates generally an insurance rate adjustment component that further includes an analyzer component, according to embodiments as disclosed herein.

FIG. 19 is a diagram 4900 illustrates generally, the switching component 806 that further includes an analyzer component 4902, which further employs threshold ranges and/or value(s) (e.g., pricing ranges for insurance policies, terms of the insurance policy, and the like) according to a further aspect of the present invention. The analyzer component 4902 can be configured to compare a received value for insurance coverage to the predetermined thresholds, which can be designated by an owner/driver. Accordingly, the analyzer component 902 can determine if the received insurance coverage policies are within the desired range as specified by a user an “accept” or “reject”, and/or further create a hierarchy from “low” to “high” based on criteria designated by the user (e.g., price of the insurance policy, terms of the insurance policy, and the like).

According to a further aspect, the analyzer component 4902 can further interact with a rule engine component 4904. For example, a rule can be applied to define and/or implement a desired evaluation method for an insurance policy. It is to be appreciated that the rule-based implementation can automatically and/or dynamically define and implement an evaluation scheme of the insurance policies provided. Accordingly, the rule-based implementation can evaluate an insurance policy by employing a predefined and/or programmed rule(s) based upon any desired criteria (e.g., criteria affecting an insurance policy such as duration of the policy, number of drivers covered, type of risks covered, and the like).

In a related example, a user can establish a rule that can implement an evaluation based upon a preferred hierarchy (e.g., weight) of criteria that affects the insurance policy. For example, the rule can be constructed to evaluate the criteria based upon predetermined thresholds, wherein if such criteria does not comply with set thresholds, the system can further evaluate another criteria or attribute(s) to validate the status (e.g., “accept” or “reject” the insurance bid and operate the switching component based thereon). It is to be appreciated that any of the attributes utilized in accordance with the subject invention can be programmed into a rule-based implementation scheme.

Figure 20:
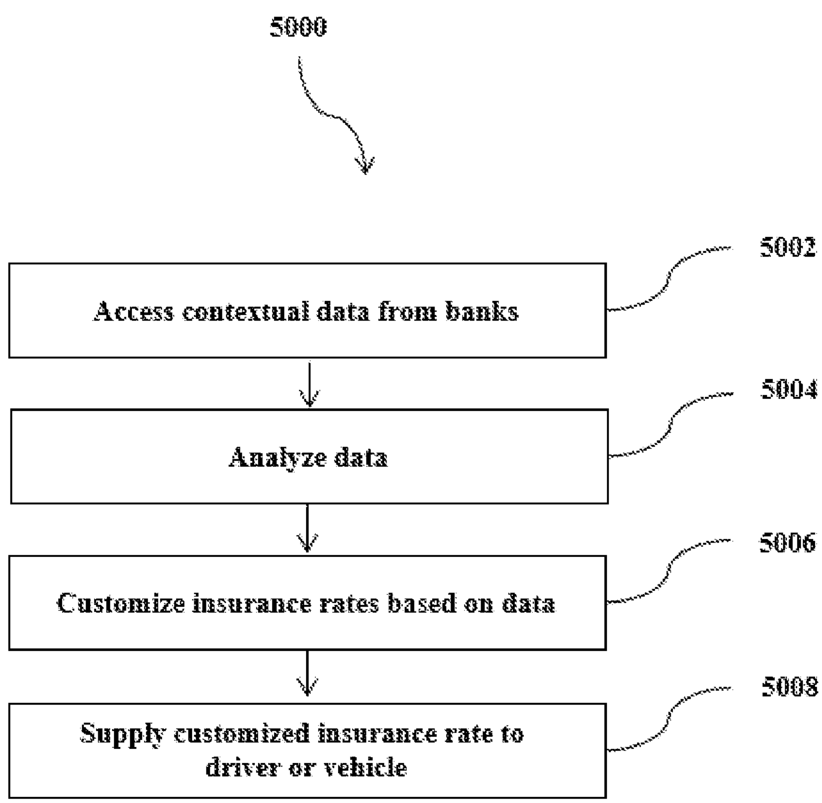
FIG. 20 illustrates generally, a method for customizing insurance rates of a driver, according to embodiments as described herein.

FIG. 20 illustrates generally, a method 5000 for customizing insurance rates of a driver, according to embodiments as described herein. The methodology 5000 of customizing insurance rates according to a further aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 5002 contextual data from various data banks can be accessed by the insurance providers or supplied thereto. As explained earlier, the data banks can include data pertaining to the motor vehicle (e.g., maintenance history, current vehicle conditions, and the like), data related to the driver (e.g., via health insurance records, police records, internet records, and the like), and data related to operating environment (e.g., weather, geographical location, and the like.) Moreover, the real-time contextual driving data can include both an intensity portion and a frequency portion, which represent severity and regularity of driving episodes (e.g., slamming the brakes, gradual/sudden deceleration, velocity variances, and the like). Subsequently and at 5004, such data can be analyzed by the insurance providers as to customize an insurance rate based thereon at 5006. In an embodiment, insurance rate can be calculated in real-time and as such can more accurately reflect appropriate coverage for a situation of a driver. A plurality of different factors can influence a likelihood of the driver being involved in an accident, having a vehicle stolen, and the like. For example, if the driver is travelling through bad weather, then risk can be higher and a rate can be increased in real-time as weather conditions change-conversely, if there is relatively little traffic surrounding the driver's vehicle, then the rate can be lowered. An algorithm or complex model can be used to calculate the insurance rates and can be disclosed to the driver through the display. In an embodiment, the rate adjustment component 804 can be configured to evaluate the insurance rate information against current vehicle operation by the driver. Specifically, the evaluation can compare the current operation against insurance rate information to determine if an appropriate rate is being used, if the rate should be changed, what the change should be, etc. For instance, different aspects of vehicle operation can be taken into account such as for example, but not limited to, weather and how a driver reacts, speed (of a vehicle), traffic and how the driver reacts, and noise {e.g., radio level), and the like.

Subsequently, the customized insurance rate can then be sent from an insurance provider to an owner/driver of the vehicle (e.g., in form of an insurance bid) at 5008. For example, the insurance rate can be determined and represented upon the driver via the display or controller in the vehicle. A processor that executes the computer executable components stored on a storage medium can be employed. In an embodiment, the monitoring unit can communicate with an insurance company {e.g., continuous communication) and obtain an insurance rate directly. The system can be configured to customize the insurance based on the obtained insurance rates and present to the driver and make appropriate modification to the display automatically.

Figure 21:
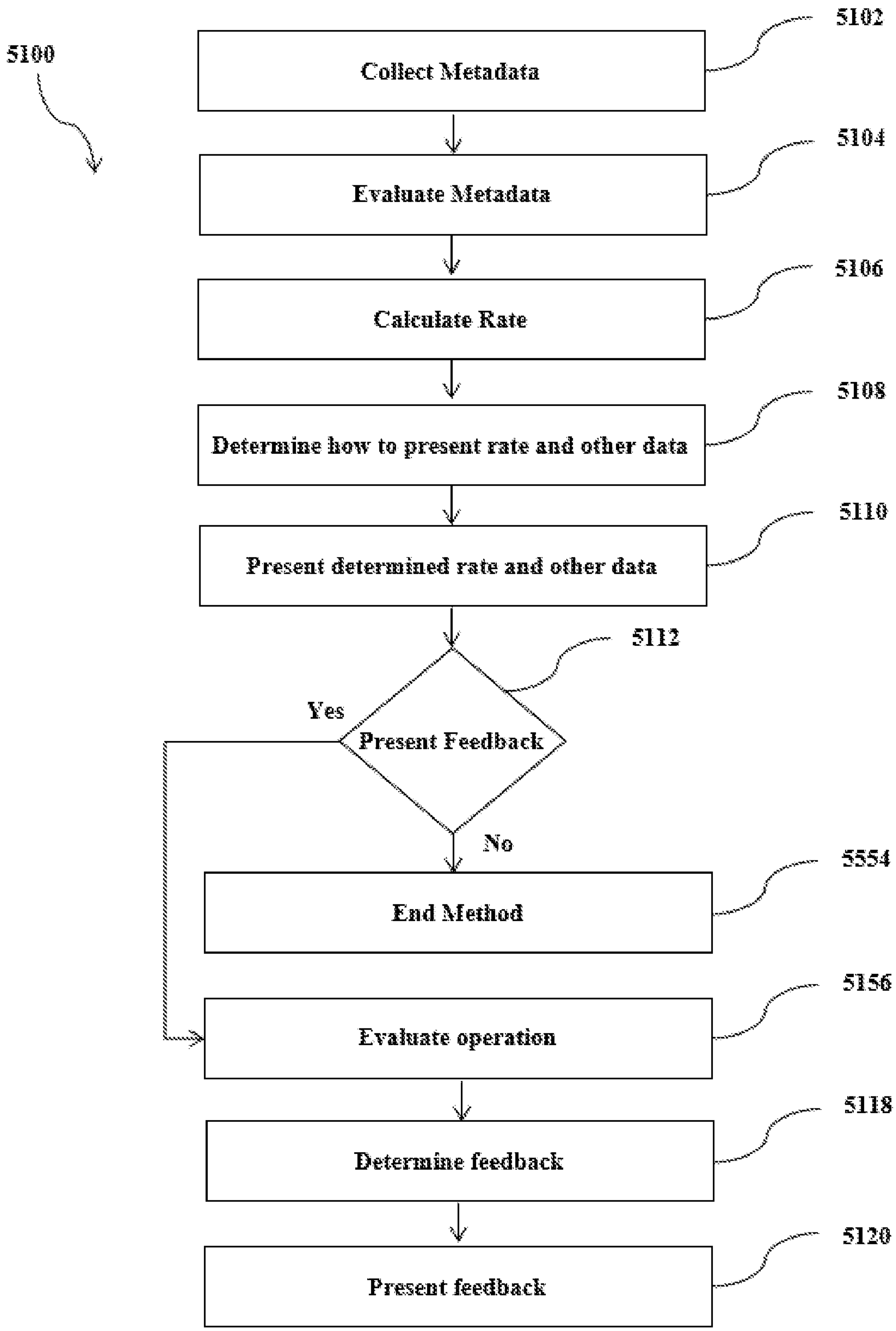
FIG. 21 illustrates generally, a method for presenting information related to a real-time insurance rate, according to embodiments as described herein.

FIG. 21 illustrates generally, a method 1100 for presenting information related to a real-time insurance rate, according to embodiments as described herein. In an embodiment, at 5102, Metadata can be collected pertaining to real-time operation of a vehicle and at least a portion of the metadata can be evaluated, as shown at 5104. The metadata described herein can include driver behavior data, contextual information, driver history, and real-time driving information that relates to operation of a driver and vehicle, and the like. Based upon a result of the evaluation, there can be calculation a real-time insurance rate, such as shown at 5106. In an embodiment, at 5108, determination can be made on how to present the calculated rate. For example, the determination can be if the rate should be shown on a center console or a heads-up display. A determination can also be made on how to display data (e.g., if a numerical rate should be disclosed or a color element should be lit). Additionally, a determination can be made on other data to disclose, such as safety, environment impact, cost of operating vehicle, a target speed, group rank, and the like. The determined rate and other determined data can be presented through a display, such as shown at 5110. Thus, the determined rate is presented upon a display viewable to the driver of the vehicle.

In an embodiment, at 5112, the method 5100 includes determining if feedback should be presented to the user. The feedback can be supplied in real-time as well as be a collective summary presented after a driving session is complete. If no feedback should be presented, then the method 5100 can end at 5114. In one instance, if there is a new driver attempting to obtain a full drivers license (e.g., teenage driver) or newer driver, then the check 5112 can determine feedback should be automatically provided. In another embodiment, an operator can be solicited on if feedback should be presented depending on a response the method 5100 can end or continue.

Operation of the vehicle and driver can be evaluated at 5116, which can occur though different embodiments. As a user operates a vehicle, metadata can be collected and evaluated in real-time. In an alternative embodiment, data can be collected, but evaluation does not occur until the check 5112 determines feedback should be presented. At 5118, there can be determining feedback for suggesting future driving actions for the operator to perform in future driving to lower the insurance rate. The method 5100 can include presenting the feedback (e.g., through the display, through a printout, transferring feedback as part of e-mail or a text message, etc.) at 5120. The feedback can be directly related to a driving session as well as is an aggregate analysis of overall driving performance (e.g., over multiple driving sessions).

Figure 22:
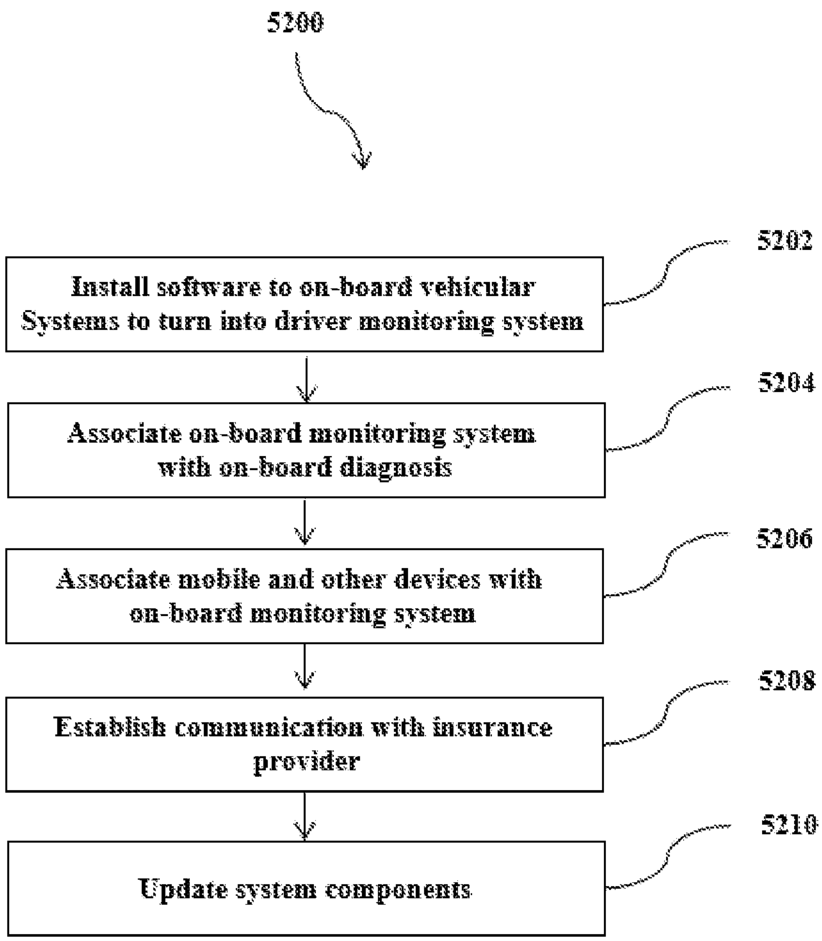
FIG. 22 is diagram illustrates generally, a method for installation of a real-time insurance system, according to embodiments disclosed herein.

FIG. 22 is diagram illustrates generally, a method 5200 for installation of a real-time insurance system, according to embodiments disclosed herein. In an embodiment, at 5202, an on-board monitoring system (such as driver monitoring unit) 4102 is installed in a vehicle to facilitate the collection of real-time data from the vehicle and forwarding of the real-time data to an insurance provider. At 5204, the on-board monitoring system can be associated with the on-board data/diagnostic control units and system(s) incorporated into the vehicle. The on-board data/diagnostic control units and system(s) can include the vehicles engine control unit/module (ECU/ECM), transmission control unit (TCU), power train control unit (PCU), on-board diagnostics (OBD), sensors and processors associated with the transmission system, and other aspects of the vehicle allowing the on-board monitoring system to gather sufficient data from the vehicle for a determination of how the vehicle is being driven to be made. The on-board monitoring system can be communicatively coupled by hard wiring to the on-board diagnostic system(s) or the systems can be communicatively associated using wireless technologies.

In an embodiment, at 5206, a mobile device (e.g., a cell phone) can be associated with the onboard monitoring system where the mobile device can facilitate communication between the on-board monitoring systems with a remote insurance provider system. The mobile device provides identification information to the on-board monitoring system to be processed by the on-board monitoring system or forwarded an insurance provider system to enable identification of the driver.

In an embodiment, at 5208, communications are established between the on-board monitoring system and the mobile device with the remote insurance provider system. In one embodiment it is envisaged that the on-board monitoring system and the insurance provider system are owned and operated by the same insurance company. However, the system could be less restricted whereby the insurance provider system is accessible by a plurality of insurance companies with the operator of the on-board monitoring system, e.g., the driver of the vehicle to which the on-board monitoring system is attached, choosing from the plurality of insurance providers available for their particular base coverage. In such an embodiment, upon startup of the system the insurance provider system can default to the insurance company providing the base coverage and the operator can select from other insurance companies as they require. Over time, as usage of the on-board monitoring system continues, at 5210, there is a likelihood that various aspects of the system might need to be updated or replaced, e.g., software update, hardware updates, etc., where the updates might be required for an individual insurance company system or to allow the on-board monitoring system to function with one or more other insurance company systems. Hardware updates may involve replacement of a piece of hardware with another, while software updates can be conducted by connecting the mobile device and/or the on-board monitoring system to the internet and downloading the software from a company website hosted thereon. Alternatively, the software upgrade can be transmitted to the mobile device or the on-board monitoring system by wireless means. As a further alternative the updates can be conferred to the mobile device or the on-board monitoring system by means of a plug-in module or the like, which can be left attached to the respective device or the software can be downloaded there from.

Figure 23:
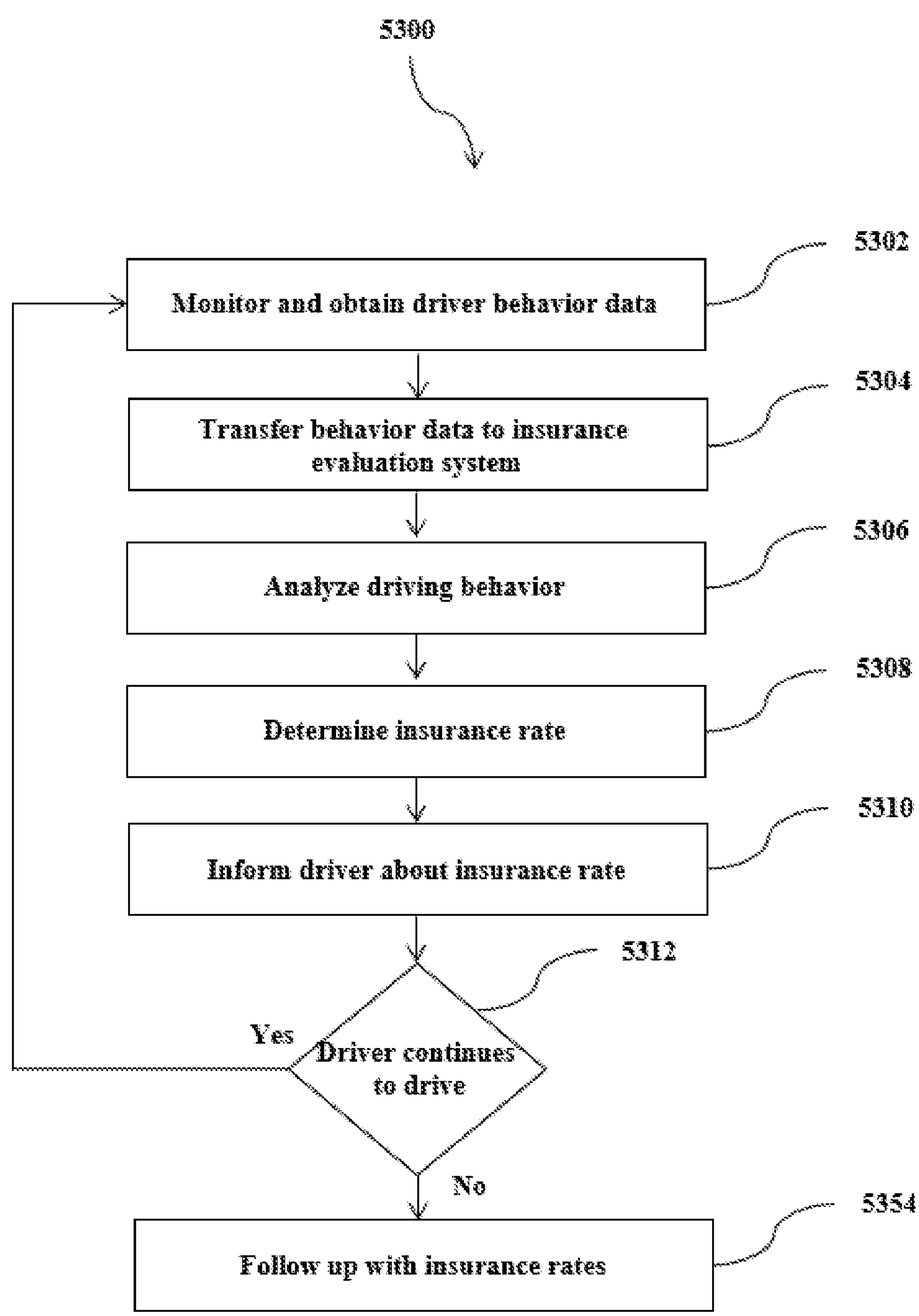
FIG. 23 is a diagram illustrates generally, a method for gathering information from an on-board monitoring system employed in a real-time insurance system, according to embodiments as disclosed herein.

FIG. 23 is a diagram illustrates generally, a method for gathering information from an on-board monitoring system employed in a real-time insurance system, according to embodiments as disclosed herein. In an embodiment, at 5302, monitoring of the driver and the vehicle they are operating is commenced. Monitoring can employ components of an on-board monitoring system, mobile device components, e.g., cell phone system, or any other system components associated with monitoring the vehicle as it is being driven. Such components can include a global positioning system (GPS) to determine the location of the vehicle at any given time, such a GPS can be located in a cell phone, as part of the on-board monitoring system, or an external system coupled to the monitoring system/cell phone—such an external system being an OEM or after sales GPS associated with the vehicle to be/being driven. A video data stream can be gathered from a video camera coupled to the on-board monitoring system recording the road conditions, etc. throughout the journey. Information can also be gathered from monitoring/control system(s) that are integral to the vehicle, e.g., the vehicle's engine control unit/module (ECU/ECM) that monitors various sensors located throughout the engine, fuel and exhaust systems, etc.

In an embodiment, at 5304, the dynamically gathered data (or driver behavior data) is transmitted to an insurance evaluation system. In an embodiment, at 5306, the gathered data is analyzed. Such analysis can involve identifying the route taken by the driver, the speed driven, time of day the journey was undertaken, weather conditions during the journey, other road traffic, did the user use their cell phone during the journey?, and the like. In an embodiment, at 5308, the gathered data is assessed from which an insurance rate(s) can be determined. For example, if the driver drove above the speed limit then an appropriate determination could be to increase the insurance premium. In an embodiment, at 5310, the driver can be informed of the newly determined insurance rate. Any suitable device can be employed such as informing the user by cell phone, a display device associated with the on-board monitoring system, or another device associated with the vehicle. The information can be conveyed in a variety of ways, including a text message, a verbal message, graphical presentation, change of light emitting diodes (LED's) on a display unit, a HUD, etc. At 5312, the driver can continue to drive the vehicle whereby the method can return to 5302 where the data gathering is commenced once more.

Alternatively, in an embodiment, at 5312, the driver may complete their journey and data gathering and analysis is completed. In an embodiment, at 5314 the driver can be presented with new insurance rates based upon the data gathered while they were driving the vehicle. The new insurance rates can be delivered and presented to the driver by any suitable means, for example the new insurance rates and any pertinent information can be forwarded and presented to the driver via a HUD employed as part of the real time data gathering system. By employing a HUD instantaneous notifications regarding a change in the driver's insurance policy can be presented while mitigating driver distractions {e.g., line of sight remains substantially unchanged). Alternatively, the on-board monitoring system can be used, or a remote computer/presentation device coupled to the real time data gathering system where the information is forwarded to the driver via, e.g., email. In another embodiment, the driver can access a website, hosted by a respective insurance company, where the driver can view their respective rates/gathered information/analysis system, etc. Further, traditional means of communication such as a letter can be used to forward the insurance information to the driver.

Figure 24:
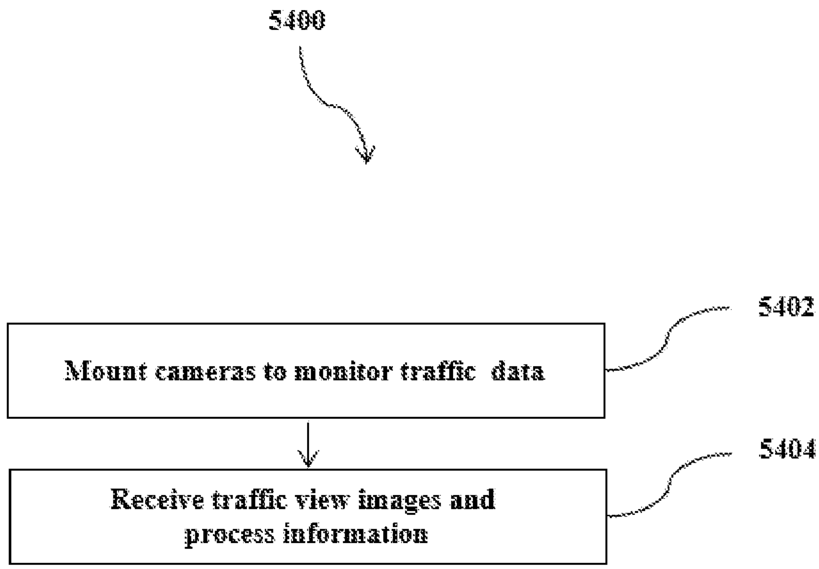
FIG. 24 is a diagram illustrates generally, a method mounting cameras to capture traffic information, according to embodiments as disclosed herein.

FIG. 24 is a diagram illustrates generally, a method 5400 mounting cameras to capture traffic information, according to embodiments as disclosed herein. In an embodiment, at 5402, the method 5400 includes mounting cameras on the car to monitor the traffic information. For example, the car may include cameras mounted to capture views in the rearward, downward, and the like directions, on the upper surface at the leading end of the front portion thereof. The position for mounting the cameras is not limited to the left side, right side, upper surface, front side, back side, and the like. For example, if the car has a left side steering wheel, the camera may be mounted on a right upper surface at a leading end of the front portion of the car. The cameras may have an angle of view of about 60, 90, 180, and 360 degree. With the construction, since the camera is mounted for a view in the rearward and downward directions on the front portion of the car, it can capture a wide area of the surface of the road in the vicinity of the driver's car, and an area in the vicinity of the left front wheel. Furthermore, the camera can also capture a part of the body of the car in the vicinity of the front wheel. Thereby, the relation between the car and the surface of the road can be recorded. In an example, the cameras can be configured to capture images of the road views including potential collision events such as how close car is following car in front, how often brake is used in period of time, hard brakes count more to reduce driver rating, how frequently does car come close to objects and obstructions (such as trees, cars on the other direction and cars in same direction) while moving.

In an embodiment, at 5404, the method 5400 includes receiving the recorded information from the camera and use image processing techniques to process the information. For example, the system uses image processing techniques to determine potential collision events such as how close car is following car in front, how often brake is used in period of time, hard brakes count more to reduce driver rating, how frequently does car come close to objects and obstructions (such as trees, cars on the other direction and cars in same direction) while moving.

Figure 25:
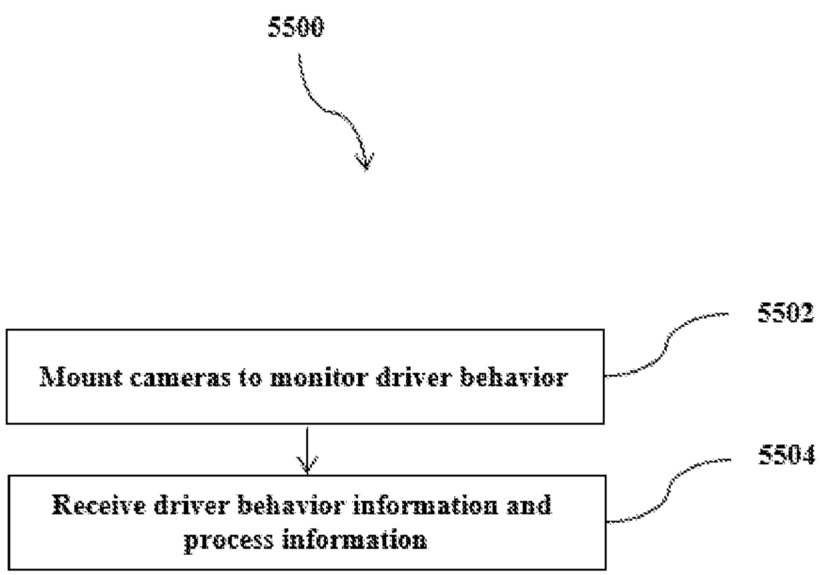
FIG. 25 is a diagram illustrates generally, a method mounting cameras to capture driver behavior, according to embodiments as disclosed herein.

FIG. 25 is a diagram illustrates generally, a method 5500 mounting cameras to capture driver behavior, according to embodiments as disclosed herein. In an embodiment, at 5502, the method 5500 includes mounting cameras on the car to monitor the driver behavior. The position for mounting the cameras is not limited to the left side, right side, upper surface, front side, back side, and the like. The cameras may have an angle of view of about 60, 90, 180, and 360 degree. For example, the camera can capture driver behavior such as for example, but not limited to, images of texting and use of phone while driving, speech of driver shouting or cursing at other drivers or other occupants, indications of intoxication, sleepiness, alcohol level, mood, aggressiveness, and the like. In an embodiment, at 5504, the method 5500 includes receiving the recorded information from the camera and use image processing techniques and voice reorganization techniques to process the information. For example, the system uses image processing techniques to determine the driver activity such as whether the driver is using mobile phone while driving. In another example, the system uses voice recognition techniques to determine the use voice, text, aggressiveness, and the like.

In an embodiment, the item-centric approach determines that many drivers having similar behavior and the driver who performs activity-A will also perform activity-B. This has proven to be fairly effective. On the other hand, many insurance providers interact with drivers online/offline. Such interaction can produce a stream of contextual information that recommendation engines can use. Early systems were batch oriented and computed recommendations in advance for each driver. Thus, they could not always react to a driver's most recent behavior. Recommendation engines work by trying to establish a statistical relationship between drivers and activities associated with there behavior. The system establishes these relationships via information about driver's behavior from vehicle owner, monitoring devices, sensors, and the like.

In an embodiment, the reasonableness determination systems collect data via APIs, insurance application, insurance databases, and the like sources. The insurance sources can be available through social networks, ad hoc and marketing networks, and other external sources. For example, data can be obtained from insurance sites, insurance providers, driver insurance history, and search engines. All this enables recommendation engines to take a more holistic view of the driver. The recommendation engine can recommend different insurance products that save money for the driver, or alternatively can even recommend different insurance companies to save money. Using greater amounts of data lets the engines find connections that might otherwise go unnoticed, which yields better suggestions. This also sometimes requires recommendation systems to use complex big-data analysis techniques. Online public profiles and preference listings on social networking sites such as Facebook add useful data.

Most recommendation engines use complex algorithms to analyze driver behavior and suggest recommended activities that employ personalized collaborative filtering, which use multiple agents or data sources to identify behavior patterns and draw conclusions. This approach helps determine that numerous drivers who have same or similar type of behavior in the past may have to perform one or more similar activities in the future. Many systems use expert adaptive approaches. These techniques create new sets of suggestions, analyze their performance, and adjust the recommendation pattern for similar behavior of drivers. This lets systems adapt quickly to new trends and behaviors. Rules-based systems enable businesses to establish rules that optimize recommendation performance.

Figure 26:
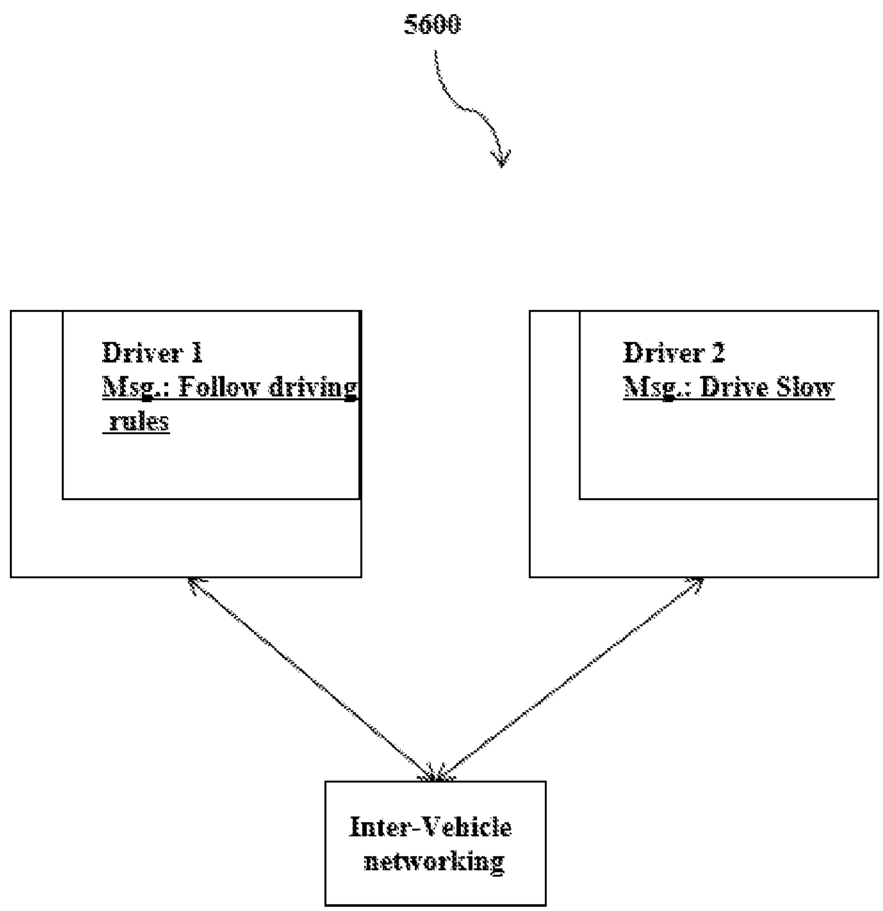
FIG. 26 is a diagram illustrates generally, a first vehicle program communicating with a second vehicle program through an Inter-Vehicle Communication, according to embodiments as disclosed herein.

FIG. 26 is a diagram 5600 illustrates generally, a first vehicle program communicating with a second vehicle program through an Inter-Vehicle networking, according to embodiments as disclosed herein. In an embodiment, the system develops inter-vehicular networking, computing, transceivers, and sensing technologies in the vehicles. Such vehicles have embedded computers, GPS receivers, short-range wireless network interfaces, and potentially access to in-car sensors and the Internet. Furthermore, they can interact with road-side wireless sensor networks and sensors embedded in other vehicles. These capabilities can be leveraged into distributed computing and sensing applications over vehicular networks for safer driving, dynamic route planning, mobile sensing, or in-vehicle entertainment. The system can include vehicular-specific network protocols, middleware platforms, and security mechanisms to process the data. As shown in FIG. 26, a first driver operating a vehicle observes a second driver operating a vehicle within his visual range and wants to send a message to the second driver. The vehicle can include identifying information that is visually ascertainable such as the model, vehicle color, number of doors, license plate number and state. The vehicle may include additional information that is only ascertainable from up close or at certain angles, or via certain technologies, such as a roof top identification number, vehicle identification number, taxi badge number, Bluetooth, or RFID code, and the like. In an embodiment, a sender having access to the vehicle monitoring device and viewing a second vehicle desires to contact the driver of the second vehicle. In one embodiment, in case of an accident as detected by an accelerometer or airbag deployment, both vehicles automatically exchange insurance information and the drivers simply confirm and signs to accept. In another embodiment, in case of a hit-and-run, the vehicle computer would automatically capture insurance information from the other vehicle and store all parameters arising from the accident for accident investigator's review. In another embodiment, if one vehicle detects that the other vehicle has a low insurance rating, the vehicle automatically enters a defensive driving mode around that vehicle. As best shown in FIG. 16, the sender initiates communication via a telephone or handheld computer or vehicle monitoring device and accesses the interface to the inter-vehicle networking service and database. The sender can select "send message" from the graphical or audio menu to send message or directly communicate with the driver of the second vehicle.

Figure 27:
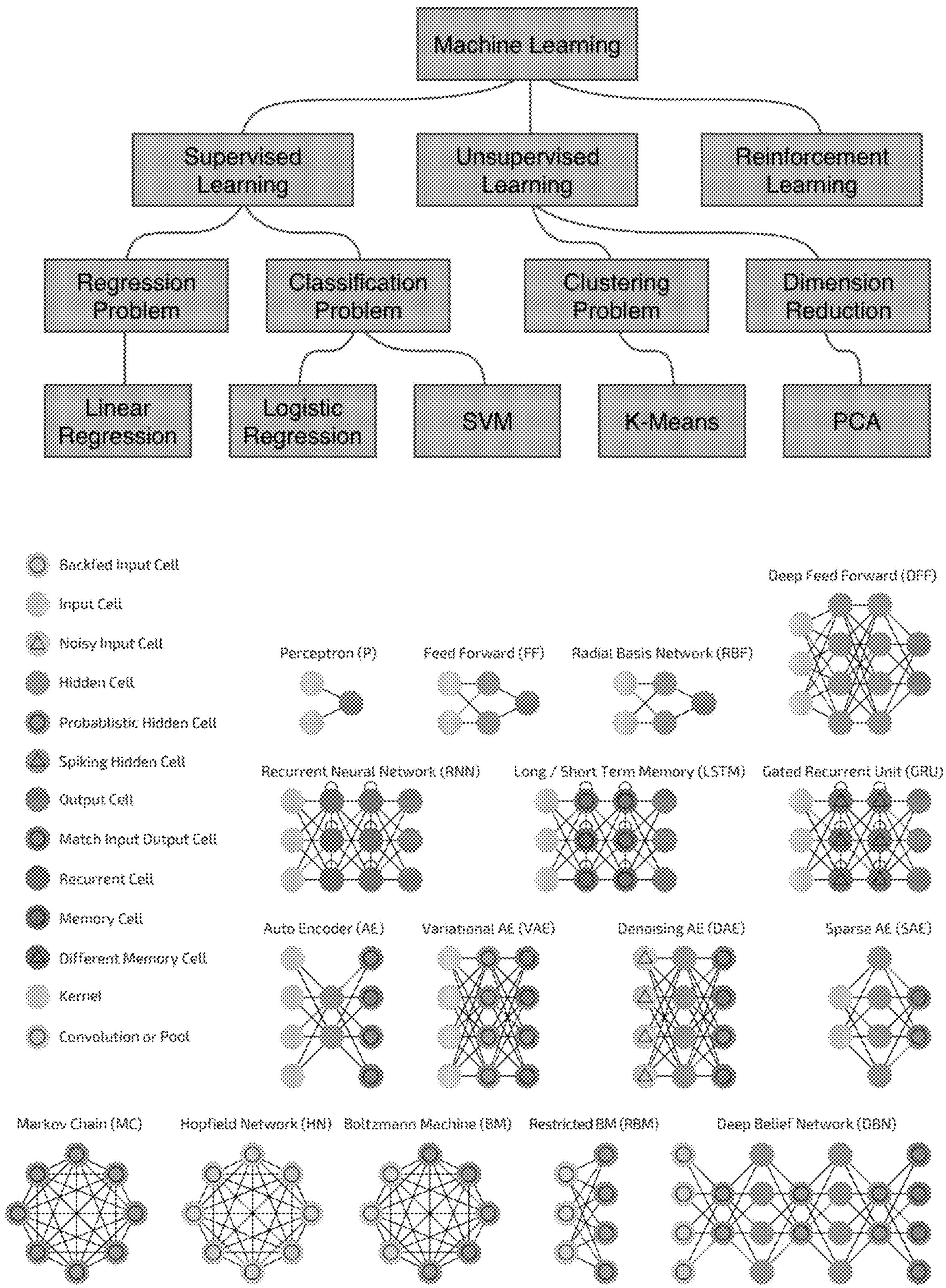
FIG. 27 shows exemplary learning system architectures to detect road lanes and objects such as those in FIGS. 2D-2L, for example.

FIG. 27 shows exemplary learning system architectures to detect road structures from car cameras. In addition to controlling the car operation, the neural network can be used to provide local edge processing for IOT devices. A striking feature about neural networks is their enormous size. To reduce size of the neural networks for edge learning while maintaining accuracy, the local neural network performs late down-sampling and filter count reduction, to get high performance at a low parameter count. Layers can be removed or added to optimize the parameter efficiency of the network. In certain embodiments, the system can prune neurons to save some space, and a 50% reduction in network size has been done while retaining 97% of the accuracy. Further, edge devices on the other hand can be designed to work on 8 bit values, or less. Reducing precision can significantly reduce the model size. For instance, reducing a 32 bit model to 8 bit model reduces model size. Since DRAM memory access is energy intensive and slow, one embodiment keeps a small set of register files (about 1 KB) to store local data that can be shared with 4 MACs as the leaning elements). Moreover, for video processing, frame image compression and sparsity in the graph and linear solver can be used to reduce the size of the local memory to avoid going to off chip DRAMs. For example, the linear solver can use a non-zero Hessian memory array with a Cholesky module as a linear solver.

In one embodiment, graphical processors (GPUs) can be used to do multiply-add operations in neural networks. In another embodiment, in a Tensor processing unit (TPU), a systolic array can be used to do the multiply-add operations. The matrix multiplication reuses both inputs many times as part of producing the output. The neural processor can read each input value once, but use it for many different operations without storing it back to a register. Wires only connect spatially adjacent ALUs, which makes them short and energy-efficient. The ALUs perform only multiplications and additions in fixed patterns, which simplifies their design. The systolic array chains multiple ALUs together, reusing the result of reading a single register. During the execution of this massive matrix multiply, all intermediate results are passed directly between 64K ALUs without any memory access, significantly reducing power consumption and increasing throughput.

In another embodiment, original full neural network can be trained in the cloud, and distillation is used for teaching smaller networks using a larger "teacher" network. Combined with transfer learning, this method can reduce model size without losing much accuracy. In one embodiment, the learning machine is supported by a GPU on a microprocessor, or to reconfigure the FPGA used as part of the baseband processing as neural network hardware.

The system can implement Convolutional Neural Networks (CNN) such as AlexNet with 5 Convolutional Layers and 3 Fully Connected Layers. Multiple Convolutional Kernels (a.k.a filters) extract interesting features in an image. In a single convolutional layer, there are usually many kernels of the same size. For example, the first Cony Layer of AlexNet contains 96 kernels of size 11×11×3. Note the width and height of the kernel are usually the same and the depth is the same as the number of channels. The first two Convolutional layers are followed by the Overlapping Max Pooling layers that we describe next. The third, fourth and fifth convolutional layers are connected directly. The fifth convolutional layer is followed by an Overlapping Max Pooling layer, the output of which goes into a series of two fully connected layers. The second fully connected layer feeds into a softmax classifier with 1000 class labels. ReLU nonlinearity is applied after all the convolution and fully connected layers. The ReLU nonlinearity of the first and second convolution layers are followed by a local normalization step before doing pooling. But researchers later didn't find normalization very useful. So we will not go in detail over that. Max Pooling layers are usually used to downsample the width and height of the tensors, keeping the depth same. Overlapping Max Pool layers are similar to the Max Pool layers, except the adjacent windows over which the max is computed overlap each other. The authors used pooling windows of size 3×3 with a stride of 2 between the adjacent windows. This overlapping nature of pooling helped reduce the top-1 error rate by 0.4% and top-5 error rate by 0.3% respectively when compared to using non-overlapping pooling windows of size 2×2 with a stride of 2 that would give same output dimensions.

One embodiment for road side object detection such objects/lane markings of FIGS. 2D-2L uses generative adversarial networks (GANs) which are deep neural net architectures comprised of two nets, pitting one against the other (thus the "adversarial"). The steps a GAN takes includes:

The generator takes in random numbers and returns an image.

This generated image is fed into the discriminator alongside a stream of images taken from the actual, ground-truth dataset.

The discriminator takes in both real and fake images and returns probabilities, a number between 0 and 1, with 1 representing a prediction of authenticity and 0 representing fake.

The discriminator is in a feedback loop with the ground truth of the images, which we know.

The generator is in a feedback loop with the discriminator.

For road side images, the discriminator network is a standard convolutional network that can categorize the images fed to it, a binomial classifier labeling images as real or fake. The generator is an inverse convolutional network: While a standard convolutional classifier takes an image and downsamples it to produce a probability, the generator takes a vector of random noise and upsamples it to an image. The first throws away data through downsampling techniques like maxpooling, and the second generates new data. Both nets are trying to optimize a different and opposing objective function, or loss function, in a zero-zum game. This is essentially an actor-critic model. As the discriminator changes its behavior, so does the generator, and vice versa. Their losses push against each other.

For purposes of illustration, a number of example implementations are described. It is to be understood, however, that the example implementations are illustrative only and are not meant to limiting. Other example implementations are possible as well.

It should be understood, of course, that the foregoing relates to exemplary embodiments of the invention and that modifications may be made without departing from the spirit and scope of the invention as set forth in the following claims.

What is claimed is:

1. A method for autonomous navigation, comprising:

generating one or more trip travel segments from origin to destination;

creating a 3D model based on outputs of the camera and sensor;

accessing a high definition map database and confirming the 3D model with the with travel segments;

detecting a freeway entrance, an exit lane, or a highway divider structure based on a road marking using a camera and a sensor;

guided by the 3D model and determining if the travel segment passes the freeway entrance or exit, then follow the current lane without exiting; and otherwise following the freeway entrance or exit.

2. The method of claim 1, wherein the marking indicates a yield line, comprising detecting a row of solid isosceles triangles with a black arrow indicating a travel direction.

3. The method of claim 1, comprising detecting a Yield Marking.

4. The method of claim 1, comprising detecting a Work Zone Pavement Marking.

5. The method of claim 1, comprising detecting an Intersection Marking.

6. The method of claim 1, comprising detecting a Two-Way Traffic Marking.

7. The method of claim 1, comprising detecting a Freeway Entrance and Exit Marking.

8. The method of claim 1, comprising detecting a High occupancy vehicle (HOV) Lane Marking.

9. The method of claim 1, comprising detecting periodic depressions on a side of the road.

10. The method of claim 1, comprising detecting a side rail on a side of the road.

11. The method of claim 1, comprising detecting reflective panels on a side of the road.

12. The method of claim 1, comprising detecting periodic street signs on a side of the road.

13. The method of claim 1, comprising detecting a curvature on a side of the road.

14. The method of claim 1, comprising detecting an incoming vehicle.

15. The method of claim 1, comprising detecting a neighboring vehicle.

16. The method of claim 1, comprising detecting road reflectors, raised pavement markers, or cat's eyes on a side of the road.

17. The method of claim 1, comprising detecting rumble strips on a side of the road.

18. The method of claim 1, comprising detecting a parking area, a pedestrian on a sidewalk, a bike parking structure or a marking.

19. The method of claim 1, comprising applying a neural network to detect the freeway entrance, exit lane or highway divider structure.

20. A vehicle, comprising:

one or more cameras and sensors;

a processor coupled to the one or more cameras and sensors; and code executable by the processor for:

creating a 3D model based on outputs of the camera and sensor;

accessing a high definition map database and generating a trip with travel segments from origin to destination;

detecting a freeway entrance, an exit lane, or a highway divider structure based on a road marking using the camera;

guided by the 3D model and determining if the travel segment passes the freeway entrance or exit, then follow the current lane without exiting; and otherwise following the freeway entrance or exit, wherein the vehicle operates without requiring input from a positioning system.

* * * * *